United States Patent
Rumland

(10) Patent No.: US 12,143,912 B2
(45) Date of Patent: Nov. 12, 2024

(54) METHOD FOR OPERATING A MOBILE RADIO

(71) Applicant: SafeNow GmbH, Munich (DE)

(72) Inventor: Tilman Rumland, Munich (DE)

(73) Assignee: SafeNow GmbH (DE)

(*) Notice: Subject to any disclaimer, the term of this patent is extended or adjusted under 35 U.S.C. 154(b) by 541 days.

(21) Appl. No.: 17/595,835

(22) PCT Filed: May 28, 2020

(86) PCT No.: PCT/EP2020/064826
§ 371 (c)(1),
(2) Date: Nov. 25, 2021

(87) PCT Pub. No.: WO2020/239903
PCT Pub. Date: Dec. 3, 2020

(65) Prior Publication Data
US 2022/0321693 A1    Oct. 6, 2022

(30) Foreign Application Priority Data

May 29, 2019 (DE) ............ 10 2019 114 453.1
Mar. 10, 2020 (DE) ............ 10 2020 106 434.9

(51) Int. Cl.
*H04W 4/80* (2018.01)
*H04M 1/72454* (2021.01)
(Continued)

(52) U.S. Cl.
CPC ......... *H04W 4/80* (2018.02); *H04M 1/72454* (2021.01); *H04W 8/02* (2013.01); *H04W 12/63* (2021.01); *H04W 12/64* (2021.01)

(58) Field of Classification Search
CPC ....... H04W 4/38; H04W 88/02; H04W 12/06; H04W 12/086; H04W 4/02; H04W 12/64;
(Continued)

(56) References Cited

U.S. PATENT DOCUMENTS

2018/0047276 A1* 2/2018 Xie ............... G08B 21/20
2018/0132104 A1   5/2018 Dhulipalla et al.
(Continued)

FOREIGN PATENT DOCUMENTS

WO    2016/191497    12/2016

OTHER PUBLICATIONS

Office Action issued by the India Patent Office in related Application No. 202117055175, dated Aug. 14, 2023.

*Primary Examiner* — Kwasi Karikari
(74) *Attorney, Agent, or Firm* — BARNES & THORNBURG LLP; Jeffrey R. Stone

(57) ABSTRACT

According to various embodiments, a method (100, 200) for operating a mobile radio (102) according to a first mode (107) and a second mode (109) can involve: ascertaining (101) an indication of a location of the mobile radio (102) by means of a first sensor of the mobile radio (102); ascertaining a touch on the mobile radio (102) by means of a second sensor of the mobile radio (102), changing over to the second mode (109) if it has been ascertained in the first mode (107) that the touch satisfies a first predefined criterion, generating a message (106) according to a wireless communication protocol if it has been ascertained in the second mode (109) that the touch was interrupted, wherein the message (106) contains the indication and also indicates that the touch was interrupted; changing over (105) to the first mode (107) without generating the message (106) if it has been ascertained in the second mode (109) that the touch satisfies a second predefined criterion.

18 Claims, 30 Drawing Sheets

(51) Int. Cl.
 *H04W 8/02* (2009.01)
 *H04W 12/63* (2021.01)
 *H04W 12/64* (2021.01)

(58) Field of Classification Search
 CPC ..... H04W 12/08; H04W 4/90; H04W 12/065; H04W 12/068; H04W 52/0254; H04W 52/0225; H04W 76/50
 See application file for complete search history.

(56) References Cited

U.S. PATENT DOCUMENTS

2018/0332162 A1  11/2018  Schutter et al.
2019/0069145 A1*  2/2019  Dantsker ............... G06F 40/169

* cited by examiner

METHOD FOR OPERATING A MOBILE RADIO

Various embodiments relate to a method for operating a mobile radio.

To cater for the increasing need for security in the population, static surveillance and security measures are increasingly being set up. Such measures are rarely actively monitored but simply store their data for later use. They can therefore at most have a deterrent effect on third parties but do not take any active countermeasures or call for help.

In contrast to the increasing need for security there is on the other hand an increasing need for privacy, and so in many areas of life conventional surveillance and security measures are not widely accepted or are inadmissible. Therefore, static surveillance and security measures are usually only predominantly found in public areas and are only rarely used in other areas, such as for example in private life, in toilets or in changing rooms. These and other unguarded areas can therefore become a favored target for third parties.

By way of illustration, privacy and the protection provided by surveillance and security measures are competing concerns.

The method described here, according to various embodiments, allows improved protection to be provided against actions by third parties (for example harassment or criminal acts) without privacy having to be restricted for this. By way of illustration, the method provides a mobile radio which, when needed, can be put on alert and which implements a mechanism that allows reliable detection if help is required.

According to various embodiments, a method for operating a mobile radio according to a first mode and a second mode may involve: ascertaining an indication of a location of the mobile radio by means of a first sensor of the mobile radio; ascertaining touching of the mobile radio by means of a second sensor of the mobile radio, changing over to the second mode if it has been ascertained in the first mode that the touching satisfies a first predefined criterion, generating a message according to a wireless communication protocol if it has been ascertained in the second mode that the touching was interrupted, the message including the indication and also indicating that the touching was interrupted; changing over to the first mode without generating the message if it has been ascertained in the second mode that the touching satisfies a second predefined criterion. The second predefined criterion may for example be satisfied when the first predefined criterion is no longer satisfied.

By way of illustration, if the user loses control over the mobile radio, and consequently contact with it (for example consciously or unconsciously), in the second mode it may have been put on alert and an alarm triggered by means of the message. Once the danger has passed, the mobile radio may be put into the first mode, which deactivates the state of alert.

In the figures:

FIGS. 1 and 2 respectively show a method for operating a mobile radio according to various embodiments in a schematic flow diagram;

FIGS. 3, 11, 12 and 14 respectively show a system for carrying out the method according to various embodiments in a schematic communication diagram;

FIGS. 4 to 10 respectively show a mobile radio for carrying out the method according to various embodiments in a schematic plan view;

Figure 16:
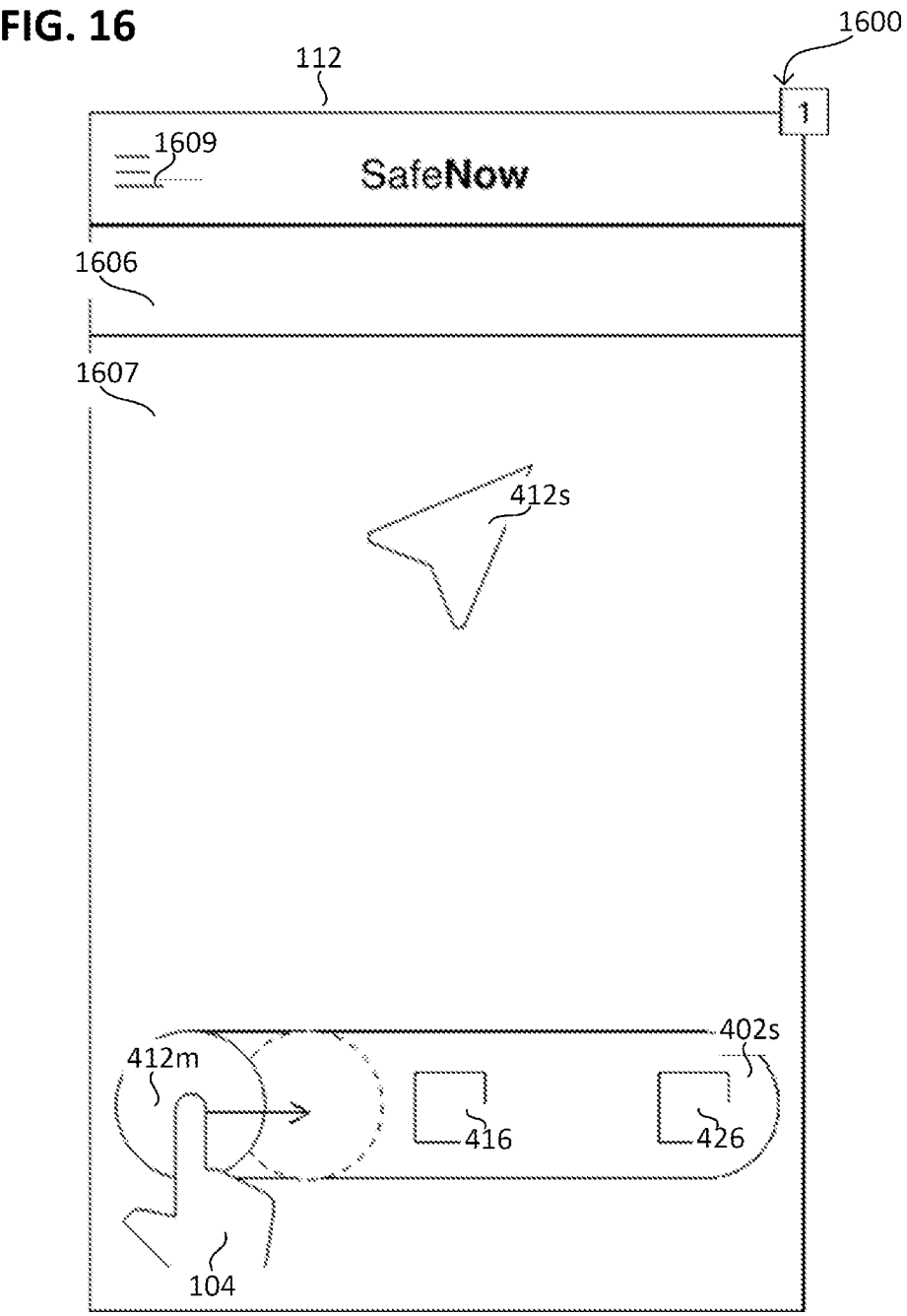
Figure 17:
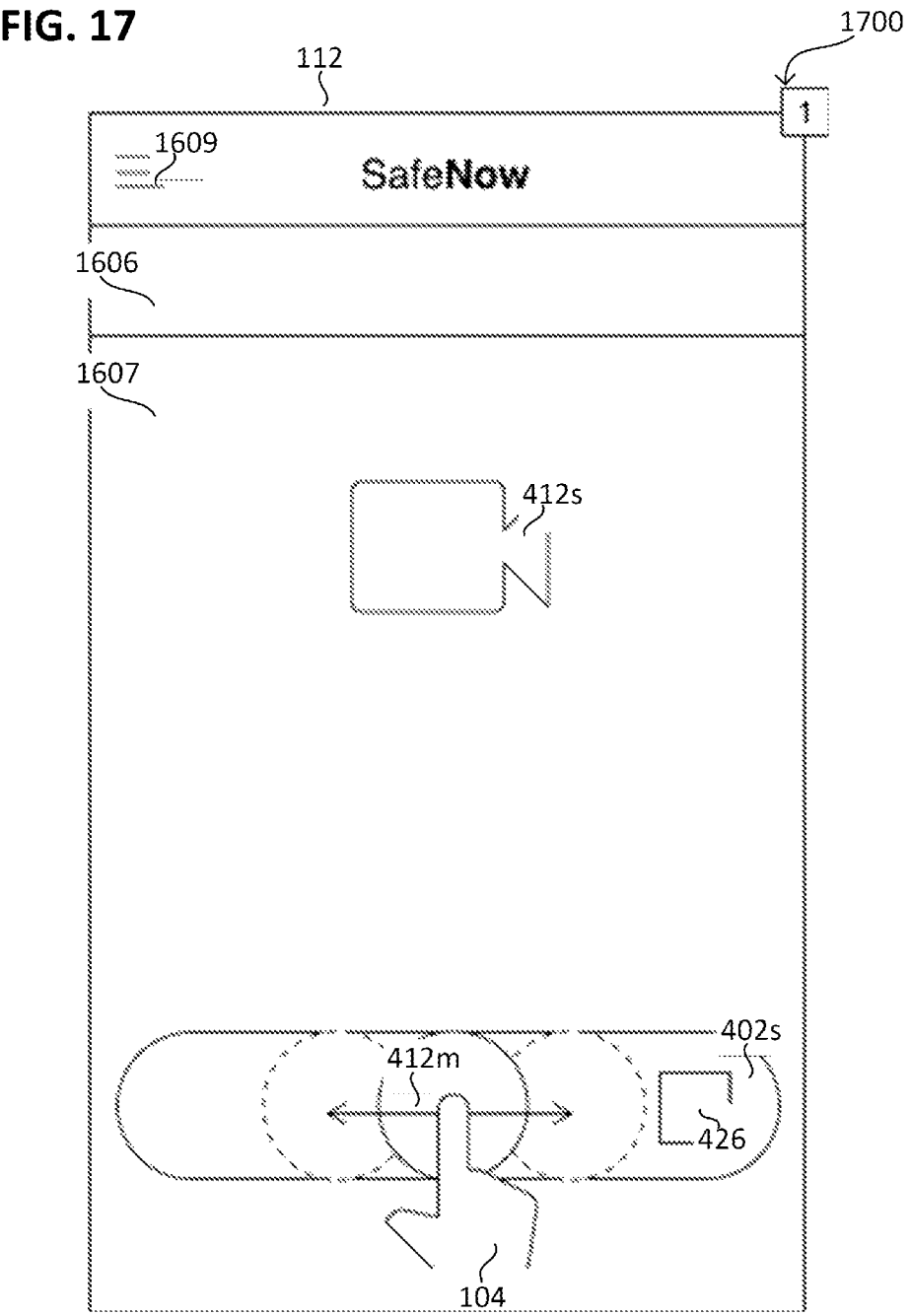
Figure 18:
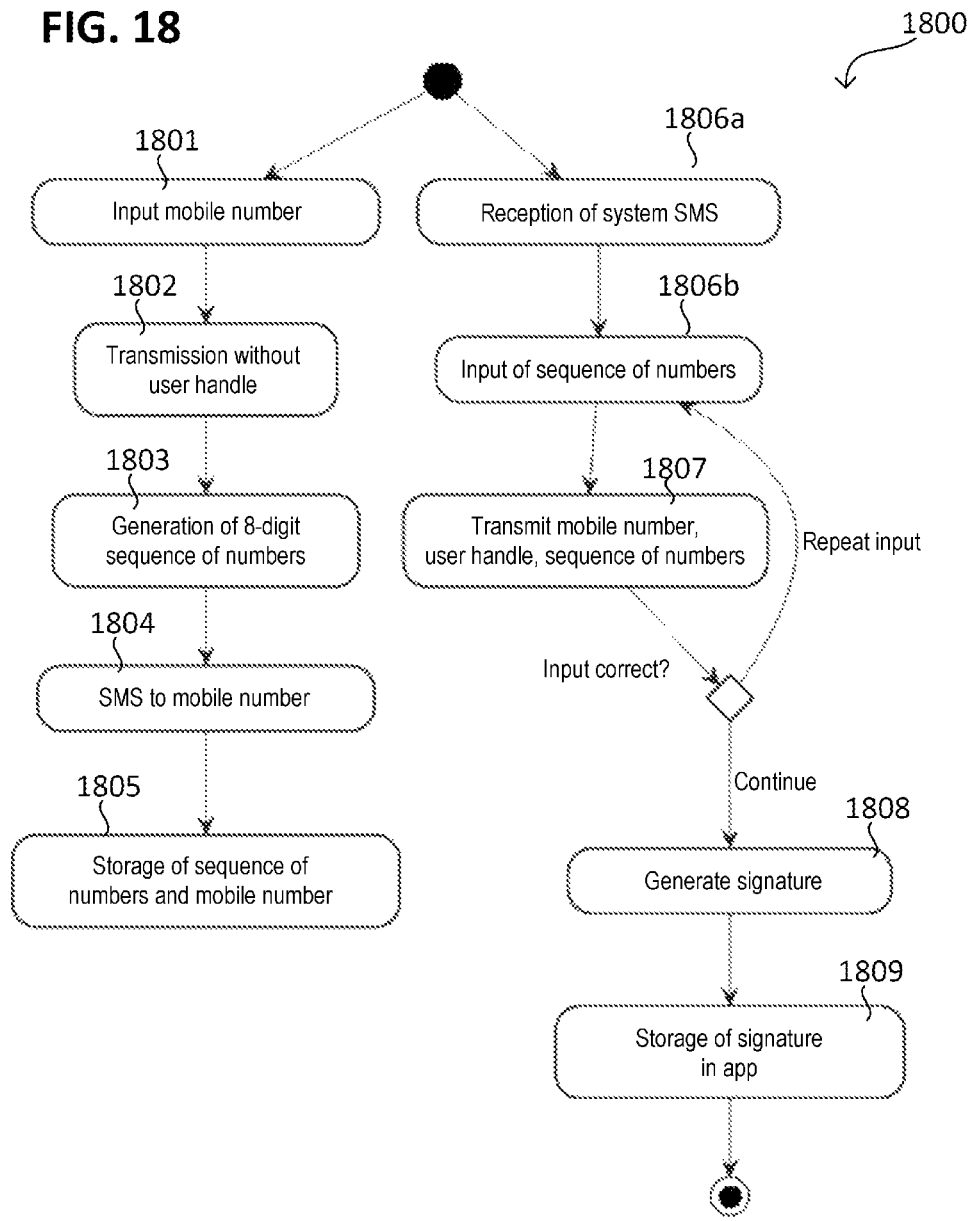
Figure 19:
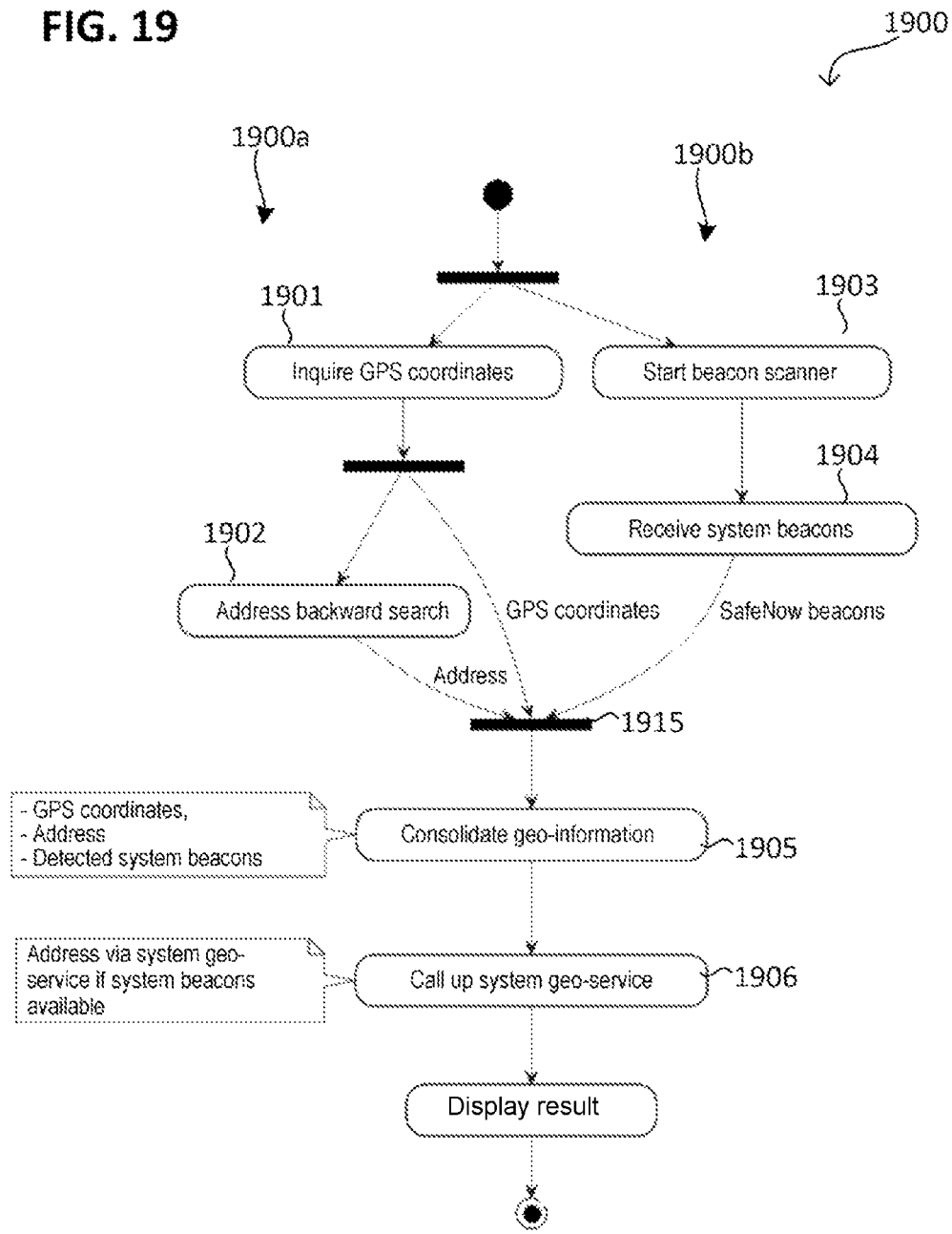
Figure 20:
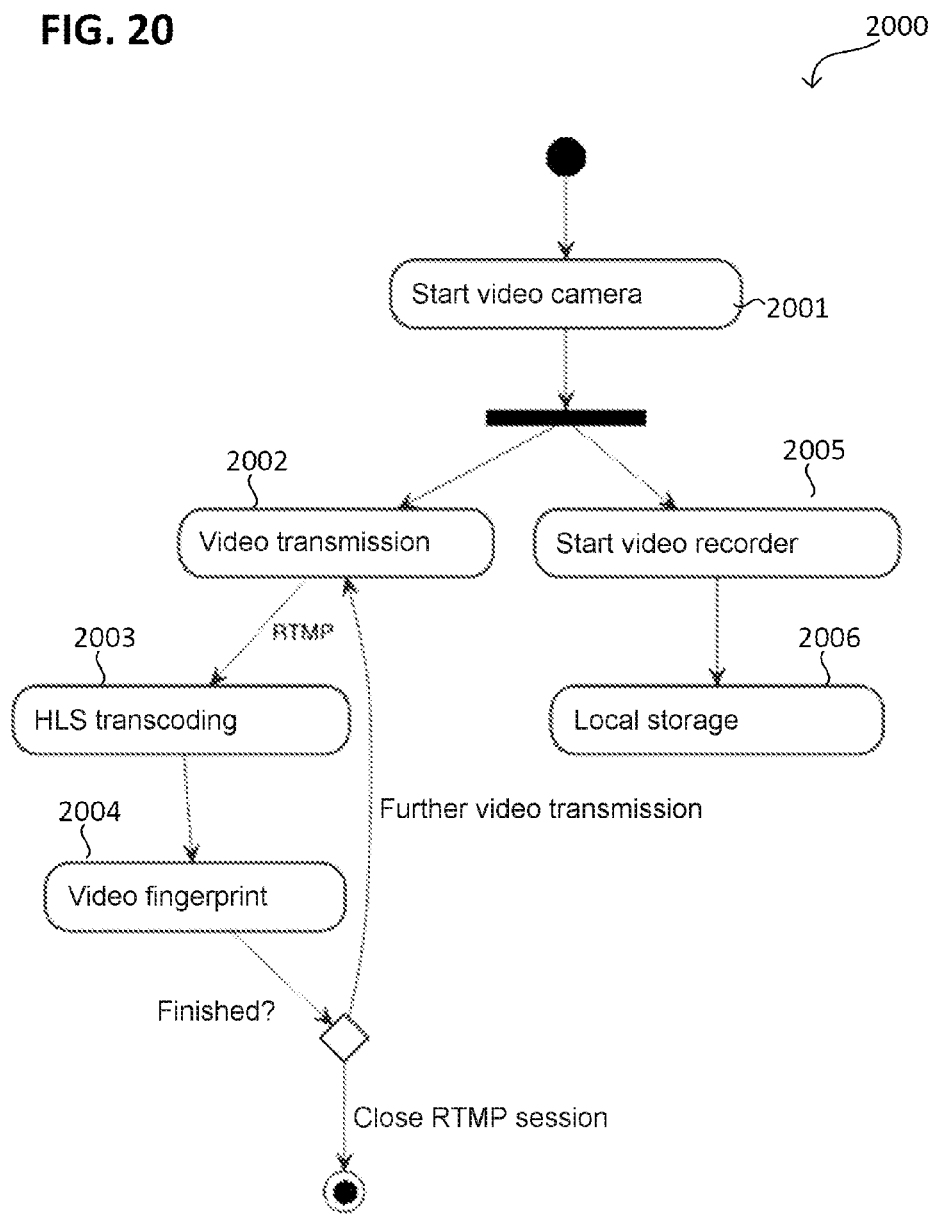
Figure 21:
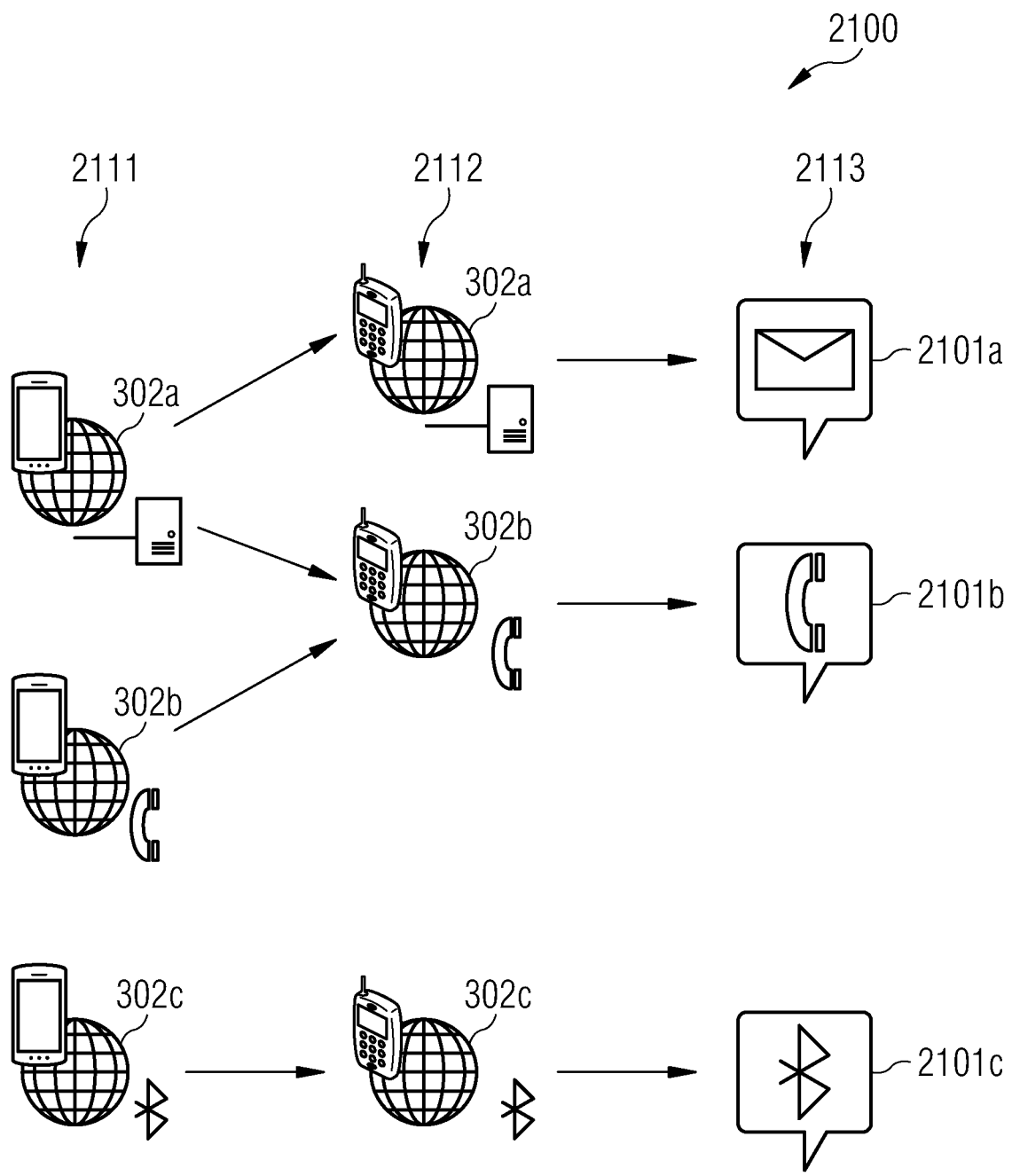
Figure 22:
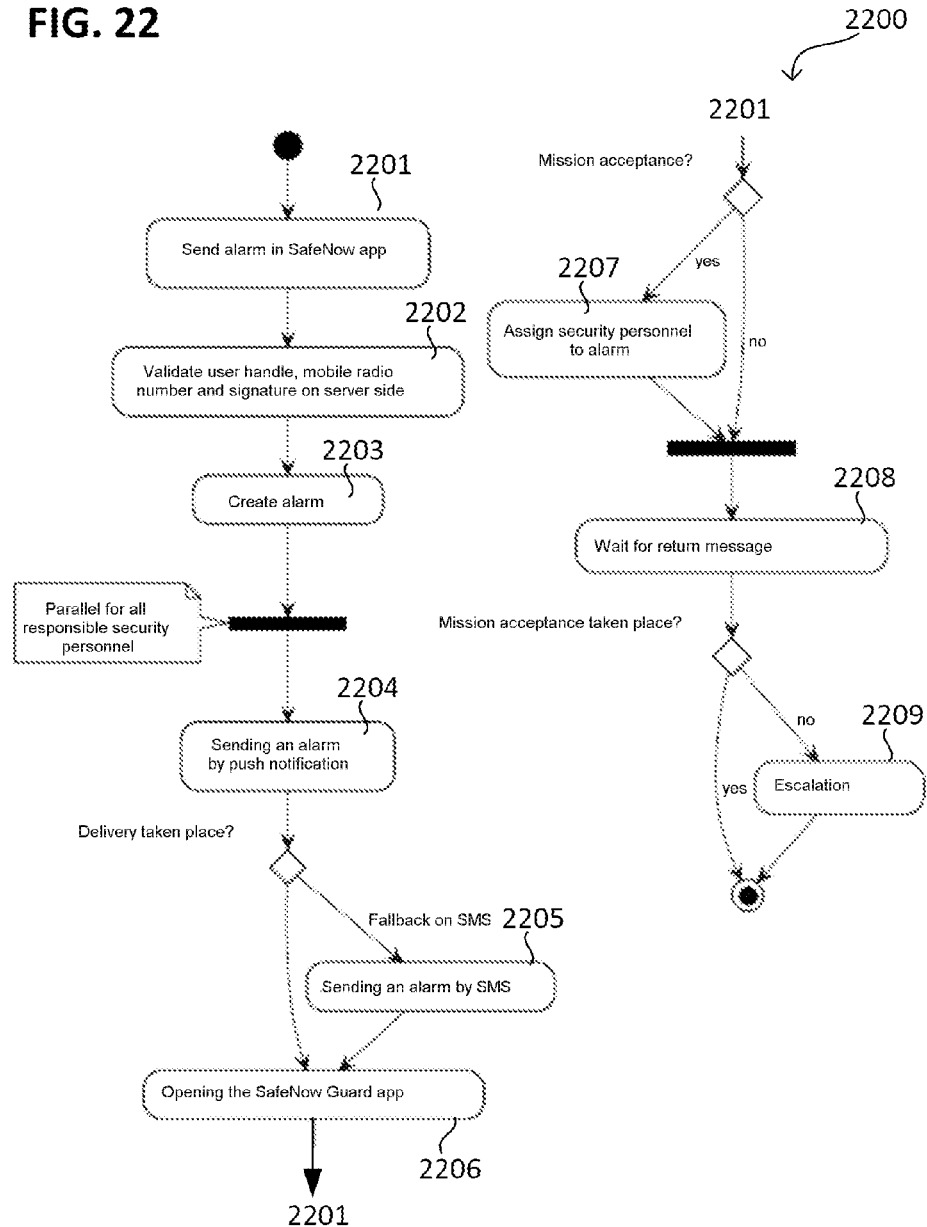
Figure 23:
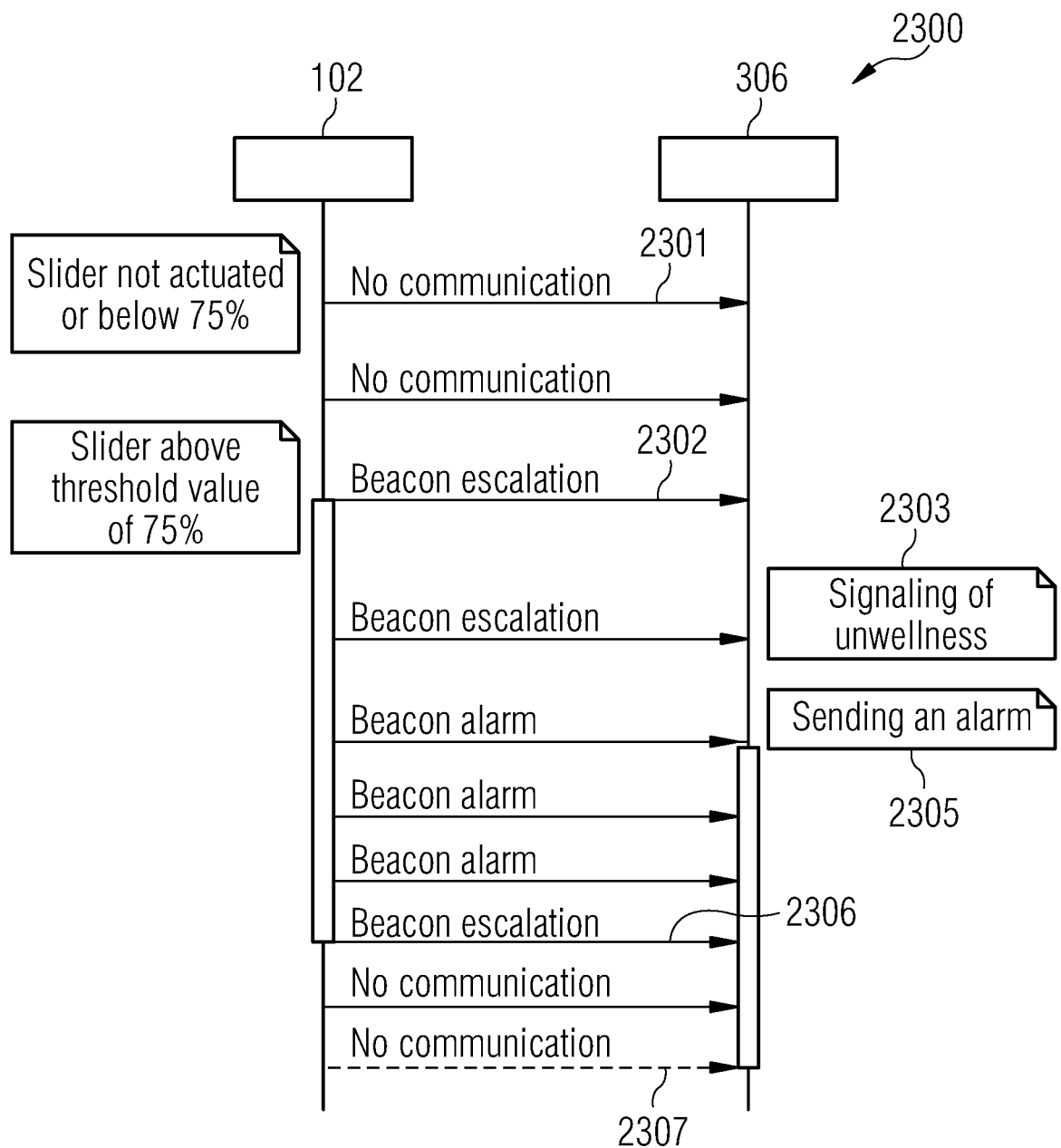
Figure 24:
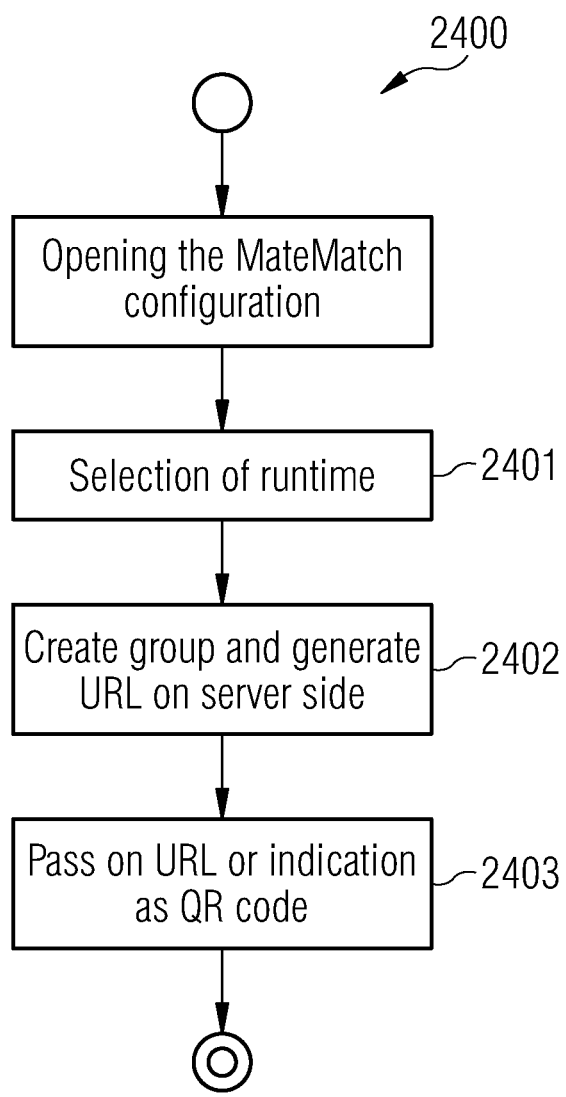
Figure 25:
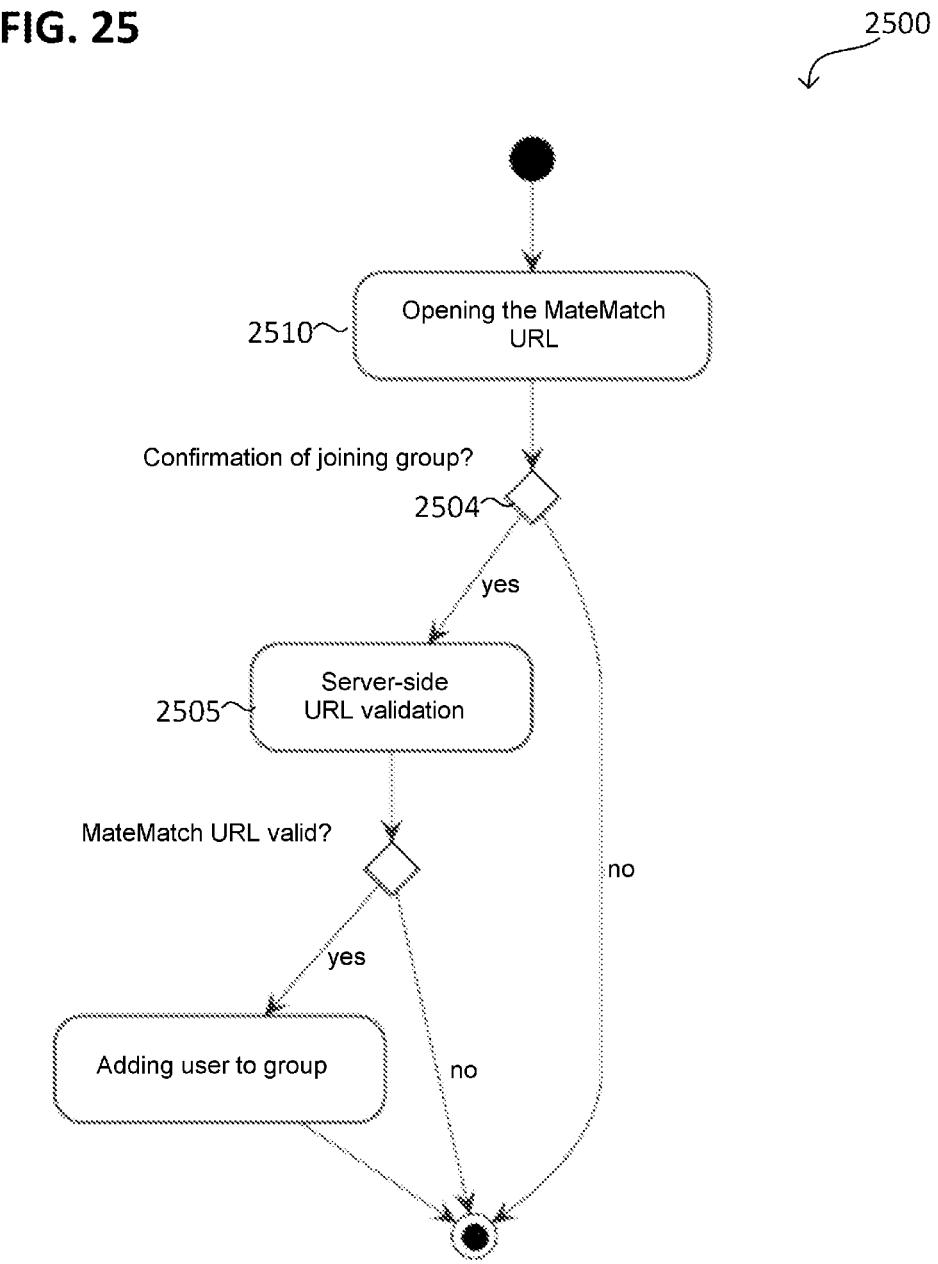

FIGS. 16 and 17 respectively show the display of a mobile radio in a schematic plan view;

FIG. 18 shows the method for operating the system according to various embodiments in a schematic flow diagram;

FIG. 19 shows the locating according to various embodiments in a schematic flow diagram;

FIG. 20 shows the recording of the environment according to various embodiments in a schematic flow diagram;

FIG. 21 the sending of an alarm according to various embodiments in a schematic overview;

FIGS. 22 and 23 respectively show the sending of an alarm according to various embodiments in a schematic flow diagram;

FIGS. 24 and 25 respectively show the linkage of two or more mobile radios according to various embodiments in a schematic flow diagram; and FIGS. 26 to 30 respectively show the display of a mobile radio in a schematic plan view.

In the following detailed description, reference is made to the accompanying drawings, which form part of this description and in which specific embodiments in which the invention can be carried out are shown for the purposes of illustration. In this respect, directional terminology such as for instance "at the top", "at the bottom", "at the front", "at the rear", "front", "rear", "left", "right" etc. is used with reference to the orientation of the figure(s) described. Since components of embodiments may be positioned in a number of different orientations, the directional terminology serves for purposes of illustration and is in no way restrictive. It goes without saying that other embodiments may be used and structural or logical changes may be made without departing from the scope of protection of the present invention. It goes without saying that the features of the various embodiments described herein by way of example can be combined with one another, unless otherwise specifically stated. The following detailed description is therefore not to be interpreted in a restrictive sense, and the scope of protection of the present invention is defined by the appended claims.

In the course of this description, the terms "connected" and "coupled" are used for describing both a direct connection and an indirect connection (for example cable-bound or wireless), and a direct or indirect coupling. A number of elements may for example be coupled to one another by means of the connection along a chain of interaction, along which the interaction (for example a signal) which transmits information can be transmitted. For example, two elements coupled to one another can exchange information (for example data) with one another. Devices communicatively coupled to one another may for example authenticate one another, and so they detect one another. In the figures, identical or similar elements are provided with identical designations, wherever appropriate.

A mobile radio may, according to various embodiments, be a cell phone, for example a featurephone or a smartphone, but also a pager, a tablet, a laptop, a smartwatch or a mixed form of these types of device.

According to various embodiments, each individual user of the mobile radio can be enabled to decide his or herself at any time when, on the basis of his or her individual sense of security, he or she would like to take measures to increase his or her safety. For example, he or she may record (illustratively expose) instances of harassment or criminal acts by means of a real-time video recording and/or by means of a hand motion make contact quickly, uncomplicatedly and precisely with the nearest available helper. Furthermore, a series of additional functionalities, which according to the case concerned differ or merge smoothly together, may have been or be provided. These can, according to choice, be activated/deactivated and/or configured by the user (also referred to as conscious choice) and serve the purpose of increasing the actual safety and consequently also the sense of security of the user. A conscious choice that has been made may for example be stored (for example by means of a database), for example locally on the mobile radio and/or on a computer system that receives the message, for example for later reuse.

According to various embodiments, an IT infrastructure (also referred to as the system), which allows quick, frictionless, location-based communication between the mobile radio (by way of illustration, the sender of the call for help) and a receiving device (by way of illustration, the recipient of the call for help), may have been or be provided.

Various steps and details relating to the method are described below. It can be understood that what is described (for example individual steps of the method) may be analogously implemented by means of hardware (such as for example a hard-wired circuit) and/or software (for example code segments or an entire application). For example, an application (also referred to as a program), which has corresponding code segments (for example program code) and which may have been or be run on a processor and/or by means of a circuit which has the processor, may have been or be provided. The processor (or the circuit) may for example be part of a mobile radio or a computer system. The computer system may for example have a multiplicity of processors, which are centrally arranged within a physically interconnected network or else in a decentralized manner are connected to one another by means of a cellular network. In this way, code segments or the application can be run on the same processor or parts thereof may be distributed among a number of processors, which communicate with one another by means of the cellular network.

The transmission of information (information transmission) may, according to various embodiments, take place according to a communication protocol (CP). The information transmission may involve generating and/or transmitting a message that has the information according to the communication protocol. The communication protocol may, by way of illustration, designate an agreement according to which the information transmission proceeds between two or more parties. In its simplest form, the communication protocol may be defined as a set of rules that establish the syntax, semantics and synchronization of the information transmission. The communication protocol (for example a network protocol) may have a protocol stack built up from layers, in which the rules are divided among the individual levels of the protocol stack. The configuration of the protocol stack or its layers may for example be described by means of a reference model, for example the OSI model, which assigns to each layer those services that it is intended to provide. The transmission of information by Bluetooth may involve generating and/or transmitting a message that has the information according to a Bluetooth communication protocol. The Bluetooth communication protocol may optionally have a low-energy protocol stack, i.e. the information can be transmitted by low-energy Bluetooth. This may also apply by analogy to a communication protocol of other types.

Figure 1:
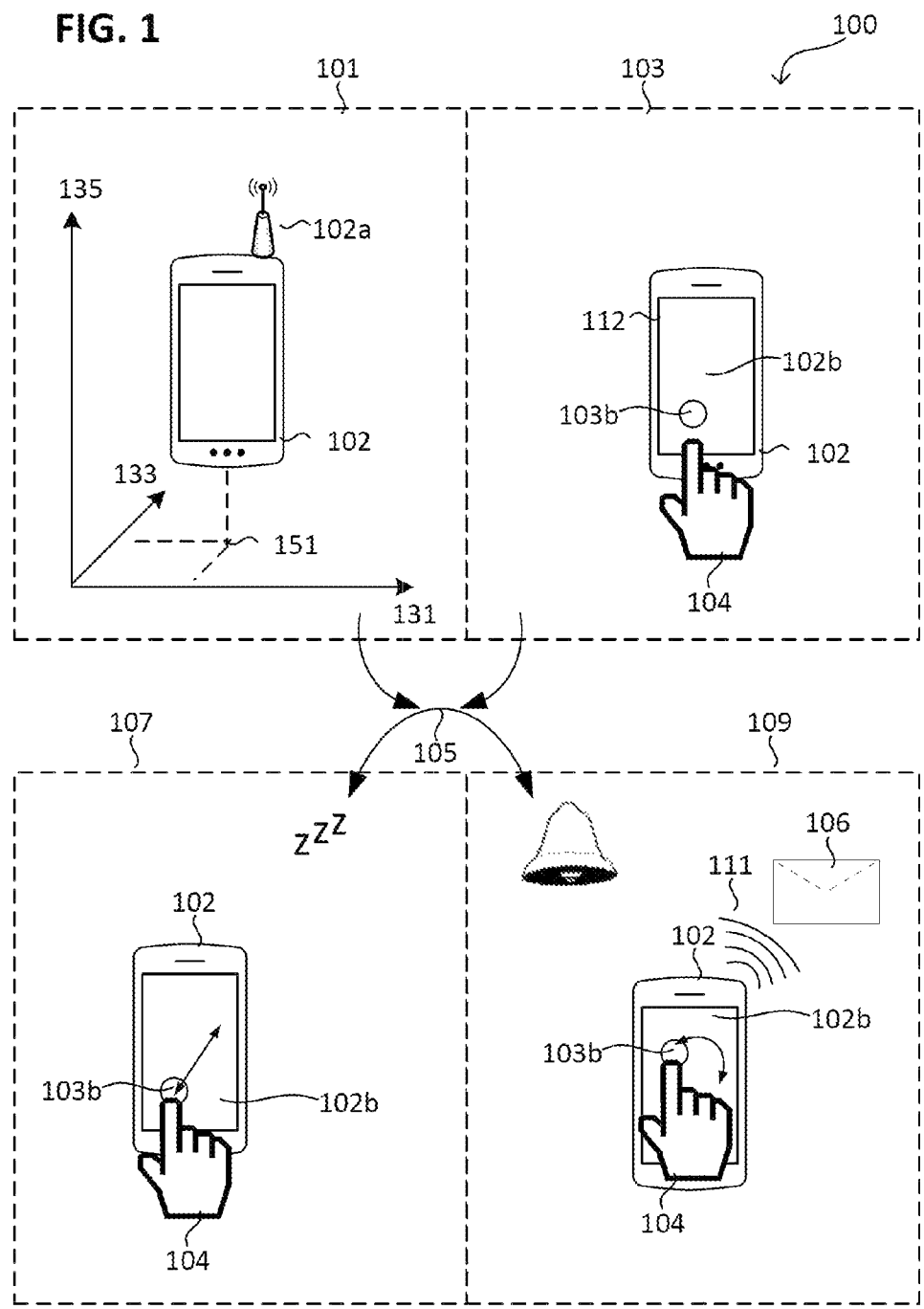

FIG. 1 illustrates a method 100 for operating a mobile radio 102 according to various embodiments in a schematic flow diagram. By way of illustration, the method may be set up to trigger an alarm if there is loss of touch 111, when the mobile radio 102 is in a readiness mode 109.

The method 100 may involve in 101: ascertaining an indication of a location 151 of the mobile radio 102 by means of a first sensor 102a of the mobile radio 102 (also referred to as locating 101). The indication (also referred to as the location indication) may for example have the coordinates of the location according to a spatial coordinate system 131, 133, 135. The spatial coordinate system 131, 133, 135 may be a two-dimensional or three-dimensional coordinate system. The coordinate system may for example span the Earth (also referred to as a geo-coordinate system) and give the coordinates in geographical latitude and longitude or an equivalent (also referred to as geo-coordinates). However, the coordinate system may generally be any desired coordinate system that allows a clear indication of the geo-stationary location, with corresponding reference points, to describe positions, vectors, movements and the like.

The first sensor 102a (also referred to as the location sensor 102a) may for example be set up to communicate with a space-based navigation system (for example for positional determination by means of satellites). The space-based navigation system may for example comprise or be formed by a global position determining system (GPS), a global satellite navigation system (GLONASS), a European global navigation satellite system (Galileo) or a Chinese global navigation satellite system (Beidou). The space-based navigation system may have a number of geostationary satellites, which periodically emit their current position and the exact time of day by means of a coded radio signal.

The location sensor 102a may as an alternative or in addition be set up to communicate with some other navigation system (more generally geo-location system), for example a ground-based navigation system (for example radio navigation system). The ground-based navigation system may for example be set up for locating 101 within a building, for example by means of a number of radio beacons within the building. Each radio beacon (more generally: radio transmitter) may periodically and/or on request transmit its identification, its current position and/or the exact time of day by means of a radio signal. However, other radio transmitters may also be used as a reference point for the locating 101, if the location of the radio transmitter and/or the mobile radio 102 can be ascertained on the basis of their radio signals. For example, the radio transmitter may be a Bluetooth transmitter or a mobile radio transmitter (for example a transmission tower).

The locating 101 may optionally take place by using a database. For example, the database may have an assignment of the recorded radio signal (or information contained therein) to the location of the transmitter of the radio signal.

The locating sensor 102a may be set up to record the radio signal and ascertain on the basis thereof its location (and consequently that of the mobile radio 102) or at least a location area (i.e. an estimate) in which its location lies. The locating sensor 102a may for example be set up according to ISO 19762-5. The locating sensor 102a may as an alternative or in addition be set up for locating 101 by means of odometry.

The method 100 may involve in 103: ascertaining touching 103b of the mobile radio 102 by means of a (for example touch-sensitive) second sensor 102b (also referred to as the touch sensor 102b) of the mobile radio 102. The touch sensor 102b may for example be part of a touch-sensitive screen, a physical switch, an emulated switch, a fingerprint sensor (or some other biometric sensor) or at least have a touch-sensitive surface. In more general terms, the touch sensor 102b may be set up to record the event of touching 103b of the mobile radio 102 by a user 104 of the mobile radio 102 (referred to herein as the user 104). For example, the physical switch may have been or be actuated, which is recorded as touching 103b. The touch sensor 102b may for example comprise or be formed by a capacitive, optical, resistive or inductive sensor.

The method may involve, in 105, the mobile radio 102 changing over between a first mode 107 (also referred to as the sleep mode) and a second mode 109 (also referred to as the readiness mode).

If it has been ascertained in the sleep mode 107 that the touching 103b satisfies a first predefined criterion (also referred to as the arming criterion), the changing over 105 to the readiness mode 109 may take place (also referred to as arming 105 or escalation). If it has been ascertained in the readiness mode 109 that the touching 103b satisfies a second predefined criterion (also referred to as the disarming criterion), the changing over 105 to the sleep mode 107 may take place (also referred to as disarming 105).

The or each criterion described herein in the context of the touching 103b (also referred to as the touching criterion, for example the disarming criterion, the arming criterion or the recording criterion) may for example be satisfied when the touching 103b takes place according to a predefined pattern of touching (for example a gesture), for example with a predefined spatial and/or temporal distribution and/or intensity. By way of illustration, the touching criterion may define in what way the touching 103b is intended to take place in order that the touching 103b is interpreted as an input and/or triggers a response of the mobile radio 102.

For example, the criterion may be satisfied when the touching 103b takes place along a predefined trajectory or between two predefined regions on the touch sensor 102b. For example, the touching criterion may be satisfied when a predefined input (for example code) or a touching sequence (i.e. a sequence) is recorded. By way of illustration, the touching criterion may be satisfied when for example swiping and/or tapping take place in a certain way over the touch-sensitive surface (for example of the screen 102b) or if a physical probe is actuated according to a certain sequence (for example three times in succession, repeatedly for a short and/or long time, or the like).

If it has been ascertained in the readiness mode 109 that touching 103b was interrupted (also referred to as interruption of touching or loss of contact), by contrast, a message 106 may be generated 111 and/or sent 111 by the mobile radio 102 according to a communication protocol (CP). The message 106 may have the location indication (also referred to as geo-information) and also indicate directly or indirectly (for example include information on this) that the touching 103b was interrupted in the readiness mode 109 (also referred to as alarm indication).

As an alternative or in addition, one or more than one additional message, which includes the location indication and/or indicates that the mobile radio 102 has been or is changed over to the readiness mode 109 (also referred to as the readiness indication), as described more specifically later, may be generated 111 and/or sent 111 by the mobile radio 102 according to a communication protocol (CP).

The alarm indication may for example comprise a complex word and/or else an indicator having only a few bits (for example one or two bits), for example a bit switch, as described more specifically later.

A CP set up for wireless communication (also referred to as a wireless CP) may for example be in accord with a cellular mobile radio network to which the mobile radio 102 is connected, for example a GMS network, GPRS network, UMTS network and/or LTE network. The message 106 may for example be a voice message or a text message, such as for example a short message (for example SMS), an immediate message (for example instant message) or some other text message according to a (for example proprietary) message protocol.

The wireless CP may for example define details in relation to a network layer, data link layer and/or physical layer (according to the OSI model). The message may for example be transmitted, sent and/or received on a layer lying above it, for example the session layer or application layer.

The disarming 105 may for example take place without the message being generated 111 and/or sent 111.

Figure 2:
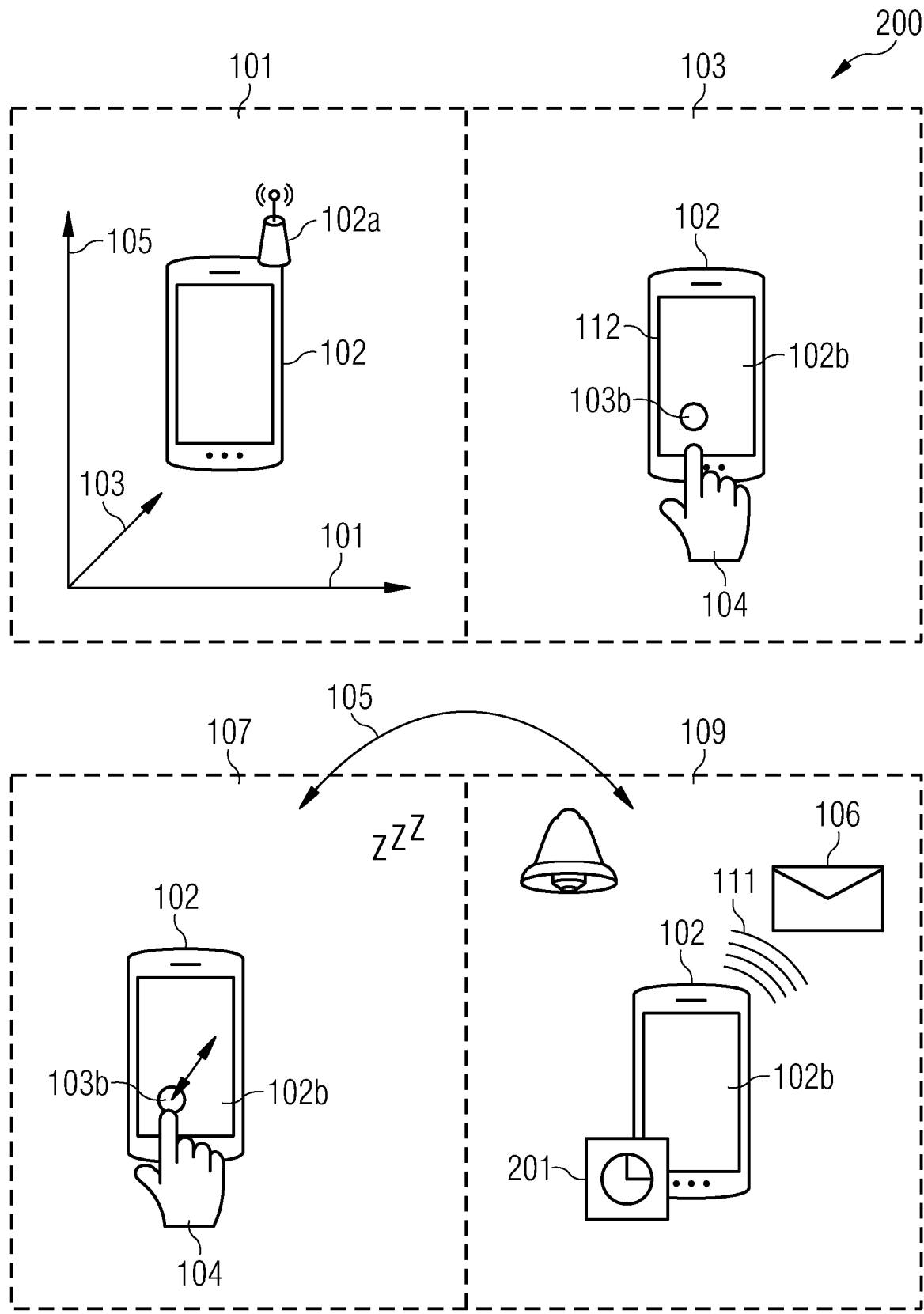

FIG. 2 illustrates a method 200 for operating a mobile radio 102 according to various embodiments in a schematic flow diagram. By way of illustration, the method 200 may be set up to trigger an alarm after the running down of a timer (also referred to as a time trigger or time switch) when the mobile radio 102 is in a readiness mode.

The method 200 may be set up in 101, 103, 105, 107 and 109 in the same way as the method 100, with the difference that the message 106 is generated 111 and/or sent 111 when in the readiness mode 109 it has been ascertained instead of the interruption of touching that a predefined time period 102 has elapsed (also referred to as running down of the time or running down of the time trigger). The alarm indication may then correspondingly indicate that the time period has elapsed in the readiness mode 109. The counting down of the predefined time period 201 or the ascertainment that the time period 201 has elapsed may be implemented for example by means of the time trigger, for example by means of a software-supported time trigger, which is for example activated by a clock of the mobile radio 102 and/or reads a time provided by the operating system.

In more general terms, the sending of an alarm 111 may take place when a predefined event is ascertained in the readiness mode 109. The alarm indication may then correspondingly indicate that the predefined event has occurred in the readiness mode 109. The predefined event may generally represent that the user 104 is no longer in control of the situation or needs help. The predefined event may for example be the interruption of touching or the running down of the time.

The time period 201 may for example have been or be set by the user 104 himself or herself, for example when the mobile radio is changed over to the readiness mode 109 and/or is already in the sleep mode 107. The input for setting the time period may for example take place by means of actuating (for example touching) the mobile radio 102.

The predefined event may however also comprise that an external device coupled to the mobile radio 102 (for example by radio) (also referred to as the external triggering device) is actuated, for example according to the arming criterion and/or some other actuation pattern. The external triggering device may for example be a wireless switch (for example a Bluetooth switch), a music player, an activity monitoring device (for example a health bracelet or health pin), a remote control, smartglasses or a smartwatch. This external triggering device may optionally use the mobile radio 102 for the transmission of the message 106. The communication between the mobile radio 102 and the external triggering device may for example take place by Bluetooth. Thus, for example, external operating buttons of a smartphone, a smartwatch or external triggers that can be integrated by Bluetooth or in some other way may be used for triggering the event.

Figure 3:
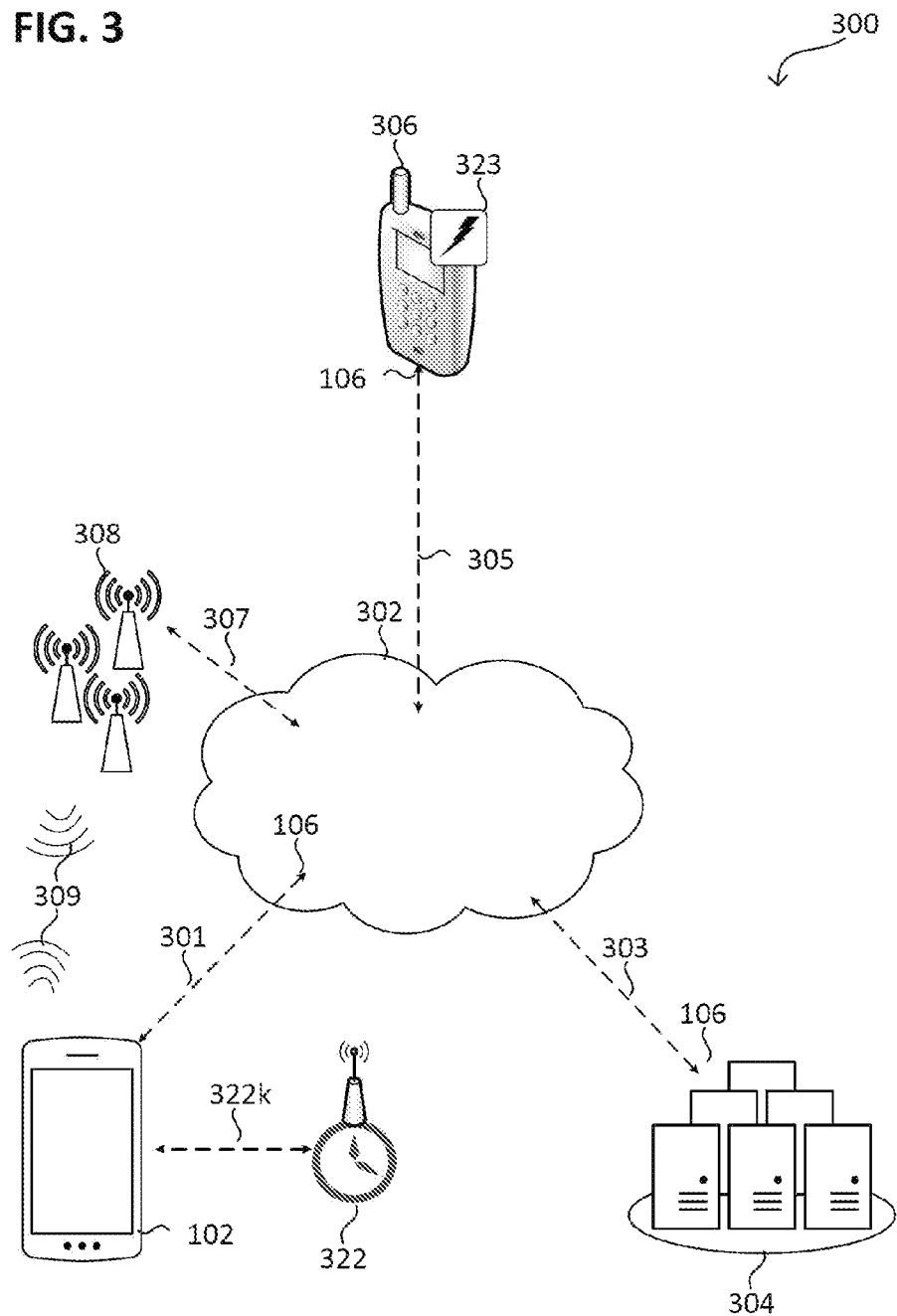

FIG. 3 illustrates a system 300 for carrying out the method 100 or 200 according to various embodiments in a schematic communication diagram.

The system 300 may have a connection to a network 302 (also referred to as the connection), for example an Internet connection. By means of the network 302, the component parts of the system 300 can be communicatively coupled to one another, for example be capable of exchanging information.

The network 302 may have a number of subnetworks, which are connected to one another. The network 302 may for example, differentiated by range, comprise or be formed by a local network 302 (for example a Local Area Network (LAN), a Wireless LAN (WLAN), or a Personal Area Network (PAN), such as for example a Wireless PAN (WPAN), such as for example a Bluetooth network) or a non-local network 302 (such as for example a Metropolitan Area Network (MAN), a Wide Area Network (WAN) or a Global Area Network (GAN)). The network 302 may for example, differentiated by transmission type, comprise or be formed by a radio network 302 (for example a mobile radio network) or a cable-bound network 302. The network 302 may for example also comprise or be formed by a cellular radio network 302 (for example a WLAN of the type IEEE 802.11 in ad-hoc mode, a Bluetooth network or some other cellular mobile radio network 302).

In the following text, for easier understanding, reference is made to an Internet connection, i.e. that the system 300 has or is part of a connection to the Internet 302 (World Wide Web of computer networks). What is described may however also apply analogously to other constellations or networks.

The system 300 may have the mobile radio 102. The mobile radio 102 may be set up to communicate 301 wirelessly (i.e. by radio) with the network 302, for example according to the wireless CP. Consequently, the message 106 can be transmitted to the network 302, for example according to the wireless CP.

The system 300 may also have a computer system 304, for example a server, computer or the like. The computer system 304 may be communicatively connected 303 to the network 302, for example according to a network CP. The message 106 may for example be addressed to the computer system 304 according to the wireless CP, and so it is transmitted to the computer system 304 by means of the network 302.

The system 300 may also have a receiver device 306, which is communicatively connected 305 to the network 302. The receiver device 306 may for example be a mobile device, for example another mobile radio, for example a pager, for example a laptop, or the like. Then, the receiver device 306 may be connected to the network 302 according to the or some other wireless CP. The receiver device 306 may however also be a stationary device, for example a television set, a smarthome device, a hard-wired 305 computer or the like. The receiver device 306 may also be connected 305 to the network 302 according to the or some other network CP. The system 300 may for example have a multiplicity of receiver devices 306. Each receiver device 306 may optionally have been or be registered by the system 300, for example by means of a database of the computer system 304.

The message 106 may optionally include an indication of the receiver device 306 (also referred to as an address indication), for example an identification of the receiver device 306. The computer system 304 may then be set up to extract the address indication from the message 106 and to transmit to the receiver device 306 the message 106, or at least its content (for example as a new message 106), according to the address indication.

The receiver device 306 may be set up to ascertain the location data by means of the message 106 and to output this together with the alarm indication 323 (also referred to as raising an alarm 323), for example visually and/or acoustically. As an alternative or in addition, however, the computer system 304 may be set up to extract the location data and the alarm indication and to transmit to the receiver device 306 a command (for example as a new message 106), which causes the receiver device 306 to raise the alarm 323. Raising the alarm 323 may for example involve displaying a map which has a marking according to the location indication. Optionally, the receiver device 306 may be set up to ascertain navigation data which represent a route to the location of the receiver device 306 according to the location indication, and to output it.

Optionally, the system 300 may be set up to initiate a communication connection between the receiver device 306 and the mobile radio 102, for example a voice connection. This can achieve the effect that a user of the receiver device 306 (also referred to as the recipient or security provider) can consult with the user 104.

If the system 300 optionally has a number of receiver devices 306, the computer system 304 may be set up to select one of these receiver devices 306, to which the message or the command is transmitted (also referred to as receiver selection). The receiver selection may for example take place on the basis of a respective location of each of the receiver devices 306, a respective availability of each of the receiver devices 306, a preference defined by the user 104 and/or the address indication. For example, the receiver device 306 that is closest to the mobile radio 102, that has the greatest preference, and/or that is identified as available may be selected.

The mobile radio 102 may have an application. The application may for example be a local application, for example be installed on the mobile radio 102 (for example is embedded in a non-volatile form in the operating system) and/or be run by it. As an alternative or in addition, the application may be a web application. The web application may for example be run on the computer system 304 and only its user interface shown on a web browser of the mobile radio 102 (for example analogous to remote access).

The application may be set up to communicate with the computer system 304 (for example on the application layer), for example for transmitting the message 106 and/or for calling up information (for example an update) or data from the database.

The system 300 optionally has the external triggering device 322, which for example is coupled 322k to the mobile radio 102 and/or the network 302. The system 300 optionally has one or more than one radio beacon 308 (also referred to as a beacon), which is connected 307 to the network 302 (for example cable-bound). The or each radio beacon 308 may for example be set up to wirelessly communicate 309 with the mobile radio 102, for example in order to transmit a position and/or an identification of the radio beacon 308 to the mobile radio 102 and/or in order to transmit the message 106 to the network 302 by means of the radio beacon 308.

The message 106 may on its way through the network (for example up to reception at the computer system 304 and/or the receiver device 306) optionally be transmitted according to various CPs. For example, the message 106 may be transmitted successively according to a Bluetooth CP, a TCP/IP-CP (Transmission Control Protocol/Internet CP), and again a Bluetooth CP.

In the system 300, one or more than one component may be omitted, depending on how the method is carried out, for example the radio beacon(s) 308, the computer system 304 and/or the triggering device 322.

Figure 4:
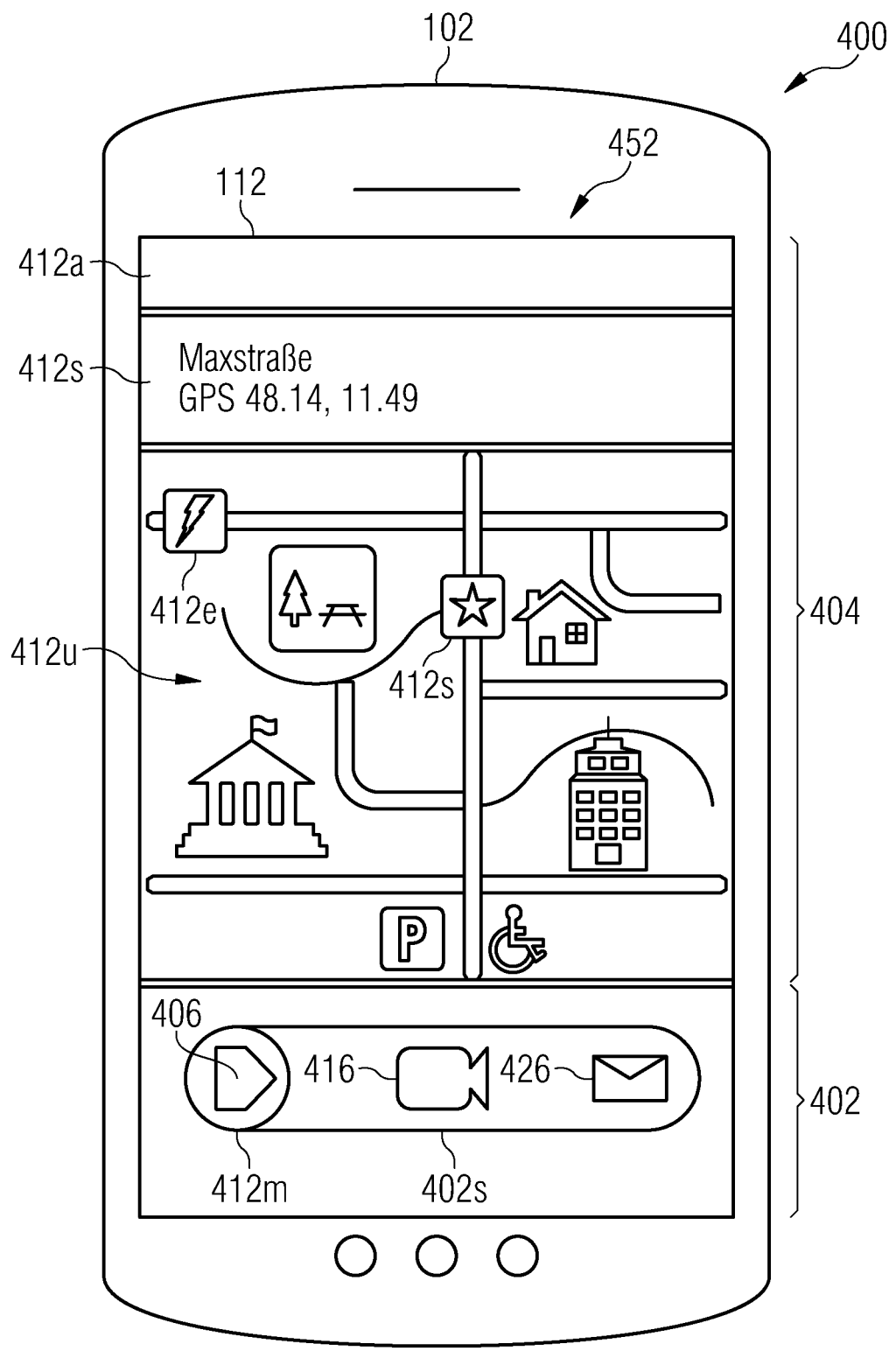

FIG. 4 illustrates a mobile radio 102, which runs an application 452 for carrying out the method 100 or 200 according to various embodiments, in a schematic plan view 400, for example of a visual output of the application by means of the display device 112 (or more generally a user interface 112) of the mobile radio 102. For easier understanding, reference is made here to a mobile radio 102 which implements the method 100 or 200 by means of the application 452. What is described may also apply analogously to a differently set up mobile radio 102 which is set up for carrying out the method 100 or 200.

The application 452 may have an interactive part 402 (for example occupying a first display-device subarea 402) and a reactive part 404 (for example occupying a second display-device subarea 404), which are displayed. The interactive part 402 may be set up to interact with the user 104. The application 452 may optionally provide a set of personal settings and/or inquiries, by means of which the user 104 can influence the functions of the application 452 and/or of the system 302 (also referred to hereinafter as conscious choice).

The application 452 may be set up to output and/or periodically update one or more than one of the following items of information (for example by means of the user interface 112)

- information about the mode 107, 109 in which the mobile radio 102 is being operated (also referred to as mode information);
- information 412s about the location indication (also referred to as location information 412s);
- information about the quality of the connection to the network 302;
- information 412e (also referred to as receiver device information) about one or more than one receiver device 306 (for example its location, availability and/or identification);
- information in relation to personal settings of the application;
- information (also referred to as recording information) about the touching recorded (for example its properties);
- information 412u (also referred to as environment information) about a nature of the spatial environment of the mobile radio 102 (for example a map, escape routes, etc.);
- notification 406 (also referred to as notification of touching) in relation to touching which would satisfy one or more than one touching criterion (for example a directional indication, a symbol or a marked path);
- notification about which or that the application is being run (for example the name of the application and/or a notification of activity); and/or
- information about the running down of the time trigger.

The reactive part 404 may for example have at least the receiver device information 412e, the environment information 412u and/or the location information 412s. The interactive part 402 may for example have at least the mode information and/or the notification of touching 412s. The notification of touching 412s may for example indicate one or more than one region of the touch sensor at which the touching 103b is intended to begin and/or end and/or along which the touching is intended to be altered (for example a trajectory).

The recording information, the mode information and/or the notification of touching may for example have been overlaid on one another. For example, a virtual marker 412s (for example a controller position) may be displayed, the color of which represents the mode information, the position of which represents the recording information and/or which has one or more than one symbol 406 (for example an arrow) representing the notification of touching and/or the mode information. Other symbols 416, 426 which represent the notification of touching and/or the mode information may also be displayed.

The location information 412s may for example include the coordinates and/or a name of the location, for example the street name, name of the locality, name of the region, etc. The receiver device information 412e and/or the location information 412s may for example have been or be overlaid with the environment information 412u.

The interactive part 402 may for example be represented in the lower quarter of the display device 112 of the mobile radio 102, for example in the form of a sliding controller 402s (also referred to as a slider), with the aid of which the user 104 can interact with the application 452, for example can activate and/or control one or more than one functionality of the application.

Instead of the sliding controller 402s, as an alternative or in addition one or more than one other physical operating element 402s (for example a button of the mobile radio 102) and/or a virtual operating element 402s (for example a navigation bar or a rotary knob) may be used, the actuation of which can for example be displayed by means of the display device 112 of the mobile radio 102 as feedback. The application 452 may evaluate the touching gestures of the user 104, which the operating system of the mobile radio 102 records and makes available by way of its programming interfaces. Should there be a change in the number of touching points that the operating system records or should the finger that is operating the sliding controller 402s be removed from the mobile radio 102, the application 452 can respond to this.

In the following text, to make understanding easier, reference is made to an operating element 402s in the form of a sliding controller 402s with a marker 412m. The same may also apply analogously to other forms and/or other configurations of the operating element 402s.

The sliding controller 402s may have a surface area on which the marker 412m can be displaced horizontally and/or vertically by means of touching gestures, as described more specifically later. The position of the marker fully to the left (or generally a first marker position) corresponds for example to 0% of the controller. The position of the marker fully to the right (more generally a second marker position) corresponds for example to 100% of the controller. The touching 103b of the sliding controller 402s may be recorded and/or read by the application and reported back by means of a positioning of the marker (for example changing of the marker position) at the location of the touching 103b. The region between the first marker position (for example at the left border of the area) and the current position of the marker may have been or be underlaid with a color in order to indicate the current mode 107, 109 of the mobile radio 102.

At various points of the area, the sliding controller 402s has symbols 406, 416, 426 (icons) which, depending on the position of the marker 412m, are grayed out (not activated) and/or highlighted (activated). In addition, the application 452 may respond differently depending on in which position the marker 412m is let go. If the touching of the sliding controller 402s is interrupted in the sleep mode 107, the marker may for example jump to the first marker position. In combination, these patterns of touching and feedback allow complex interaction of the user 104 with the mobile radio 102 (or its application 452) with just a single operating element, for example without expecting too much of the user 104 in a stressful situation.

The communication between the application 452 (also referred to as an app) and the computer system 304 (for example servers) may for example take place over the Internet 302. As an alternative or in addition, additional communication paths may have been or be provided, as described more specifically later, which are for example used if communication by means of the Internet 302 is restricted (for example blocked). For example, depending on programming interfaces provided by the operating system (for example iOS and/or Android), the sending of an alarm 111 may take place by means of an SMS and/or telephony, if communication in that way is possible. As an alternative or in addition, the sending of an alarm 111 may take place by means of Bluetooth.

At least some of the symbols 416, 426 may for example correspond to a position into which the marker is intended to be brought in order to activate (for example to start) a functionality of the application 452 and/or to satisfy a touching criterion. For example, the bringing of the marker 412m into the second marker position 426 may cause the sending of an alarm 111 to take place. For example, the bringing of the marker 412m into a third marker position 416 between the first and second marker positions (for example at approximately 50%) may cause a third sensor (for example a camera, for example a video camera) of the mobile radio 102 to be activated and/or audio data and/or image data to be recorded by means of it (also referred to as recording of the environment).

By means of touching the sliding controller 402s (i.e. active control), the mobile radio 102 can be changed over 105 between the sleep mode 107 and the readiness mode 109, as explained in more detail below. The reactive part 404 may optionally be changed over, depending on the mode or the respective functionality of the application 452, which the user 104 activates by way of the sliding controller 402s.

Figure 5:
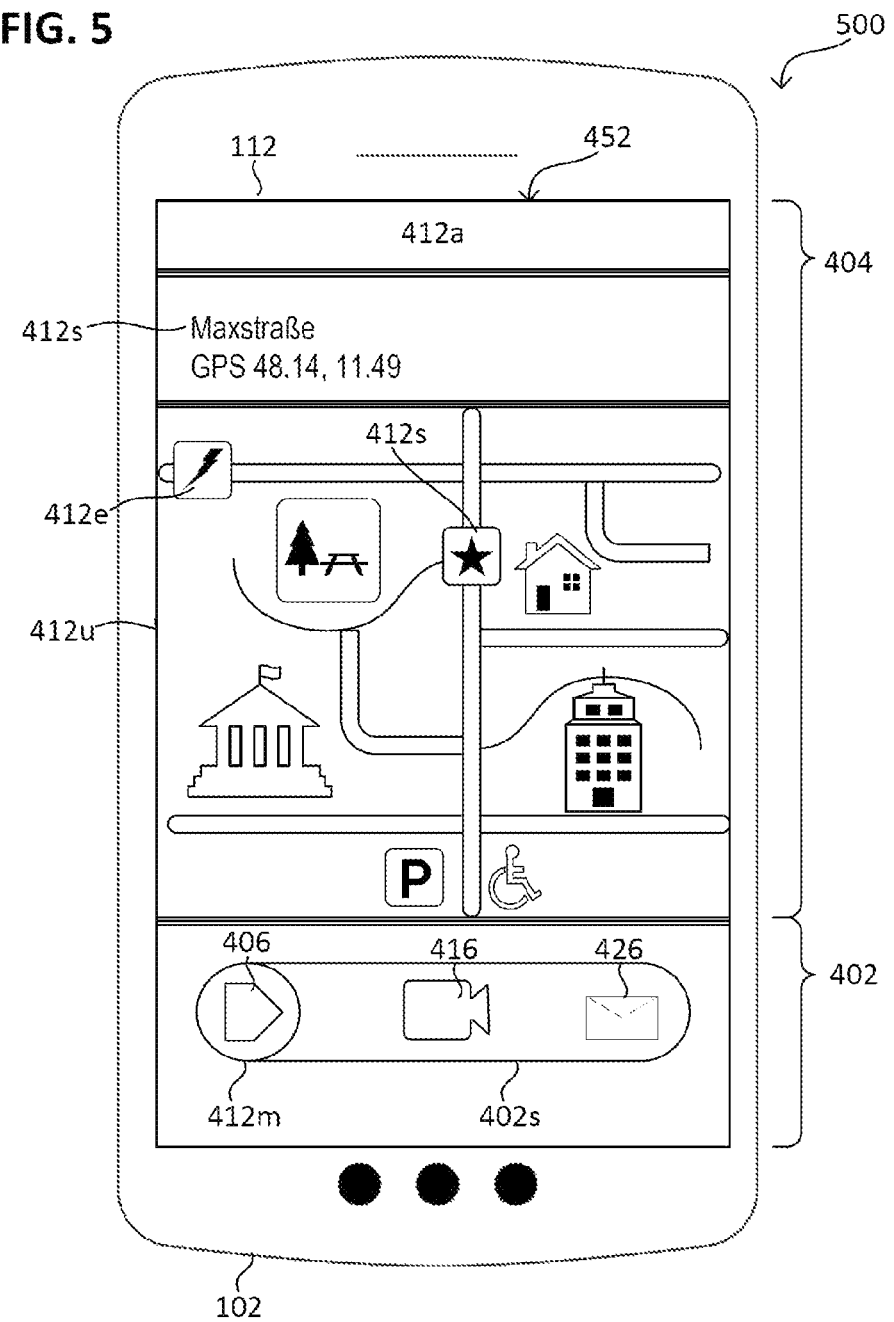

FIG. 5 illustrates a mobile radio 102 in the sleep mode 107 in a schematic plan view 500 analogous to the plan view 400. The sleep mode 107 may be the initial state into which the mobile radio 102 has been or is brought when the application 452 is started and/or is brought to the foreground. Without actuating the sliding controller 402s (for example displacing the marker 412m to the right), the sliding controller 402s may indicate that the mobile radio 102 is in the sleep mode 107. In the sleep mode 107, the marker 412 may for example be in the first marker position. The sliding controller 402s and/or the marker 412m may for example be varied 412s in its/their appearance (for example color, form and/or size), for example periodically (by way of illustration "breathe"), in order to indicate that the application is being run (for example as a notification of activity). The sliding controller 402s may optionally indicate that there is the possibility of instigating from the sleep mode 107 that a video recording (for video evidence) is started, for example by the marker 412m being displaced to a third marker position 416, and/or that the sending of an alarm 111 is carried out, for example by the marker 412m being displaced into the second marker position 426.

In the sleep mode 107, the location indication (for example including GPS coordinates, the street, the district and/or X-Y coordinates of the geo-data of the mobile radio 102) may be transmitted to the receiver device 306.

For the locating 101 (referred to for simplicity as location finding of the mobile radio 102), primarily the programming interfaces made available by the operating system may be used. Apart from location finding by GPS, these rely on WLAN topology and other techniques in order to be able to locate 101 the mobile radio 102 as exactly as possible. Optionally, signals from a Bluetooth radio beacon 308 in the vicinity of the mobile radio 102 may be recorded by the latter in order to ascertain the location of the mobile radio 102. For example, the application 452 may record data from its own radio beacons 308 of the system 300, which are for example arranged within a building in order to facilitate locating 101 in buildings. The position of a radio beacon 308 may for example have been or be stored by means of a database of the computer system 304 or be divulged by the radio beacon itself. The position of a radio beacon 308 may for example be ascertained by the mobile radio 102 (for example by the application 452) on the basis of the database. The data thus obtained may be combined with the data provided by the operating system, which makes it possible to ascertain the location of the mobile radio 102 with greater accuracy. The or each radio beacon 308 consequently facilitates the locating 101 and/or can optionally provide an additional communication path. In more general terms, the locating 101 may use commonly used location-finding standards (for example subsequently integrated or updated).

On the second display-device subarea 404 there may be displayed a map 412u, which signals to the user 104 that he or she has a connection to the system 300 and/or the receiver device 306 (by way of illustration, is "on the radar" of the corresponding helper), for example if he or she has authorized this by a conscious choice. As an alternative or in addition, a radio beacon 308 may signal (for example to the mobile radio 102) that the mobile radio 102 is in an environment monitored by the system 300, for example even if its connection to the network 302 is restricted or interrupted (for example without an Internet connection). The sending of an alarm 111 may take place for example by means of secured areas (so-called security areas) and can consequently take place for example even without a connection of the mobile radio 102 to the network 302, as described in more detail later.

On the second display-device subarea 404 it may optionally be displayed that the location indication 412s has been transmitted to the receiver device 306 and/or that the receiver device 306 is available. For example, the receiver device 306 may be set up to identify itself as available and/or not available by user input, for example in response to receiving the location indication. By way of illustration, the security provider can in this way become aware where the user 104 is located, and the user 104 can become aware that his or her location is known to the security provider. This can give the user 104 a feeling of self-determination and calm, and thus prevent wrong decisions and/or stress.

Figure 6:
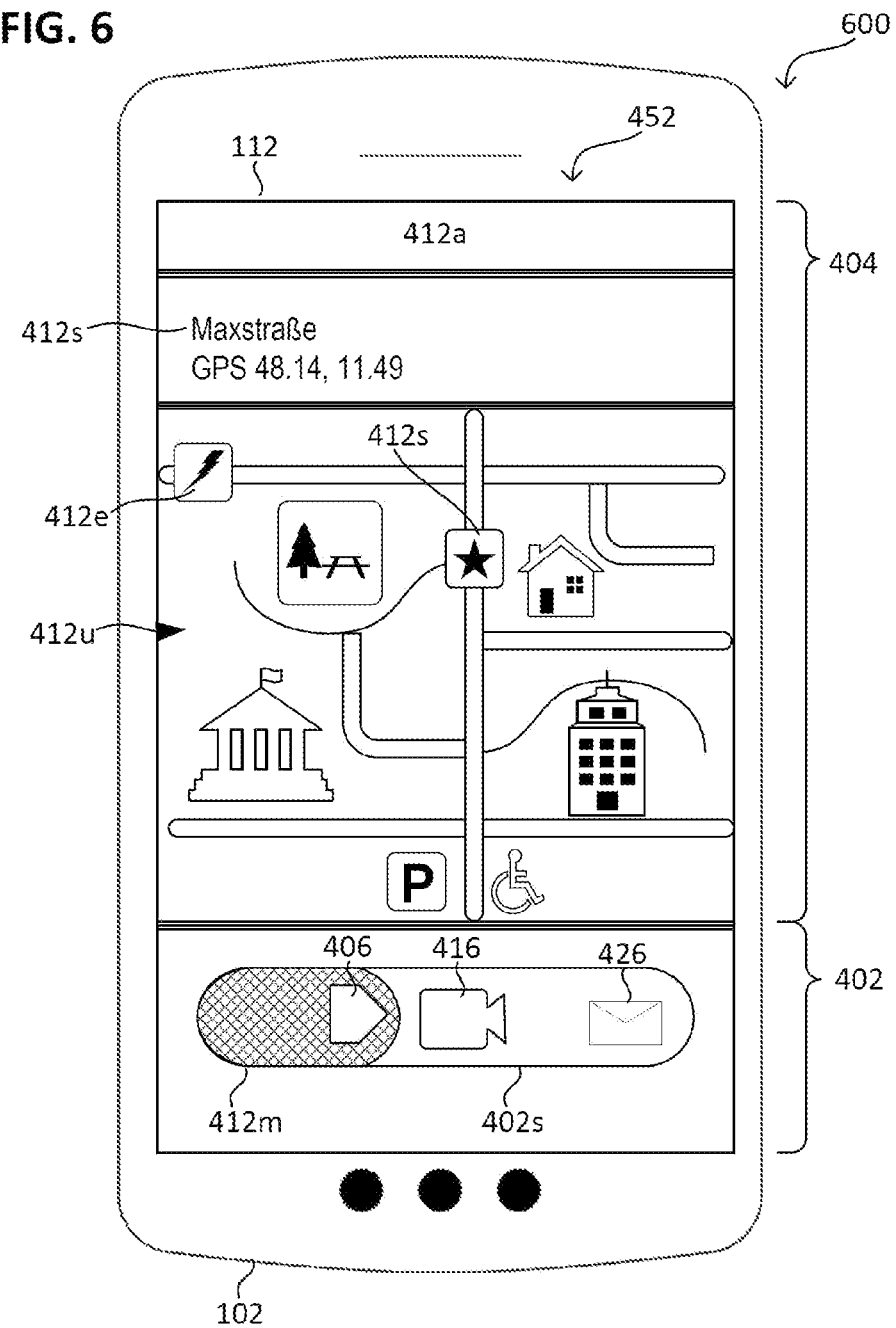

FIG. 6 illustrates a mobile radio 102 in the readiness mode 109 in a schematic plan view 600 analogous to the plan view

400. The marker 412*m* can trace the touching by the user 104, i.e. its appearance (for example position, color and/or form) can represent the recording information. In this way, feedback to the user 104, that and/or how his or her touching has been recorded, can take place directly. For arming 105 the mobile radio 102, the user 104 may displace the marker 412*m* by means of touching (i.e. actively), for example to the right. In this way, the marker 412*m* can be positioned alongside the first marker position. In response to the arming 105, optionally feedback can be given by the mobile radio 102. For example, the marker 412*m* may be changed in its appearance (for example color) and/or the mobile radio 102 may give haptic feedback, for example by means of vibration.

As long as the user 104 maintains touching contact in the readiness mode 109 with the sliding controller 402*s* (for example its marker), sending of an alarm 111 cannot take place. In response to it having been recorded in the readiness mode 109 that the user 104 (for example his or her finger) loses touching contact with the sliding controller 402*s* (for example due to action by the user or someone else), the sending of an alarm 111 can take place. This mechanism achieves the effect that it is made more difficult for a third party (for example an assailant) to take the mobile radio 102 from the user 104 without touching contact being ended or to carry out the disarming 105 without having the consent of the user 104. For example, a third party would have to immediately and forcibly keep the finger of the user 104 on the exact position in order to prevent the sending of an alarm 111. The finger of the user 104 would then have to be forcibly returned to the first marker position.

Optionally, the marker 412*m* may automatically indicate that the sending of an alarm 111 has taken place, for example by it being displaced further in the direction of the second marker position 426 and/or changed in its appearance. The disarming 105 of the mobile radio 102 may for example only take place by the marker 412*m* being returned by means of touching in the direction of the first marker position (for example to the left).

In more general terms, a first pattern of touching (for example a swiping gesture to the right) may trigger arming 105 and an opposite (for example inverted) second pattern of touching may trigger disarming 105. However, the second pattern of touching does not necessarily have to be opposite to the first pattern of touching. For example, as an alternative or in addition, the disarming 105 may only take place with the input of an authentication code (i.e. that, inter alia, the second pattern of touching represents the authentication code).

As long as the finger of the user 104 remains touching the sliding controller 402*s*, the mobile radio 102 can stay in the readiness mode 109 without carrying out the sending of an alarm 111. In this way, the user 104 can be certain that he or she remains in full control of his or her mobile radio 102 as long as he or she is in touching contact with it. Should the touching contact be interrupted, it may then have been desired by the user. Otherwise, if there is a loss of contact with the sliding controller 402*s*, the sending of an alarm 111 can always take place automatically, except for when the mobile radio 102 is in the sleep mode 107. In order to disarm 105 the mobile radio 102 (i.e. change it over to the sleep mode 107), it may for example be required that the user 104 displaces the sliding controller 402*s* again completely to the left without losing contact with the sliding controller 402*s*. The actuation of the sliding controller 402*s* (for example pushing the marker 412*m* back and forth) for arming 105 and disarming 105 the mobile radio 102 can optionally be acknowledged in each case by a brief vibration by the mobile radio 102. The user 104 consequently receives haptic feedback that the application 452 is still responding.

Figure 7:
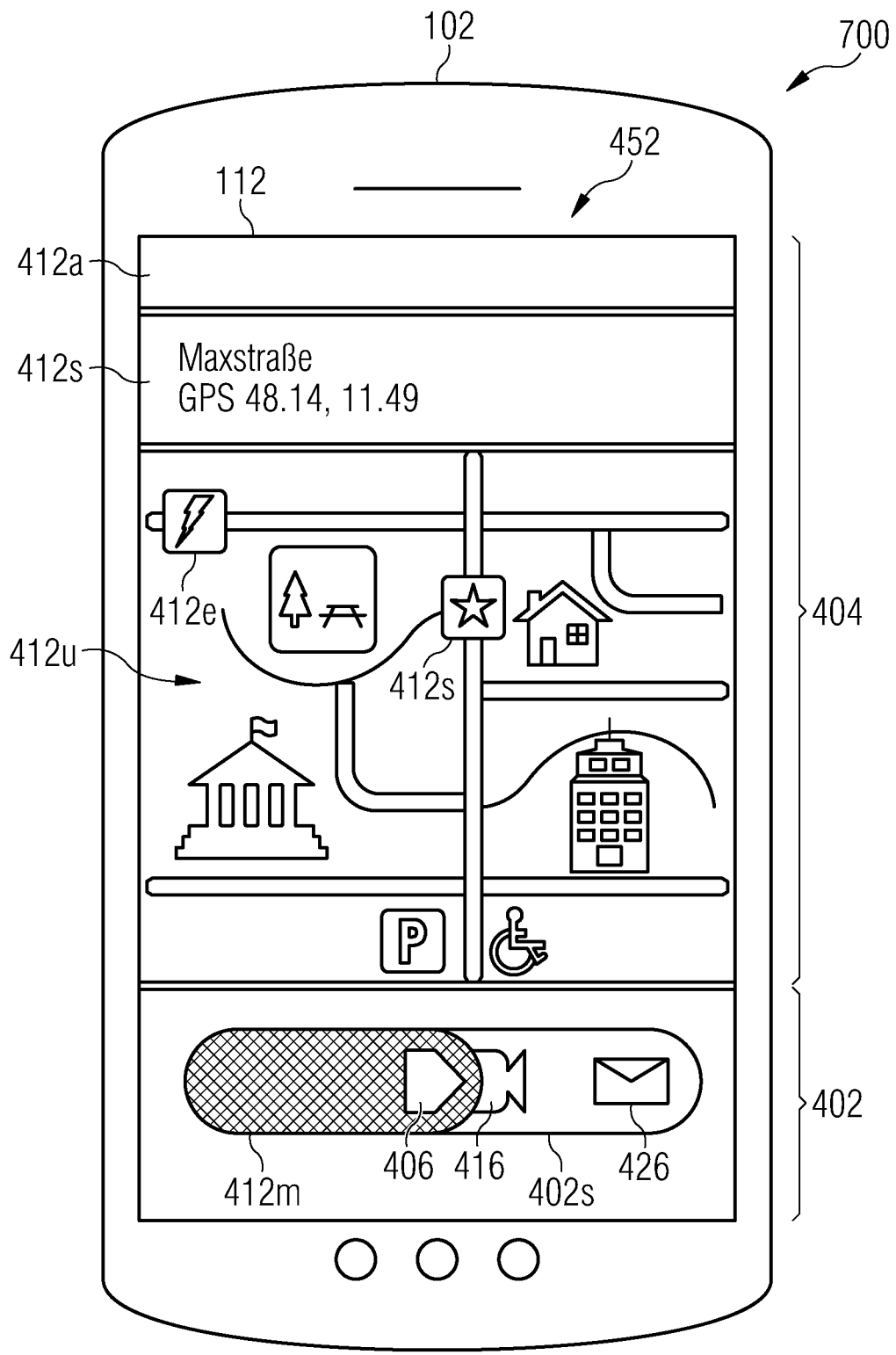

FIG. 7 illustrates a mobile radio 102 in a schematic plan view 700 analogous to the plan view 400 when the mobile radio 102 is in the readiness mode 109. Optionally, the method 100 or 200 may involve that environment data, for example audio data and/or image data, are recorded, for example by means of the third sensor of the mobile radio (also referred to as recording of the environment). The third sensor may comprise a camera and/or a microphone. The image data may for example comprise or be formed by photo data and/or video data.

The recording of the environment may take place if it has been ascertained in the readiness mode 109 that the touching satisfies a third predefined criterion (also referred to as the recording criterion). The recording criterion may for example be satisfied when the marker is drawn to the third marker position 416 and/or to a camera symbol 416 of the sliding controller 402*s*.

Instead of being permanently monitored, the user 104 can be given the conscious choice of being able to guard himself or herself by means of the mobile radio 102, for example by means of the video camera of the mobile radio 102. For self-protection, a potential assailant can thus be deterred, while its actions are at the same time recorded by recording of the environment (for example video and/or audio recording). This can improve monitoring in comparison with static surveillance and security measures. This can help to prevent unguarded areas becoming a favored target for third parties. The recordings of the audio and/or video data may optionally serve for preserving evidence after a crime has been committed. To provide protection from misuse and violent removal of the recorded evidence, the recordings may, depending on network coverage, be stored locally and/or transmitted to the computer system 304 (for example external servers) and stored there.

In sleep mode 107 (for example when the application 452 is inactive in the background or has been ended), no recording of the environment can take place by the application 452 (i.e. no audio and/or video data can be recorded). Depending on the operating system, the recording of the environment may only be possible with the application 452 running in the foreground and/or take place automatically as soon as the arming 105 by the applicant 104 takes place. Once started, the recording of the environment may optionally also be continued when the mobile radio 102 is no longer in contact with the user 104, for example if the user 104 is no longer touching the sliding controller 112*m*.

If the application 452 has been started by the user 104 (for example in the foreground or visibly in the background, for example as a daemon), the location of the mobile radio 102 can be read and/or periodically updated by the application 452 (by way of illustration, logged), for example in a way similar to or on the basis of map navigation or a map navigation application.

The recording of the environment may for example involve linking the environment data (for example image and/or audio data) with the location indication (for example geo-data).

For example, the environment data may be geo-referenced. The environment data may be stored in the data memory of the mobile radio 102. As an alternative or in addition, the environment data may be transmitted externally, for example in a number of data packets, according to the wireless CP, for example to a cloud memory of the computer system 304 assigned to the application 452, and be stored there.

The environment data stored externally from the mobile radio 102 may be made accessible to the user 104 by means of the application 452 or in some other way, for example for a defined fixed period of time (also referred to as the accessibility time). The user 104 of the mobile radio 102 may for his or her own protection be given the conscious choice of not being able to erase the stored video material (for example for the accessibility time), in order in this way not to be susceptible to blackmail by third parties. The environment data may be automatically erased after some other defined fixed period of time, for example by the computer system 304. Should the environment data contain relevant data for a prosecution of the third party under criminal law, the user 104 can be given the conscious choice of downloading the material from the cloud memory of the computer system 304 within the accessibility time to the mobile radio 102 and/or a cloud memory of the user 104 and thereby have it freely available. The meta data (for example length, resolution, etc.) of the environment data and/or the location indication may for example be stored in an anonymized form.

The wireless CP used can assist a transmission of the location indication and/or the environment data of a few seconds in length by means of sequential data packets. This achieves the effect that individual interruptions when there is a poor communication connection or when there is intervention by the third party cannot compromise the complete recording. For the assignment of the data packets, the computer system 304 may just store a user identification (for example a bijective 64-character-long string) that does not allow the personal identity of the user 104 to be traced. If communication with a public (for example state) emergency number (for example with the police) is intended, it may optionally be required that the mobile radio number of the mobile radio 102 has been validated by the application 452. In more general terms, some other public (for example state) or private emergency contact may be used instead of the emergency number.

The computer system 304 may however remain free from indications of the mobile radio number of the mobile radio 102. As an alternative or in addition, the mobile radio number may not be transmitted together with the user identification to the computer system 304. The user 104 may optionally provide his or her own personal information to the application 452, for example his or her name and photo, in order to facilitate identification by the security provider.

If the sliding controller 402s has exceeded a certain activation threshold by displacing the marker 412m to the right (for example approximately in the middle of the sliding controller 402s), the recording of the environment may be started. The recording of the environment can be ended as soon as the sliding controller 402s has been displaced to the left below the activation threshold again. During this, the mobile radio 102 may remain the whole time in the readiness mode 109, even if the recording of the environment is ended.

In order to get back into the sleep mode 107 from the activated recording of the environment, it may be required, as described above, to displace the marker 412m into the first marker position again without losing touching contact with the marker 412m. In more general terms, the disarming criterion may be satisfied when the marker 412m has been brought into the first marker position.

In order that, for sequentially satisfying the arming criterion and the recording criterion, the risk of interrupting touching (i.e. the loss of touching contact) is reduced, the respective criteria may be set up in such a way that they can be satisfied by means of touching that can be continued and/or is not opposite. Consequently, starting from activated recording of the environment, the user 104 may displace the marker 412m still further to the right, in order to manually trigger the sending of an alarm 111, or to the left, in order to end the recording of the environment or change over to the sleep mode 107. Letting go of the marker 412m during the recording of the environment can trigger the sending of an alarm 111.

During the recording of the environment, the environment data may optionally be mapped in segments by a (for example cryptographic) hash function (by way of illustration, "hashed") and/or stored on a blockchain, which achieves the effect that they are clearly verified in time. The blockchain may provide a continuously extendable list of data records, known as "blocks", which are linked together in a chain by means of a cryptographic method (for example by means of the hash function). The erasing of the environment data without leaving traces can in this way be made more difficult or impossible for the operator of the computer system 304. For example, a logic may be provided, set up to form environment data, including the associated position indication, and to save the map thereof generated by means of the hash function on one of the blockchains.

For each data packet of the mobile radio 102 received by the computer system 304, a checksum may be calculated and transmitted together with the user identification (for example a bijective identification indication of the user 104) for further data transmission to an external service provider, which can make auditable logging available. This achieves the effect that even the operator of the computer system 304 and/or the application 452 cannot manipulate the environment data unnoticed, and consequently increases security. A blockchain may be used for distributed logging, since a wider distribution of the data makes it more difficult for it to be compromised by third parties. The computer system 304 can make log data available via a programming interface, and so the environment data can for example be stored by a non-government organization.

Figure 8:
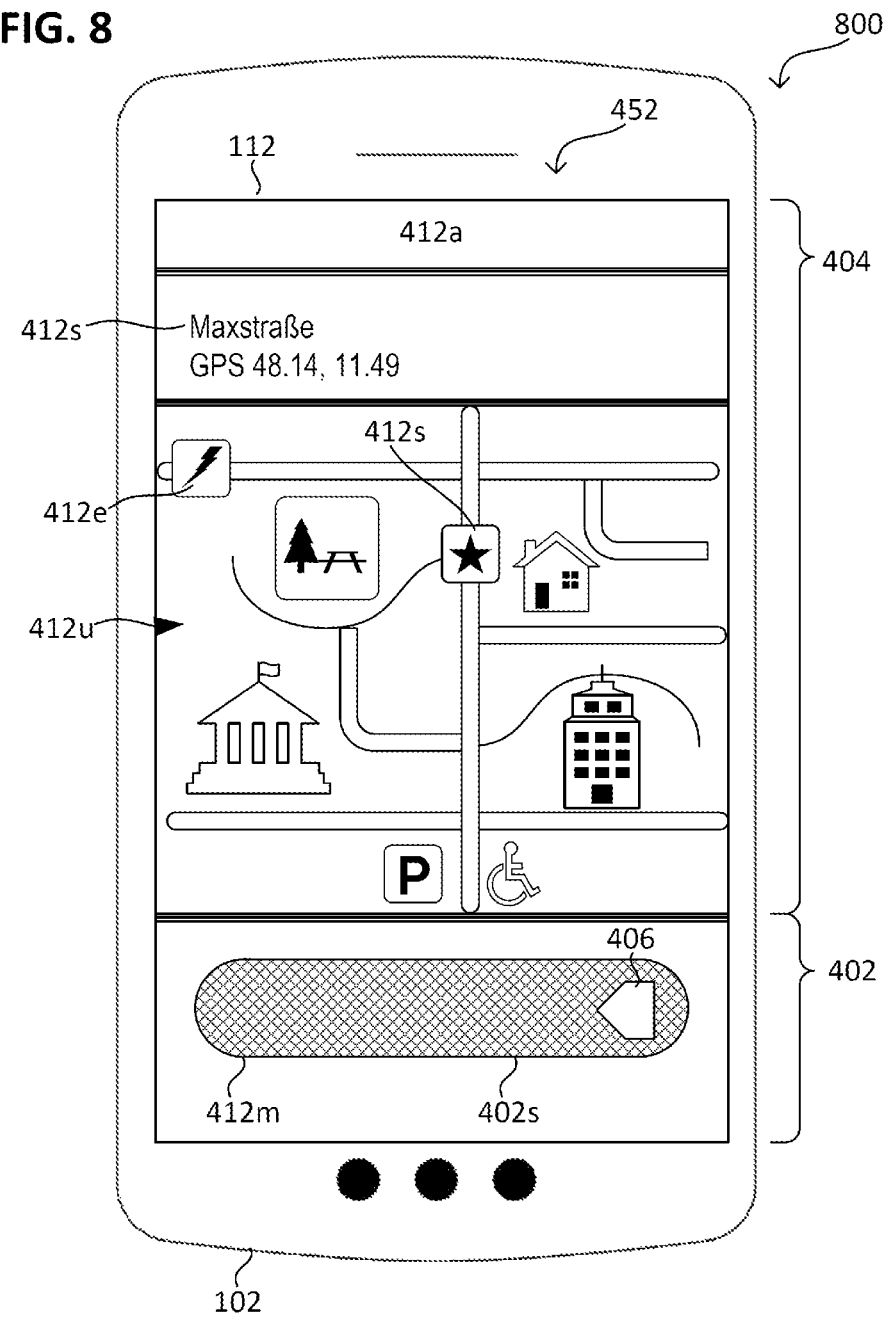

FIG. 8 illustrates a mobile radio 102 in the readiness mode 109 in a schematic plan view 800 analogous to the plan view 400, when the sending of an alarm 111 takes place. Should the user 104 be in a situation in which he or she requires assistance, he or she may as an alternative or in addition to the recording of the environment manually trigger the sending of an alarm 111, i.e., by way of illustration, an active call for help. The sending of an alarm 111 may for example be triggered by the marker 412m being let go or displaced into the second marker position. Optionally, the sending of an alarm 111 may take place if it has been ascertained by the mobile radio 102 that the external triggering device 322 has been actuated over a defined number of repetitions.

The sending of an alarm 111 may involve transmitting the location indication to the receiver device 306. The security provider can in this way be informed specifically and quickly to provide assistance (for example security) for the user 104 without losing time on location finding or clarifying responsibilities. The user 104 can optionally have been or be provided the conscious choice of storing additional personal data (such as for example a photo of himself or herself), which are transmitted together with the location indication to the receiver device 306 in order to allow the user 104 a more specific search on the spot.

Optionally, each receiver device 306 may be assigned at least one geographical area of responsibility (by way of illustration, its effective range of assistance), for example on the basis of its location (for example the geo-position). The area of responsibility (for example its contour) may for example have been or be represented by means of a geo-fence. The ascertainment of the area of responsibility and/or the geo-fence may for example take place by means of the computer system 304. A (for example virtual) boundary for a geographical (for example real) area may be understood as a geo-fence. The geographical area may be spatially two-dimensional or three-dimensional. The geo-fence may be implemented on the basis of a geo-locating system, by data which describe the position, orientation and/or form of the virtual boundary in a two-dimensional or three-dimensional form being provided. The geo-fence may for example be ascertained by means of polygons by using geo-coordinates. The area delimited by the geo-fence (also referred to as the geo-fenced area) may for example be the virtual equivalent of a real area of responsibility. The geo-fence and/or the geo-fenced area may for example have been or be stored and/or defined by means of the GeoJSON format or some other geo-marking format.

The message 106 may then be transmitted at least to the or those receiver device(s) 306 that is/are assigned to the area of responsibility in which the location of the mobile radio 102 lies. The computer system 304 can ascertain on the basis of the location indication transmitted by means of the message 106 the corresponding area of responsibility, also ascertain the receiver device 306 identified as available nearest to it within the area of responsibility and also inform the mobile radio 102 about this receiver device. If no area of responsibility is assigned to the location of the mobile radio 102, the emergency contact (for example the police) may optionally be alerted as a fallback. For the locating 101 of the mobile radio 102, generally the coordinates made available by the operating system of the mobile radio 102 can be used (for example geo-position via GPS, radio beacons and other location-finding techniques). For the locating 101 within buildings, the locating 101 may additionally involve using a multiplicity of radio beacons 308 set up for this, as described more specifically later.

The transition between different areas of responsibility can be periodically ascertained by means of the computer system 304 and/or displayed to the user 104. The user 104 can consequently see at any time which security providers are available and responsible at his or her geo-position and can decide himself or herself whether he or she wishes to request their help.

Each receiver device 306 registered in the system 300 may optionally have been or be verified by means of the computer system 304. The or each registered and verified receiver device 306 may for example be displayed by the mobile radio 102 without further preconditions, for example by means of the application 452. Optionally, the user 104 may be provided with the conscious choice of individually deselecting (also referred to as opting out) or preferring (opting in), for example marking as a favorite, one or more than one registered and/or verified receiver device 306. This achieves the effect for example that a less trustworthy security provider is not called for help first.

The user 104 can in this way be provided with the conscious choice of deciding to which receiver device 306 the message 106 is to be transmitted or in which sequence the message 106 is to be transmitted to a number of receiver devices 306. As an alternative or in addition, the user 104 may be provided with the conscious choice of transmitting the message 106 to a receiver device not registered in the system 300 (also referred to as an unregistered receiver device). By way of illustration, the user 104 may choose a security provider of its own. Optionally, the conscious choice may involve assigning an area of responsibility to the unregistered receiver device 306. Optionally, mutual authorization of the mobile radio 102 and the unregistered receiver device may take place. This achieves the effect that the security provider of the unregistered receiver device is also aware that, and by whom, it is being called to help. The message 106 is for example only transmitted to the unregistered receiver device when it is available and within the area of responsibility assigned to it.

Furthermore, the computer system 304 or a corresponding application (also referred to as the receiver device application) which makes it possible to change over the corresponding (registered or unregistered) receiver device between available and not available and/or to transmit its location to the computer system 304, may have been or be provided. The receiver device application may, by way of illustration, be the counterpart of the application 452, and implement the mechanism described herein on the receiver device 306.

For example, the computer system 304 may ascertain the availability (for example reachability) and/or the location of the receiver device 306 by means of the receiver device application that is being run on the receiver device. As an alternative or in addition, the receiver device application may transmit to the computer system 304 and/or periodically update the availability (for example reachability) and/or the location of the receiver device 306.

If a receiver device 306 is not reached by the message 106 or its connection to the network 302 was interrupted, an alarm may be sent 111 to the emergency contact as a fallback. In the case of a security-provider emergency contact, this step only takes place if no receiver device 306 assigned to the area of availability in which the mobile radio 102 is situated responds, or none is available in the area of availability. If at least one receiver device 306 can be reached, the sending of an alarm 111 may take place, by a push message 106 being sent to all of the receiver devices 306 assigned to the area of availability. This achieves the effect that at least one helper has an Internet connection and can receive the alarm. The sending of an alarm 111 may as an alternative or in addition take place by an SMS message 106 (for example if there is an unsuccessful push message 106 and/or for the purpose of redundancy).

A push message 106 may for example be a message addressed to the application 452 (for example assigned to the user identification), the content of which is displayed in response to the reception by the device 102, 306 that receives the push message 106, for example irrespective of which application(s) is/are being run by the operating system in the foreground at this moment. The content of the push message 106 may be transferred from the application 452 to the operating system (by means of a programming interface), with the operating system taking over the display of the information.

Optionally, in the selection of the receiver, the receiver device 306 that is at the smallest spatial distance (by GPS, Bluetooth, indoor radio beacons and outdoor radio beacons) from the mobile radio 102 may be selected. Should this receiver device 306 not be available or reachable or not respond to the message 106 for some other reason, the message may be automatically transmitted to the next receiver device 306. If no receiver device 306 that responds to the message 106 can be found in this sequence, an alarm may be sent 111 to the emergency contact as a fallback.

If the sending of an alarm 111 has been carried out, the disarming criterion may optionally be modified (also referred to as an extended disarming criterion). For example, the extended disarming criterion may be satisfied when, as an alternative or in addition to the pattern of touching described above (for example a touching gesture), a user input takes place, for example by means of touching the mobile radio 102. By means of the user input, for example, authorization of the user 104 may take place (also referred to as user authorization). By way of illustration, the disarming 105 may only be carried out if the user 104 is authorized, for example by means of a code.

Figure 9:
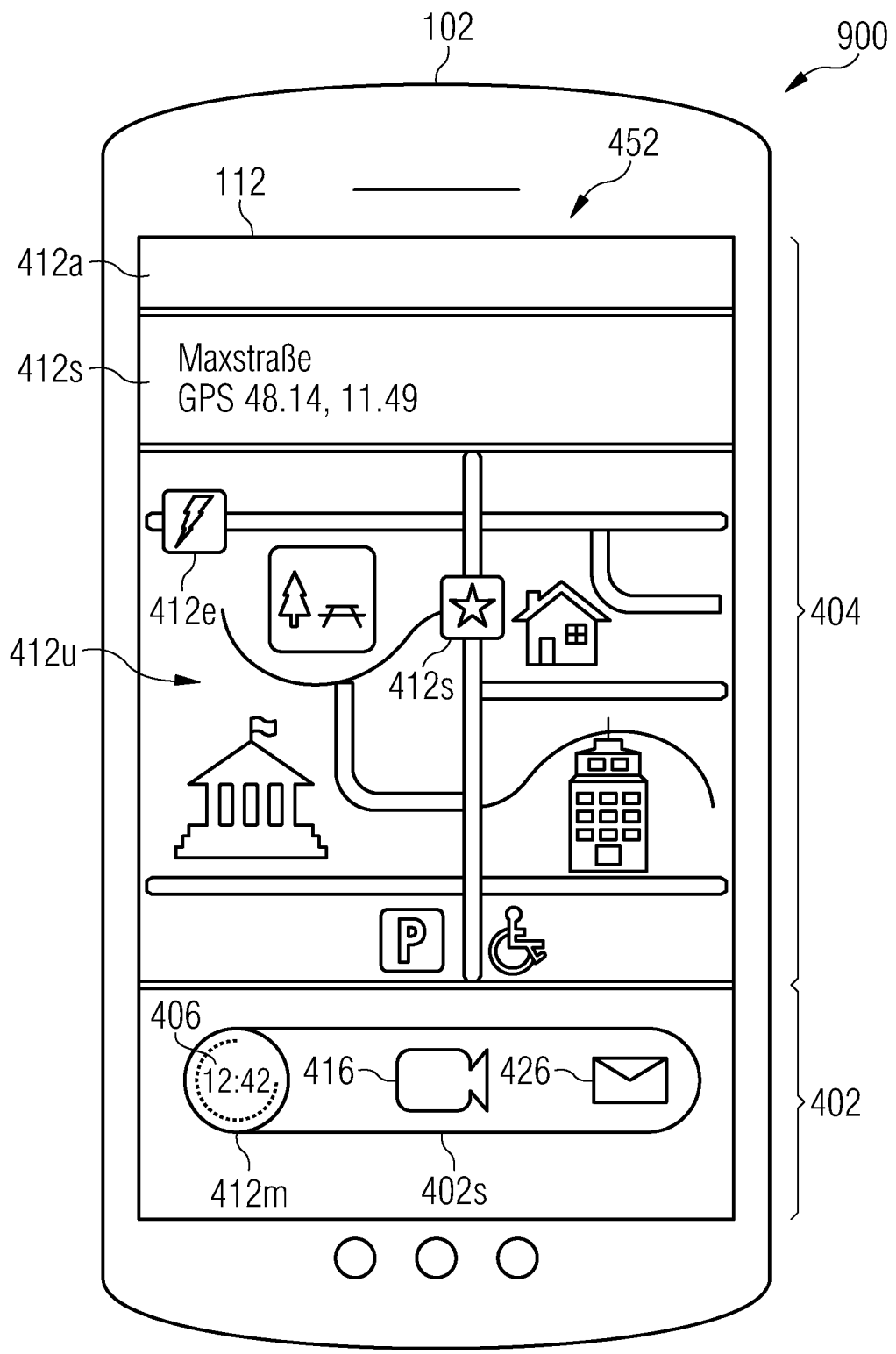

FIG. 9 illustrates a mobile radio 102 in a schematic plan view 900 analogous to the plan view 400, when the mobile radio 102 is in the readiness mode 109.

For the case where the user 104 has the impression of potentially losing control over his or her actions (for example as a result of knockout drops being taken), he or she may have been or be provided with the conscious choice of indicating the time period 201 (also referred to as the timer), i.e. activating the time switch, when activating the readiness mode 109. For example, the arming criterion may be satisfied when a user input that indicates the time period 201 takes place. For example, the application 452 may offer a series of time periods from which the user 104 selects the time period 201. Furthermore, there may be provided a conscious choice by means of which, with an activated time switch, it can be prevented that the time period 201 runs down, for example by it being extended or the disarming 105 being carried out. The disarming 105 may for example only be carried out when the extended disarming criterion is satisfied.

This mechanism makes it possible also to carry out the sending of an alarm 111 when control of the situation has been lost in an unforeseen way. This may be the case for example when so-called "knockout drops" are taken.

By way of illustration, a timer which automatically triggers the sending of an alarm 111 after a personally defined time period (for example 2, 5 or 10 minutes) may be activated. The symbol 406 of the marker 412*m* may for example indicate how long there is until the time period 201 has elapsed. If the user 104 does not stop the timer, notification that the sending of an alarm 111 is imminent can be actively given shortly before it runs down by means of the mobile radio 102 vibrating, by means of a call or a push message 106. Should the user 104 not respond to this, the sending of an alarm 111 is carried out. If the user's situation has improved and he or she maintains or regains control of the situation, he or she can carry out the disarming 105, for example by he or she authorizing stopping of the timer.

Figure 10:
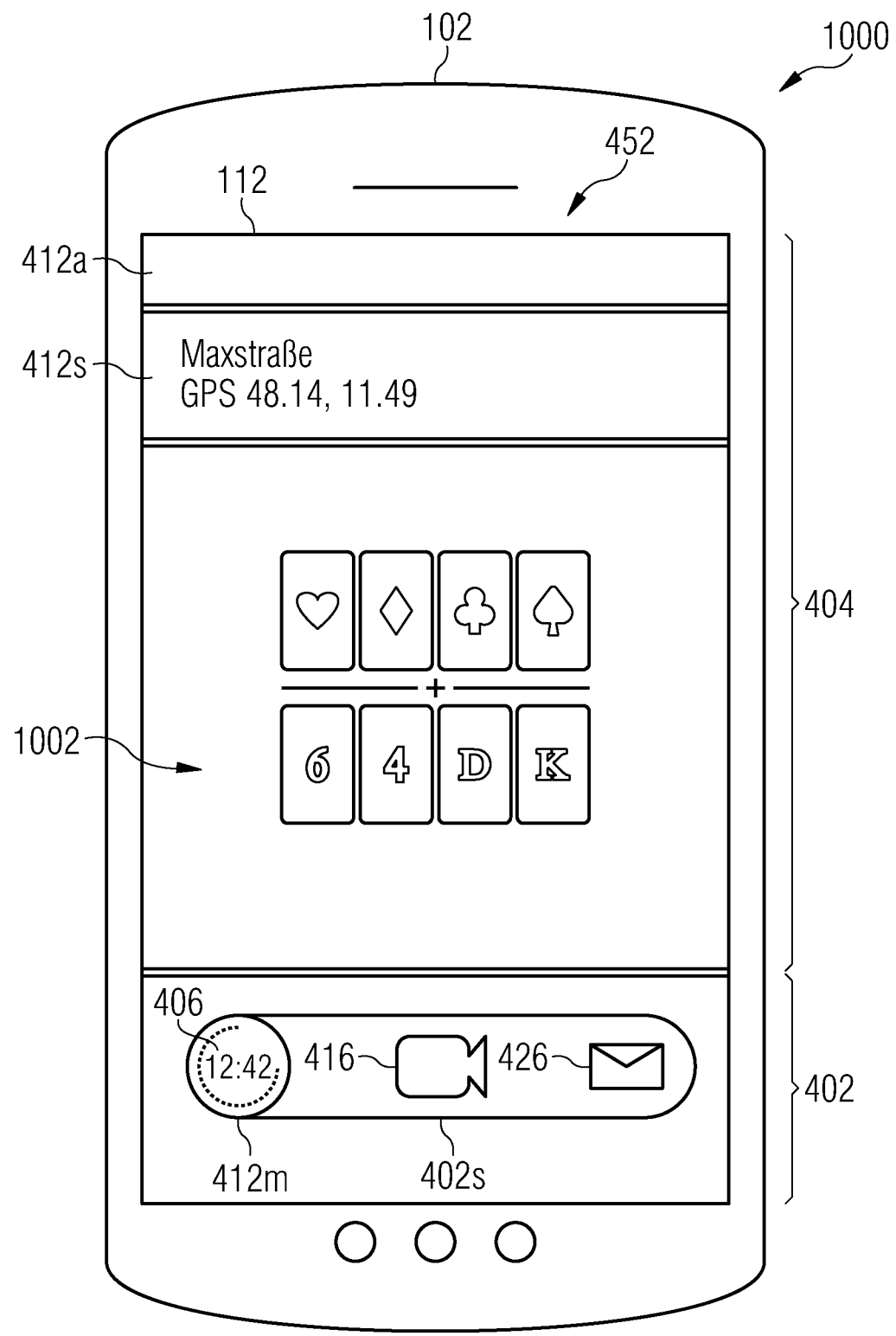

FIG. 10 illustrates a mobile radio 102 in the readiness mode 109 in a schematic plan view 1000 analogous to the plan view 400, when the mobile radio 102 asks for a user input to satisfy the (extended) disarming criterion, with which the user 104 is authorized. In response to satisfying the disarming criterion, for example the disarming 105 may be carried out, for example the timer may be stopped. In order to satisfy the disarming criterion, the user 104 may for example input a multi-digit (for example four-digit) numerical code defined in advance by him or her and/or enter the solution to a (for example image-based) task 1002 displayed to him or her. The task 1002 may for example be that of selecting at least twice in succession an object that is in each case known to him or her (for example a picture) from four selection possibilities. If the input is correct, the user 104 can be considered authorized.

An example of an image-based task 1002 may comprise correctly entering a playing card known to the user 104 of a French deck of cards for authorization. The task 1002 may for example comprise selecting from a first row of displayed fields the suit of the known playing card and selecting from a second row of displayed fields the value of the known playing card. Which suit/value is displayed in which field is arbitrary and is decided in each case at random.

For example, a probability of choosing by chance a combination of two times 1 out of 4 selection possibilities is approximately 6.25%. The corresponding chance of it not happening is approximately 93.75%.

Figure 11:
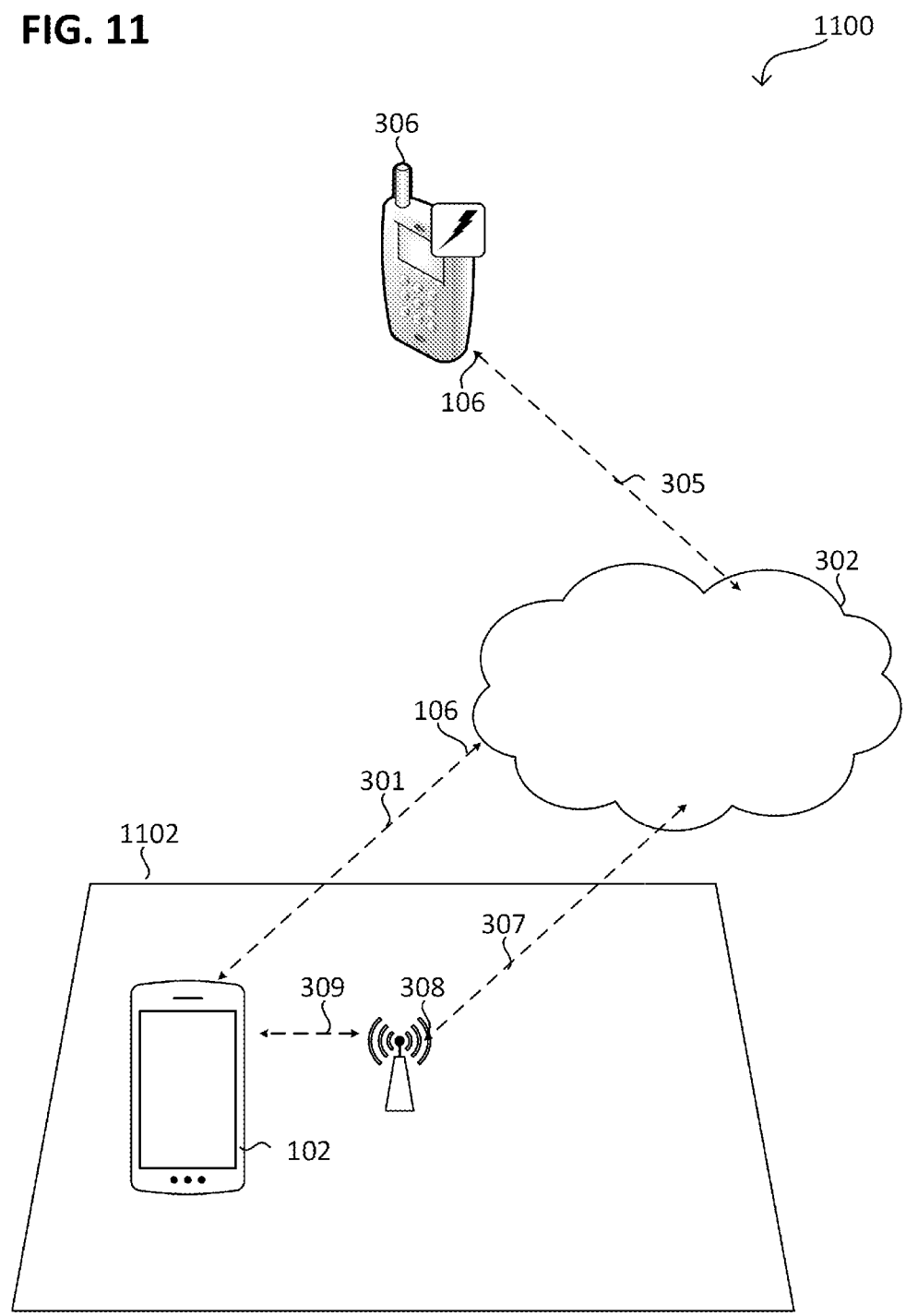

FIG. 11 illustrates a system 1100, for example the system 300, for carrying out the method 100 or 200 according to various embodiments in a schematic communication diagram. The system 1100 may have a radio beacon 308, which is arranged in an area of availability 1102 and the signal of which covers the area of availability 1102 (then also referred to as the security area). The sending of an alarm 111 may take place as soon as the radio beacon 308 is ascertained by the mobile radio 102 (for example it comes within the range of the radio beacon 308).

For example, the security area 1102 may comprise the entry door to a building, which along with the physical protection provided by a helper is additionally protected by a digital lock. The message 106 may be transmitted to the receiver device 306 (for example the corresponding member of security personnel) as soon as there is in the security area 1102 a user 104 whose mobile radio 102 is for example in the readiness mode, for example is counting down a still active time switch. The sending of an alarm 111 may for example take place when the mobile radio 102 has recorded the presence of the radio beacon 308. The user 104 is consequently provided with the conscious choice of transforming the mobile radio 102 into an alarm device, which acts like a store security tag and sounds an alarm as soon as someone attempts to cross the security zone with the mobile radio 102.

The radio beacon 308 may be a radio beacon which is permanently connected to the building and for example is supplied with energy by cable. As an alternative or in addition, the radio beacon may be a mobile radio beacon which has a battery for its energy supply.

Figure 12:
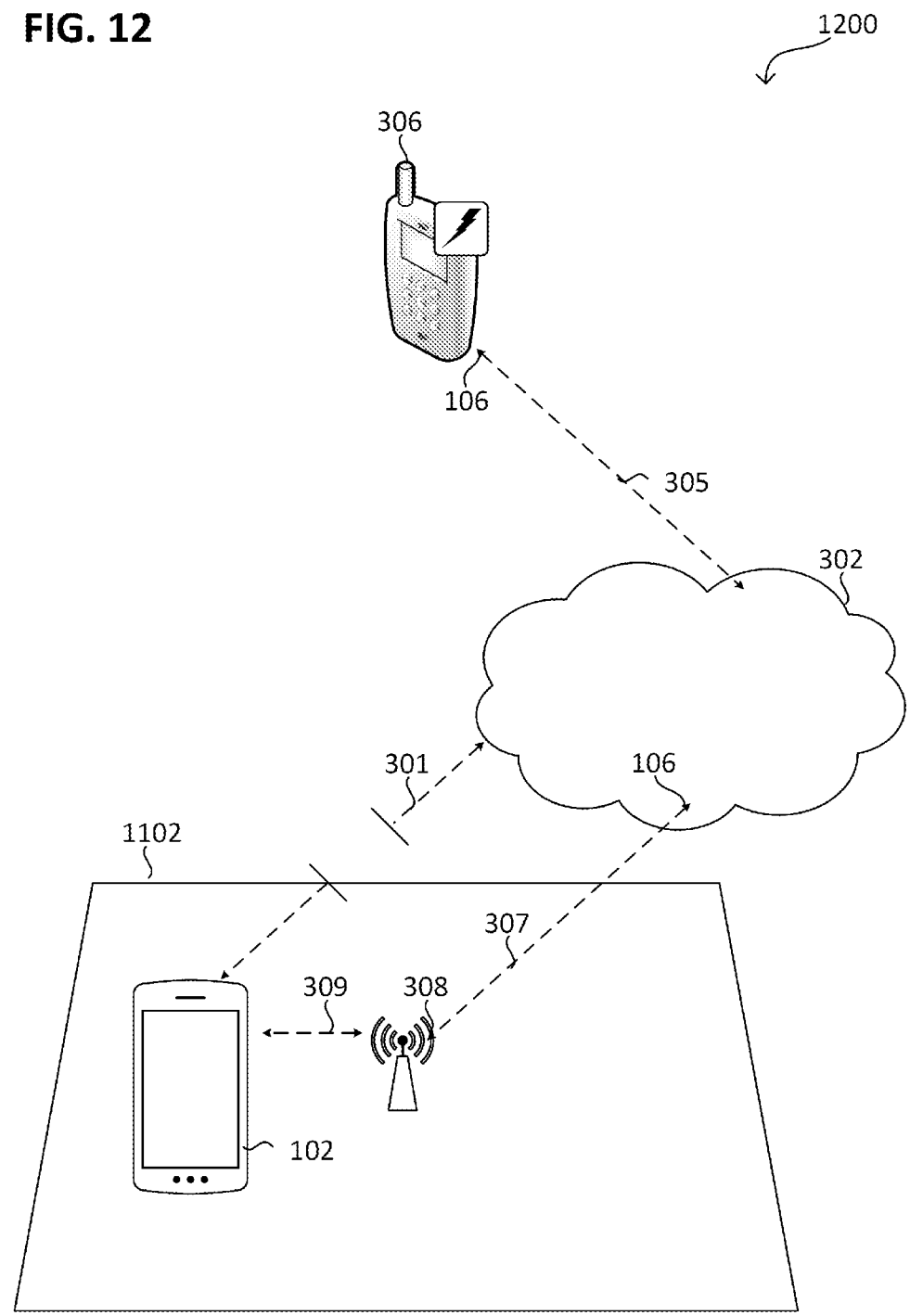

FIG. 12 illustrates a system 1200, for example the system 300 or 1100, for carrying out the method 100 or 200 according to various embodiments in a schematic communication diagram. In order to ensure the communication within a security area 1102 even when there is a poor (for example interrupted) connection 301 to the network 302, the sending of an alarm may 111 involve instructing the radio beacon 308 to transmit the message 106 to the network 302.

For example, for the sending of an alarm 111, the mobile radio 102 (for example the application 452) may act as a radio beacon and consequently be recorded (for example its location found) by the stationary radio beacon 308 irrespective of the connection 301. In order to inhibit misuse, the user identification of the user 104 may be used together with the mobile radio number of the mobile radio 102 (or other data of the mobile radio 102 and/or of the user 104) and an optional checksum as a beacon ID (beacon identification). For example, in the event of misuse, on that basis a mobile radio 102 and/or the user 104 may be blocked.

In response to this, the stationary radio beacon 308 may generate 111 and/or send the message 106, with the message optionally including an indication of a range of the mobile radio 102 from the stationary radio beacon 308 (and consequently an indication of its location), and/or at least including an alarm indication to indicate that the sending of an alarm 111 has taken place nearby. As an alternative or in addition, the receiver device application may implement the radio beacon 308 by means of the receiver device 306. In this way, the receiver device 306 can be used as a mobile radio beacon.

For example, the message 106 may be generated by the mobile radio 102 and transmitted to the radio beacon 308, which retransmits the message 106 to the network 302. In this way, the sending of an alarm 111 can be transmitted, by way of illustration, in "piggyback" form by way of the radio beacon 308, even if the mobile radio 102 does not have an Internet connection 301. Optionally, in this way a retransmission of other data of the mobile radio 102, for example its location indication and/or the environment data, may take place.

Figure 13:
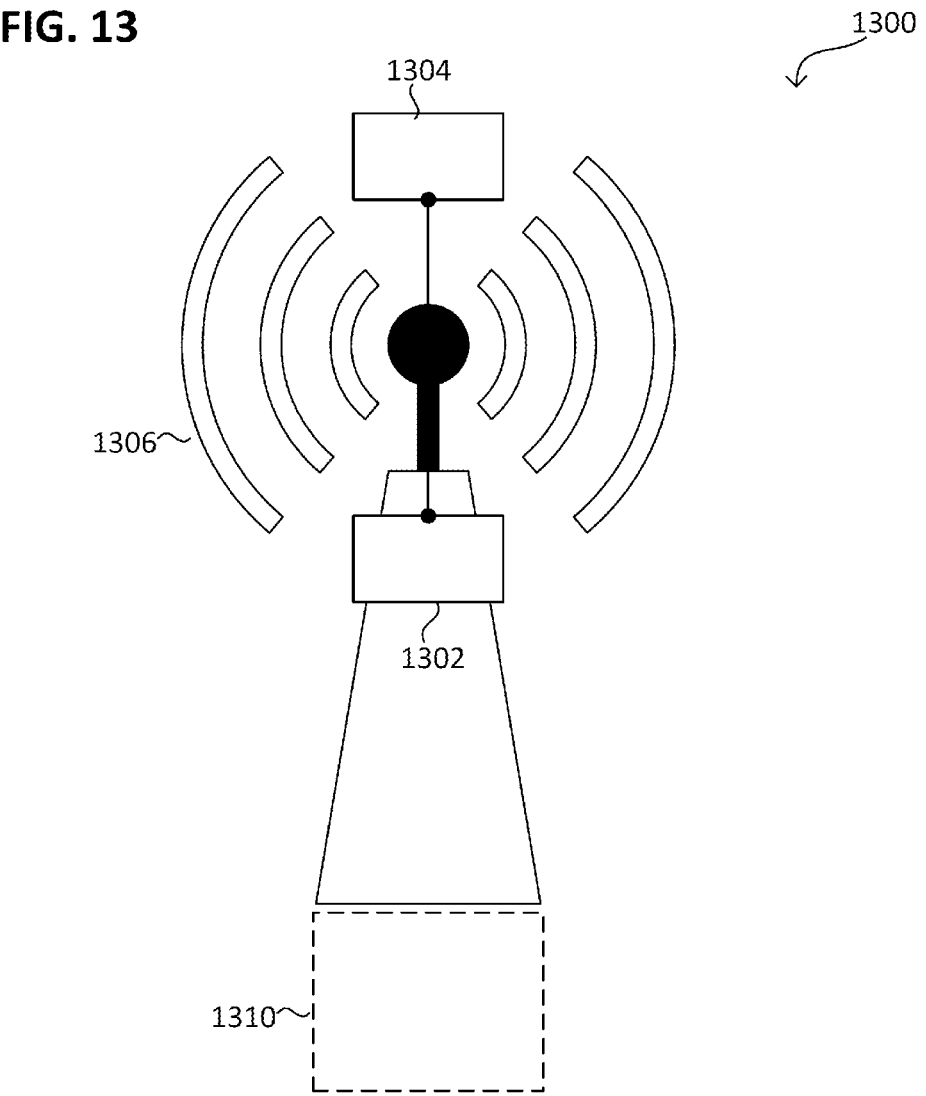
FIG. 13 shows a radio beacon for carrying out the method according to various embodiments in a schematic construction diagram.

FIG. 13 illustrates a radio beacon 308 for carrying out the method 100 or 200 according to various embodiments in a schematic construction diagram 1300. As a difference from a permanently installed radio beacon 308, the radio beacon 308 may provide a flexible, independent hardware solution, in order to be able to provide a mobile security area 1102.

The radio beacon 308 may comprise: a warning light 1302, which for example comprises a lamp (more generally an illumination device), which signals that it has been recorded that the sending of an alarm 111 has been recorded within the security area 1102; an optional photovoltaic component 1304 (for example a solar cell), in order to be able to function autonomously without a power grid (for example at festivals); an audio component (for example a sound generator), which is set up to emit a loud noise in order to draw attention to an emergency (for example of at least 100 decibels); a radio receiver 1306 for receiving various signals according to a radio standard (for example Bluetooth); an optional radio transmitter 1308 for retransmitting the message 106 (and consequently increasing the range) and/or for communication with the mobile radio 102. The radio transmitter 1308 and/or radio receiver 1306 (also referred to together or individually as a transmitter) may for example be set up for communication according to one of the following wireless CPs: a WLAN-CP, a Long-Range-WAN CP (LoRaWAN-CP), a Bluetooth CP, a Point-to-Point Protocol over Ethernet CP (PPPoE-CP). The LoRaWAN CP may for example provide more range than the WLAN and/or less than a mobile radio standard (for example 3G, i.e. of the third generation).

By means of the PPPoE-CP and/or the LoRaWAN-CP, the message 106 can be retransmitted to the Internet 302. As an alternative or in addition, the retransmission of the message 106 may take place according to the Bluetooth CP (by way of illustration, as a fallback if the application 452 cannot independently communicate over the Internet).

The transmitter 1306, 1308 (comprising the radio transmitter 1308 and/or radio receiver 1306) may for example have a short-range transmitter for communicating with the mobile radio 102 (for example by Bluetooth, WLAN or LoRaWAN). As an alternative or in addition, the transmitter 1306, 1308 may have a long-range transmitter for communicating with the computer system 304 (for example by a cellular mobile radio network).

The radio beacon 308 may as an alternative or in addition to the photovoltaic component 1304 have a battery 1310 or some other autonomous energy supply.

Figure 14:
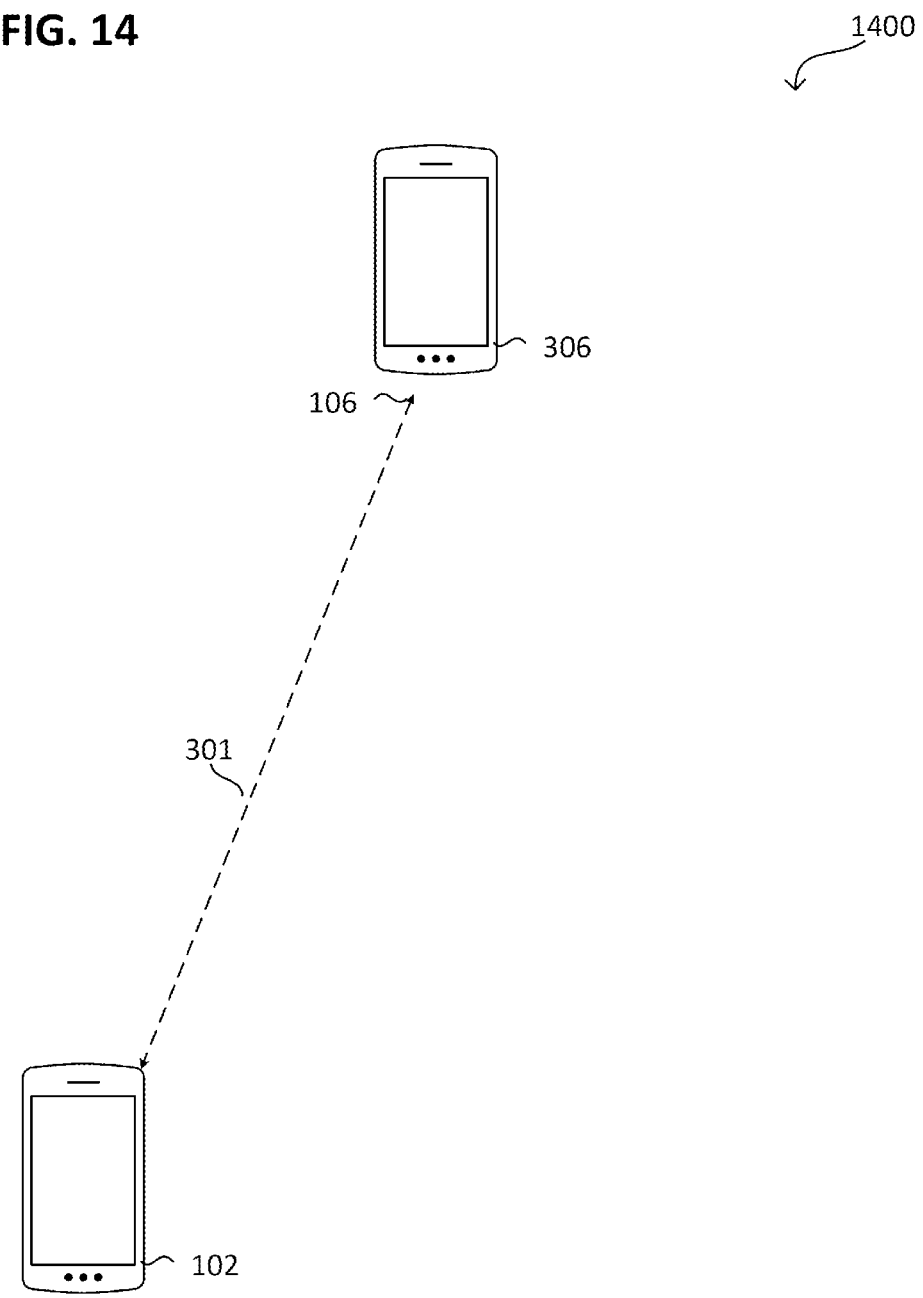

FIG. 14 illustrates a system 1400, for example the system 300, 1100, 1200 or 1400, for carrying out the method 100 or 200 according to various embodiments in a schematic communication diagram. In the system 1400, the receiver device 306 may be set up analogously to the mobile radio 102 and be associated with it (also referred to as linked mobile radios 102, 306). For the linkage of two or more mobile radios 102, 306, mutual authorization may take place. The sending of an alarm 111 may then involve transmitting the message 106 to each of the linked mobile radios 102, 306, for example by means of a direct communication connection between them and/or according to a short-range wireless CP.

During the recording of the environment, the user 104 may have been or be additionally provided with the conscious choice of sending an alarm to a linked mobile radio 102, for example a trusted private person nearby, as a precursor to the sending of an alarm 111 by means of the network 302. For example, for sharing an evening out at a nightclub, a number of guests could network digitally and look out for one another.

Each of the mobile radios 102 linked to one another may for example be prepared to call up the last recorded location of the other linked mobile radios 102. The group of linked mobile radios 102 may for example define (for example by means of a common radius) how far at most they would like to be away from one another. If one mobile radio 102 of the group goes beyond the common distance from one another defined as a maximum, in response to this each of the linked mobile radios 102 may then receive and/or output corresponding information about this. Optionally, the state of charge of the batteries of the linked mobile radios 102 with one another may be viewed and/or a push notification may inform them about a low state of battery charge of another mobile radio 102 of the group.

If one of the linked mobile radios 102 changes over to the readiness mode 109 (or triggers the sending of an alarm 111), all of the mobile radios 102 of the group may be informed about this (for example by means of the push notification).

Figure 15:
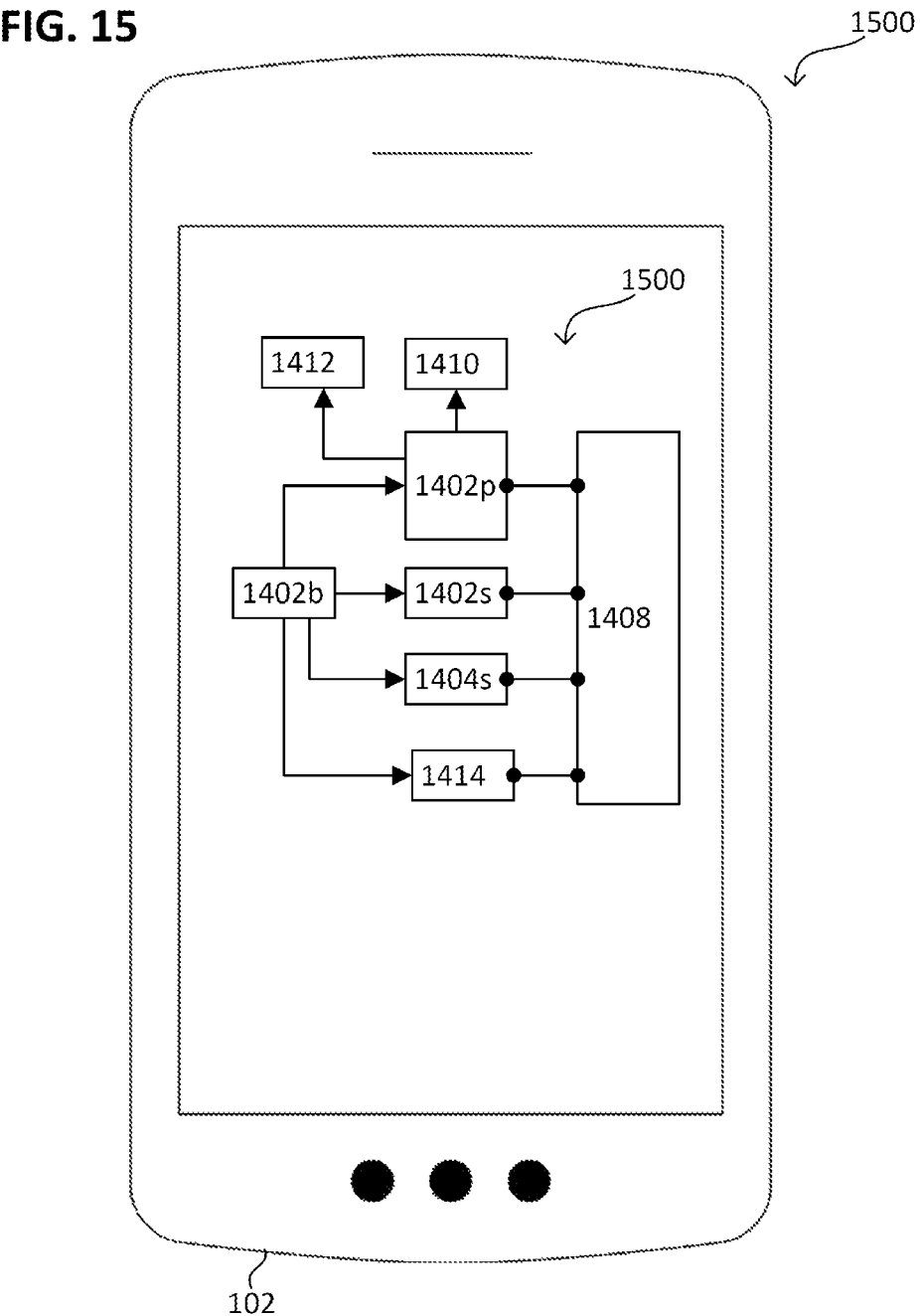
FIG. 15 shows a mobile radio for carrying out the method according to various embodiments in a schematic construction diagram.

FIG. 15 illustrates a mobile radio 102 for carrying out the method 100 or 200 according to various embodiments in a schematic construction diagram 1500. The mobile radio 102 may have one or more than one processor $1402p$ (for example of the ARM architecture or ×86 architecture), a data memory $1402s$ and a number of sensors $1404s$ and also have a battery $1402b$ (for example rechargeable battery) for supplying it with electrical energy. Furthermore, the mobile radio may have a communication bus, which connects the processor $1402p$, the data memory $1402s$, and the number of sensors $1404s$ communicatively to one another.

Furthermore, by means of the processor $1402p$, the mobile radio may run an operating system 1412, such as for example Windows, iOS, Google Chrome OS, Android, Blackberry OS, WebOS, KaiOS or Linux. The operating system 1412 may for example implement an application management, a memory management, a file management and/or a rights management and also have one or more than one programming interface for connecting applications to the operating system 1412. Furthermore, the mobile radio 102 may have one or more than one application 1410 (for example the application 452 and/or the receiver device application), which is run by means of the processor $1402p$ and/or runs on the operating system 1412. The or each application 1410 may optionally be stored on the data memory $1402s$. The data memory $1402s$ may for example comprise a volatile and/or non-volatile data memory, for example a USB stick, a flash memory, RAM (random access memory), DRAM (dynamic RAM) or EPROM (erasable programmable read-only memory).

A programming interface may be set up for connecting one or more than one application to the operating system and providing one or more than one operating system function.

An operating system function may for example be set up at least to return data of the operating system or to store data when it is called up.

Optionally, the mobile radio may have one or more than one user interface 1414 (for example user input interface and/or user output interface), for example a screen (also referred to as a display device), a physical keyboard, a loudspeaker, a vibration device, one or more than one physical switch (for example pushbutton) or the like. The number of sensors 1404s may for example comprise a locating sensor, a microphone, a touch sensor, an optoelectronic sensor, a position sensor, a magnetic field sensor, an acceleration sensor or the like. The operating system 1412 may be set up to activate (for example read) each individual one of the number of sensors 1404s and/or each user interface 1414, in order to interact with the user (for example to accept user inputs and/or to output information). The operating system 1412 may for example provide and/or periodically update information (by means of a corresponding programming interface), which represents the data read from a sensor or a user interface. The touch sensor may optionally be set up to ascertain at least one property of touching of the mobile radio 102, for example its location and/or trajectory (or more generally spatial distribution), its intensity (for example pressure and/or surface area), its duration and/or frequency (or more generally temporal distribution). The property (properties) of the touching may for example be translated into a pattern of touching in order to compare this with the touching criterion.

FIG. 16 and FIG. 17 illustrate in each case the display device 112 (for simplicity also referred to as the display) of a mobile radio 102 in various schematic plan views 1600 to 1700 analogous to the plan view 400 during the carrying out of the method 100, 200. The initial state of the mobile radio 102, for example when the application 452 is started, is the sleep mode 107.

In 1600, the display 112 may for example show the start page of the application 452, with a virtual sliding controller 402s being provided by means of the start page as a central operating element, the state of which can be changed by touching (for example with the finger of the user 104) and horizontally moving the location of the touching (also referred to as a swiping motion). By means of the swiping motion, the internal state of the sliding controller 402s (also referred to as the state of the controller) is changed between the values 0% (touching fully to the left) and 100% (touching fully to the right). The swiping motion may for example only be registered when it also begins at a position on the sliding controller 402s that corresponds to the current state of the sliding controller 402s. As feedback, the state of the sliding controller 402s may be indicated, by the position being marked by means of the marker 412m (for simplicity also referred to as the controller or status indicator). By way of illustration, the position of the controller 412m can consequently be guided with the finger between 0% and 100%. As long as the finger is held motionless on the controller 412m, the state of the sliding controller 402s does not change.

Optionally, a previously grayed-out video symbol 416 and/or alarm symbol 426 is highlighted when the state of the controller exceeds a respective threshold value in order to give an additional visual representation of the current state of the controller. If the state of the controller is guided again below the respective threshold value, the corresponding 416, 426 symbol is shown grayed-out again. The alarm symbol 426 is for example highlighted as from a state of the controller above the threshold value of 0%.

The application 452 may respond to any changing of the state of the controller with an action. In the sleep mode 107, in the info region 1606 of the display 112 for example information 412s in relation to the location finding of the mobile radio 102 is displayed (for example on the basis of geo-locating 101 of the mobile radio 102). As an alternative or in addition, the context region 1607 of the display 112 may display a map with the current position 412s of the mobile radio 102.

From 1600 to 1700, the state of the controller is brought above a first threshold value of 25%, whereupon in response a changeover may be made 105 to the readiness mode 109 and optionally, in addition to the location finding 101 of the mobile radio 102, a video recording by means of the mobile radio 102 may take place. As additional visualization, optionally the video symbol 416 is highlighted. If the state of the controller is brought above a second threshold value of 70%, for assistance LED lighting of the mobile radio 102 is switched on, and so the user 104 can control the illumination of the video recording without an additional operating element.

From 1700 to 1600, the state of the controller is brought back fully to the left (0%) and then the touching is interrupted, for example the marker 412m is let go. In response to this, the interaction with the user 104 may end without the sending of an alarm 111 taking place, and/or the mobile radio 102 may be changed over to the sleep mode 107. If in 1700 the state of the controller is brought to any other desired value, other than 0%, and then the touching is interrupted (i.e. the state of the sliding controller 402s is greater than 0%), the sending of an alarm 111 may take place. For example, the sending of an alarm 111 may be directed to a security service or the police.

By using a virtual menu switch 1709 (also referred to as a menu button) of the mobile radio 102, the user 104 can reach additional pages and dialogs, for example for settings or help. The menu thereby displayed can for example only be opened by way of the menu switch 1709 in order to rule out the possibility of inadvertent operation.

FIG. 18 illustrates the method 100 or 200 for operating the system 300, 1100, 1200, 1400 according to various embodiments in a schematic flow diagram 1800.

The system 300, 1100, 1200, 1400 may work on the server side 304 as far as possible with anonymized data. Every inquiry to the computer system 304 may take place while using the user identification of the user 104, which comprises a unique identifier (for example a series of characters). The user identification may be generated by the mobile radio 102 during starting for the very first time and/or directly after the installation of the application 452.

The user identification may identify the user 104, i.e. be uniquely assigned to him or her, but not allow it to be traced to the individual. For example, the user identification may comprise or be formed by one or more than one UUID ("Universally Unique Identifier") (for example the series of characters 7e129414-76b9-4000-9d9f-1c399944759f). For example, the user identification may comprise two UUIDs concatenated with a minus sign (for example giving the series of characters 7e129414-76b9-4000-9d9f-1c399944759f-e46a9c7e-163e-4caf-986e-81f3b06590bc).

During the use of the mobile radio 102 (for example of the application 452), GPS coordinates of the mobile radio 102 may be logged on the server side 304. The locating 101 taking place for this purpose (for example by means of geo-locating) and the associated monitoring may be a basic function of the mobile radio 102 (for example of the application 452) and a basic benefit for the user 104. The user 104 does not have to disclose personal details for this.

The recording of the environment (for example video surveillance) may be referenced by using the user identification and/or the current GPS coordinates of the mobile radio 102. The user 104 also does not have to disclose personal details for this.

For the sending of an alarm 111 (for example to security personnel), however, the anonymous user identification is not always sufficient, for example if the risk of intentional deception or malicious attacks on the system 300, 1100, 1200, 1400 (for example its alarm-sending path) cannot be ruled out. In this case, the user 104 may be requested 1801 by means of the mobile radio 102 to enter a personal indication, for example his or her mailing address or the mobile radio number of the mobile radio 102. Optionally, the mobile radio 102 and/or the user 104 may be verified by the system 300, 1100, 1200, 1400 by means of the personal indication. Confirmation is given for example in a form that does not require permanent storage of the mobile radio number on the computer system 304.

The user 104 may also be directly requested 1801 to enter the mobile radio number. The mobile radio number may for example be transmitted 1802 to the computer system 304 without the otherwise customary indication of a user identification (also referred to as the user handle). On this basis, the computer system 304 generates a random multi-digit (for example 4-digit, or 8-digit) series of alphanumeric characters 1803 and transmits 1804 it (for example by way of an SMS server) to the mobile radio number. The transmission (for example SMS) may comprise the series of characters 1803 itself and/or a UDL (Universal Deep Link), which has the series of characters. The UDL can, when tapped, be opened directly by the mobile radio 102 (for example the application 452).

The mobile radio number and the random series of characters are temporarily stored 1805 in a database of the computer system 304, for example for 5 minutes or less. For authentication, the mobile radio 102 receives 1806*a* the transmission (for example the SMS) and/or the user 104 enters 1806*b* the random series of characters manually into the mobile radio 102 (for example by the application 452). The random series of characters is transmitted 1807 together with the user identification and the mobile radio number to the computer system 304, for example by means of the network 302.

If the mobile radio number and the random series of characters coincide with the information stored on the server side 304, in response to this a signature 1808 can be generated on the basis of the user identification and the mobile radio number and transmitted 1808 to the mobile radio 102. The signature may for example comprise or be formed by a cryptographically signed tuple of the user identification and the mobile radio number.

Optionally, in response to this, the (items of) information stored in 1805 may be erased. As an alternative or in addition, an MD5 sum of the mobile radio number together with the user identification may be stored 1809 by the computer system 304 in order to be able to assign to a user 104 the sending of an alarm 111 even when a call is made, for example if the mobile radio number is not known to the computer system 304 itself.

Furthermore, the signature may be stored 1809 by the mobile radio 102, for example in a non-volatile memory (for example by means of the application 452). This sequence makes it possible that the user identification and the mobile radio number are only in the main memory of the computer system 304 for a brief instant and are not persistently stored. The user identification and/or the mobile radio number are filtered out from the log files of the computer system 304 or are simply not stored in them. In general, as an alternative or in addition to the mobile radio number, another address at which the user 104 can be reached may also be used (for example an email address, a network address, an instant message address or the like). The address may for example be associated with the mobile radio 102 or at least the user 104.

The user identification, the mobile radio number and the signature may for example only be transmitted together during the sending of an alarm 111 (for example to the security personnel), for example if the possibility of a clear identification of the user 104 in person is desired, or at least by way of his or her mobile radio number (for example for a call back). The mobile radio number may for example be the smallest common denominator for cooperation with a security service or the police.

The user 104 may optionally supply the system 300, 1100, 1200, 1400 with one or more than one additional indication in relation to his or her person, for example by means of an input on the mobile radio 102, for example concerning the settings of the application 452. The nature and/or the extent of the input is left to be dictated by personal data protection needs according to the setting of the application 452. The one or more than one additional indication may for example comprise a name, an age, a gender or one or more than one photo for the identification of the user 104. The one or more than one additional indication may optionally be transmitted during the sending of an alarm 111 by means of the message 106 and/or does not necessarily have to be validated by the mobile radio 102.

FIG. 19 illustrates the locating 101 (for example by means of geo-locating) according to various embodiments in a schematic flow diagram 1900, it being possible for the locating 101 to comprise reading 1900*a* and/or tracking 1900*b*.

The reading 1900*a* may comprise reading 1901 (for example during the running time of the application 452) by means of a first operating system function of the mobile radio 102 location data continuously (for example periodically) provided by the operating system 1412 of the mobile radio 102. The operating system 1412 of the mobile radio 102 may ascertain the location data for example on the basis of GPS satellite information, the network topology of the network provider and/or a known WLAN access point. The location data (for example GPS coordinates) read by the operating system function can be further processed and, by way of a second operating system function, subjected to an optional address backward search 1902. On the basis of the result of the reading 1900*a*, for example the location indication can be ascertained.

The tracking 1900*b* may comprise implementing 1903, by means of a third operating system function, a beacon scanner (for example by means of the locating sensor 102*a*), which is set up to ascertain one or more than one beacon 308 that is sending out an identification assigned to the system 300, 1100, 1200, 1400. When one or a number of such beacons 308 have been ascertained 1904, the details can be used for ascertaining the location indication. A beacon 308 may for example be an iBeacon or Eddystone beacon, as described more specifically later.

The data (for example geo-information) provided by 1901, 1902 and/or 1904 may be brought together 1905, for example consolidated, to form the location indication 1915. If the data from 1901, 1902 and/or 1904 change, the location indication 1915 can be updated and optionally compared with the previous state. If the location indication 1915 has changed significantly, a call up of a geo-service of the system 300 may take place 1906 for its further processing and/or display as location information 412s. A significant change of the location indication 1915 may for example be understood as meaning a change of the location 151 of the mobile radio 102 (for example its GPS coordinates) by more than 1 meter, a changed mailing address, a change of the nearest beacon 308 and/or a change in relation to the nearest beacon 308 by more than 1 meter.

The geo-service may receive the (for example all of the) geo-information available to the mobile radio 102 as a location indication and in response transmit back to the mobile radio 102 the meta data for a responsible receiver device 306 (for example of the security service provider and/or the police) as a fallback. For ascertaining a responsible receiver device 306 (for example of the security service provider) as realistically as possible, database-supported building information, responsibilities and service schedules of security service providers, location indications of beacons 308 and/or current GPS coordinates of receiver devices 306 may be recorded and included.

If it has not been possible for any location data (for example GPS coordinates) to be made available by the operating system 1412 of the mobile radio 102, the locating 101 may take place just by means of the one or more than one recorded beacon 308, if possible. The location of the or each beacon 308 stored in a database of the system may be evaluated for this and the location of the mobile radio 102 determined on the basis of it, for example by means of a triangulation of the signal strength of a number of recorded beacons 308. When using the one or more than one beacon 308 for locating 101, the geo-service of the system may also transmit a mailing address to the mobile radio 102 if the operating system 1412 of the mobile radio 102 does not itself implement an address resolution.

FIG. 20 illustrates the recording of the environment according to various embodiments in a schematic flow diagram 2000, which for example involves recording of video data, the video data comprising at least image data and optionally audio data. What is described by way of example for the video data may also apply by analogy to photos and/or just audio data.

The recording of the environment may comprise initializing 2001 the video camera of the mobile radio 102 by way of a fourth operating system function and allowing the processing of the video data by means of the application 452. The video data provided by the operating system 1412 of the mobile radio 102 may in parallel be prepared 2002 for a video transmission over the network 302 and optionally stored locally on the mobile radio 102 by means of a fifth operating system function.

If the locally stored video data are at risk of being erased by a third party and/or interrupted when the local storage capacity of the mobile radio 102 is used up, they can optionally be transmitted to the computer system 304 (for example with or without being stored on the mobile radio 102) and be stored by it. The redundant storage locally and on the computer system 304 compensates for example for the risk of a network failure, and thereby makes increased data security possible.

The transmitting 2002 of the video data takes place for example in packets by way of the RTMP protocol (Real-Time-Messaging protocol) to the computer system 304 or to a video service provided by it and the streaming format, for example an HLS format (hypertext transfer protocol live-streaming format) can be transcoded 2003 by the computer system 304. The RTMP protocol is particularly well-suited for repeated restarting in the event of disconnections and helps to prevent erroneously transmitted video data from compromising the complete data transmission.

The streaming format (for example HLS format) may store individual video fragments as independent files (so-called chunks), from which a digital fingerprint can be ascertained 2004 for each file. Each fingerprint may be transmitted together with a timestamp of the respective video file asynchronously to a fingerprint service of the computer system 304 and transmitted by it to one or more than one external storage device (also referred to as external storage). The external storage guards the system 300, 1100, 1200, 1400 against data manipulation and/or can at least provide that data manipulation that is carried out for example by an employee of the system 300 can be externally revealed (or at least reversed).

FIG. 21 illustrates the sending of an alarm 111 according to various embodiments in a schematic overview 2100, in which the connection 2111 of the mobile radio 102, the connection 2112 of the receiver device 306 and the type 2113 of CP (by way of illustration, the alarm-sending path) are shown. The transmitting 111 of the message 106 may, depending on the availability of an Internet connection and/or depending on the reachability of the receiver device 306 (for example the security personnel) take place according to one or more than one CP 2113.

If both, the mobile radio 102 and the receiver device 306, are connected to an Internet connection 302a, the message 106 can be transmitted to the receiver device 306 in the form of a text message 2101a. The text message 2101a may for example be a push message or an SMS. The transmitting of the text message 2101a to the receiver device 306 may take place by means of the computer system 304. The text message 2101a may include the location indication of the mobile radio 102. The receiver device 306 may optionally have been or be prepared to initiate a video transmission to the mobile radio 102, for example by means of the receiver device application. By way of illustration, a helper may start a video stream in order to gain an impression of the current situation of the user 104.

If, by contrast, the receiver device 306 can only be reached by telephone (i.e. by a voice message), the message 106 may be transmitted to the receiver device 306 in the form of a voice message 2101b. By way of illustration, a telephone call enabling the user 104 to send an alarm by telephone may for example be initiated to the security personnel. If the mobile radio 102 is connected to the Internet connection 302a, a message 106 may optionally be transmitted in addition to the voice message 2101b from the mobile radio 102 to the computer system 304 (also referred to as internal sending of an alarm), in order for example to be able subsequently to make evidence available.

Irrespective of a connection to the telephone network 302b and/or the Internet connection 302a, as an alternative or in addition the message 106 may be transmitted to the receiver device 306 in the form of a Bluetooth message 2101c by means of a Bluetooth connection 302c. For this purpose, the mobile radio 102 (for example triggered by the application 452) may implement a beacon (also referred to as beacon mode) and can consequently be detected by a beacon scanner in the surrounding area.

FIG. 22 illustrates the sending of an alarm 111 by text message 2101a according to various embodiments in a schematic flow diagram 2200.

The sending of an alarm 111 by text message 2101a may take place by means of a push message to the receiver device 306 and, in the event that this cannot be transmitted to the receiver device 306, by means of SMS. The sending of an alarm 111 by text message 2101a may take place when the mobile radio 102 and the receiver device 306 are connected to one another by means of an Internet connection. The mobile radio 102 may carry out 2201 the sending of an alarm 111 (for example by means of the application 452), for example by the message 106 being transmitted to the computer system 304. The message 106 may optionally include the user identification, the (for example validated) mobile radio number of the mobile radio 102 and/or the associated signature. The computer system 304 may check the mobile radio number by means of a comparison with the user identification and the signature 2202. The computer system 304 may reject the message 106 for example if the comparison does not show a match. If the comparison does show a match, information about the receipt of the message 106 may be stored 2203 in a database and a receiver device 306 responsible for the location of the mobile radio 102 ascertained, and this device is then informed 2204 by a push message 2101a that the sending of an alarm 111 has taken place (for example together with the location indication). If it is ascertained that the push message 2101a has not been successfully transmitted to the receiver device 306, the receiver device 306 may be informed 2205 by SMS 2101a that the sending of an alarm 111 has taken place (for example together with the location indication).

With reception 2207 of the message 106 by the receiver device 306, the user of the receiver device 306 can have been or be provided with the choice (for example if the user opens the receiver device application in response to 2205, 2204) of whether to positively or negatively acknowledge 2208 the receipt of the message 2101a (by way of illustration, does or does not follow up the call for help). With positive acknowledgement, the receiver device 306 may be assigned 2207 the event of the sending of an alarm 111 by the mobile radio 102 and information about it stored in the database of the system. If there is no acknowledgement or a negative acknowledgement (for example within a few minutes), the message 106 may be sent 2209 to another receiver device 306, for example in order to inform the police or a background service of the responsible security service provider. If the receiver device 306 does not have an Internet connection, a telephone call with a voice message 2101b (by way of illustration, an announcement) may be directed to the receiver device 306. The voice message 2101b may, by analogy with the text message 2101a, transmit the location indication, the alarm indication and optionally the mobile radio number of the mobile radio 102.

With the sending of an alarm by telephone 2101b, optionally a conversation between the user 104 and the user of the receiver device 306 may be initiated. In this case (for example if there is no Internet connection), the sending of an alarm 111 does not necessarily have to take place by means of the computer system 304, but may be logged by the mobile radio 102 (for example the application 452) and the content of the log transmitted to the computer system 304 as soon as there is an Internet connection.

FIG. 23 illustrates the sending of an alarm 111 via Bluetooth 302c (also referred to as the sending of an alarm by Bluetooth 111) according to various embodiments in a schematic flow diagram 2300. The sending of an alarm by Bluetooth 111 may take place as an alternative or in addition to the sending of an alarm 111 by Internet connection 302a and/or by telephone network 302b. The sending of an alarm by Bluetooth 111 may for example use one or more than one beacon 308 (also referred to as the sending of an alarm by beacon 111), in order to send the message 106 to a receiver device 306 available in the local area even without an Internet connection 302a or telephone network 302b. The receiver device 306 may for example be a mobile radio 102 linked to the mobile radio 102.

The sending of an alarm by beacon 111 may comprise that the sending of the message 106 from the mobile radio 102 (for example by means of the application 452) takes place repeatedly (for example periodically). In other words, the mobile radio 102 may implement a beacon transmitter. As an alternative or in addition to the alarm indication, the message may include an indication (also referred to as a readiness indication) that the mobile radio 102 has been armed 105 (i.e. has been changed over to the readiness mode 109), for example in response to the arming 105. Before the sending of an alarm 111 takes place by means of transmission of the alarm indication, for example the readiness indication may be transmitted. The sending 111 of the message 106 (including the alarm indication and/or the readiness indication) may for example take place in a clocked manner, for example every 200 milliseconds. Optionally, one or more than one item of personal information of the user 104 may be sent together with the information.

The receiver device 306 (for example its application 452 and/or receiver device application) in the local area of the mobile radio 102 may implement a beacon scanner, and receive the message 106 (including the alarm indication and/or the readiness indication).

The sending of an alarm by beacon 111 does not necessarily require an Internet connection. For example, the use of Bluetooth 302c can provide a range of direct communication between the beacon transmitter and the beacon receiver of up to approximately 100 meters. Obstacles between them may however reduce the range.

The reception of the readiness indication may for example be signaled by the receiver device 306. By way of illustration, the security provider may be informed of an "unwellness" of the user 104 in the direct vicinity. If the sending of an alarm 111 takes place, a push message 2101a may be transmitted to the receiver device, for example in order to ask for the security personnel.

If the mobile radio 102 is in the sleep mode 107, the mobile radio 102 cannot implement 2301 the beacon transmitter. For example, while the user 104 is not operating the sliding controller 402s in the application 452 or the marker 412m lies below a certain threshold value, the application 452 cannot yet operate as a beacon transmitter and no signaling 2301 takes place. If the mobile radio 102 changes over to the readiness mode 109, the beacon mode can be started. If the threshold value of the sliding controller 402s is exceeded, the application 452 can for example implement 2302 the beacon transmitter. Depending on the operating system 1412, the mobile radio 102 behaves for example as an iBeacon or as an Eddystone beacon and transmits the readiness indication and/or details about the user 104 (by way of illustration, as a minor escalation stage before the sending of an alarm 111 takes place).

By means of the readiness indication, the "unwellness" of the user 104 can be signaled 2303 to the receiver device 306 in the immediate local area. The notification of the receiver device 306 (for example of a member of security personnel) by means of the readiness indication may take place (or not take place) according to a setting of the receiver device 306 and does not necessarily have to be acknowledged by it (for example by contrast with receiving the alarm indication).

If the sending of an alarm 111 takes place, the receiver device (for example its receiver device application) may in response 2305 to this display a push notification 2305. If the user 104 carries out the disarming 105 (possibly only when the extended disarming criterion is satisfied), switching back to 2305 may take place or the beacon mode may be ended 2306. If the beacon mode is ended, this may optionally be interpreted by the system (for example the receiver device 306) as a false alarm. If this time is exceeded, the sending of an alarm 111 may remain active, even if no further signaling or operating of the mobile radio 102 (for example by the user) takes place. As soon as the sending of an alarm 111 is active, the message 106 with the alarm indication may be sent once again.

By analogy, the transmitting of the message 106 to a linked mobile radio 102 may take place. The linked mobile radio 102 may first receive the readiness indication. In this case, the linked mobile radio 102 may however be set up only to respond 2305 if the readiness indication originates from a mobile radio 102 linked with it. By way of illustration, the linked mobile radio 102 (for example its application 452) may only respond to those mobile radios 102 of which the user identification is linked to the mobile radio 102 (i.e. which are part of the group of linked mobile radios 102). Other mobile radios, which are not part of the group, can be ignored by the mobile radios 102 of the group. Optionally, the application 452 may, by contrast with the receiver device application, be set up in such a way that receiving the readiness indication already triggers the display 2305 of the push notification.

The possibilities for the transmission of details of the user differ greatly between iBeacons and Eddystone beacons, which will be discussed below.

The iBeacon standard for example does not allow any transmission of additional payload data and is consequently only used under iOS for the sending of an alarm 111 via Bluetooth connection 302c, since the EddyStone standard is only supported there for the reception of beacon data. Each iBeacon transmits the proximity UUID (a static UUID for beacons of the system) and also a major and a minor ID (for example two 16-bit numbers). The latter together allow the addressing of $2^{16} \cdot 2^{16} = 4,294,967,296$ devices.

In order to integrate the readiness indication and the alarm indication into the message 106, the system 300, 1100, 1200, 1400 may optionally be set up to use the most significant bit of the major ID as a bit switch (flag). By means of the bit switch, it can be indicated that the mobile radio 102 is in the readiness mode 109 (bit switch=0) (which corresponds to the readiness indication), and that the touching was interrupted in the readiness mode 109 (bit switch=1) (which corresponds to the alarm indication). In that case, $2^{15} \cdot 2^{16} = 2,147,483,648$ device addresses are available. The system 300, 1100, 1200, 1400 may statically assign one of these device addresses to each iOS user and assign this address the user identification of the iOS user 104. This assignment may for example only be provided and/or stored on the server side 304 and the validation of the sending of an alarm 111 may in this case only take place whenever the receiver device 306 addressed by the message 106 currently has an Internet connection.

The Eddystone standard defines a number of variants, of which the system 300, 1100, 1200, 1400 may use for example the variant of the Eddystone UID (unique Eddystone identification). The namespace, comprising 10 bytes, contains a static value, which identifies the beacons 308 of the system 300. The instance, comprising 6 bytes, may not be sufficient for the transmission of a user identification in the Eddystone standard either. Instead, by analogy with the iBeacon standard, a device address may be generated. The assignment of the device address to the user identification can then only take place in the case of the Eddystone standard on the server side 304 and the validation of the sending of an alarm 111 can correspondingly only take place whenever the receiver device 306 currently has an Internet connection. Since in the case of the Eddystone standard a greater number space is available than in the case of the iBeacon standard, in this case however an additional safeguard may be provided. As a safeguard, for example, the first 14 bits of the 48 bits available may be used as a checksum over the user identification and the remaining 34 bits randomly assigned. The guessing of a valid device address is thereby made additionally more difficult, which makes manipulation more difficult.

In addition to the UID frame, the Eddystone standard may have a so-called TLM data frame (telemetry data frame, i.e. a protocol data unit for the security layer). The TLM data frame may be set up for the transmission of telemetry data within the Internet of Things (IoT). The system 300, 1100, 1200, 1400 may for example use a byte offset 2 in conformity with the standard for the battery status. In the byte offset 3, the most significant bit establishes whether in further fields a GPS coordinate or major and minor ID of a beacon 308 of the system 300 is to be transmitted. The next bit of byte offset 3 indicates whether it is the readiness indication (bit=0) or an alarm indication (bit=1). The remaining bits of byte offset 3 contain the number of hops that a packet has taken (for example to increase the range of the transmission via Bluetooth). The byte offsets 8 and 9 as well as 12 and 13 may be respectively evaluated as a 16-bit word. If the most significant bit of byte offset 3 has been set, the interpretation is as a GPS coordinate with byte offsets 7, 8 and 9 as the degree of latitude and byte offsets 11, 12 and 13 as the degree of longitude (IEEE 754 floating-point number with two-bit exponent and 21-bit mantissa). If the most significant bit of byte offset 3 has not been set, then byte offsets 8 and 9 contain the major ID and byte offsets 12 and 13 contain the minor ID. If the position is unknown, then the most significant bit of byte offset 3 has not been set and byte offsets 8, 9, 12 and 13 contain the value 0.

Optionally, an increasing of the range of the transmission via Bluetooth may take place, as described more specifically below. By means of the mechanism of the sending of an alarm by Bluetooth 111, the coverage of areas with poor mobile radio coverage can be significantly improved. However, the direct reception of the message 106 may be restricted to a range of for example approximately 100 meters. In the case of direct reception, the receiver device 306 would then have to have an Internet connection in order to be able to validate the sending of an alarm 111. Both factors are improved by increasing the range.

The increasing of the range may take place by means of a device (also referred to as an extender or range increasing device) which is set up to retransmit incoming messages of the system 300 (for example beacon packets). For example, a received message (for example including the alarm indication and/or the readiness indication) may be retransmitted by the extender for example only whenever it has a location indication (for example GPS coordinates or beacon location information) and/or if it can be supplemented with the location indication of the extender. Although the latter may make locating more inexact, it can nevertheless provide a location indication, which at least provides more usable information content as compared with retransmission entirely without any location indication. Retransmission takes place for example exclusively in accordance with a Beacon standard (for example the Eddystone standard), which supports the transmission of a location indication. If the Beacon standard (for example the iBeacon standard) does not support the transmission of a location indication, it may be provided that at least the first receiving extender can add a location indication. In order to prevent the cyclical retransmission of packets, the CLM data frame may have a hop count, which is incremented with every retransmission. Packets with a hop count greater than four are for example discarded. If the extender itself has an Internet connection, the coupling of the message into the Internet 302 may take place. Optionally, the mobile radio 102 and/or the receiver device 306 may be set up to implement the functions of the extender, in order thereby to extend the restricted Bluetooth range.

FIG. 24 illustrates the linkage of two or more mobile radios 102, 306 (also referred to as linking) according to various embodiments in a schematic flow diagram 2400. The linking may comprise the generating of an address (also referred to as the linking address).

The linking may be understood as meaning the associating of two or more mobile radios 102, 306 (also referred to as linked mobile radios 102, 306), for example permanently or temporarily. The linked two or more mobile radios 102, 306 form a group in which arming 105 (by means of the readiness indication) or sending of an alarm 111 (by means of the alarm indication) of a mobile radio 102 of the group is divulged to one or more than one (for example each) mobile radio 102 of the group, for example in addition to being divulged to security personnel.

Optionally, the linked mobile radios 102, 306 may have access to one another's current location. As an alternative or in addition, the linked mobile radios 102, 306 may divulge to one another a low state of charge of the battery.

The forming of a pair of linked mobile radios 102, 306 (for example a mobile radio 102 joining an already formed group) is described below. A first mobile radio 102 may be provided with a conscious choice 2401 (for example a corresponding configuration page of the application 452), enabling the user 104 to select a time indication (for example 1 minute, several minutes, days, weeks or unlimited) for the second mobile radio 102. The system 300, 1100, 1200, 1400 (for example the first mobile radio 102 and/or the computer system 304) may in response to this create a new group, which is assigned a running time according to the time indication. Furthermore, the system 300, 1100, 1200, 1400 (for example the first mobile radio 102 and/or the computer system 304) may generate a linking address 2402, which is assigned to the group. The linking address may for example comprise or be formed by a resource locator, for example a uniform resource locator (URL). The resource locator can identify and locate a resource of the system 300 assigned to the group, for example an Internet page. The linking address may be transmitted from the first mobile radio 102 to the second mobile radio 102, for example by means of a message (for example a text message) or by means of a QR code (i.e. a two-dimensional code), which is for example displayed 2403 by the first mobile radio 102, is in a printed-out form or is reproduced in some other way.

The resource locator may comprise a token (for example a JWT token—"JavaScript Object Notation Web Token") which has information that allows the group to be joined. The resource locator may for example be a QLD, which can also be opened by means of a browser, for example if there is no application 452 on the second mobile radio 102. The resource opened by means of the browser (for example Internet page) may optionally comprise a notification that makes it possible to install (for example download) the application 452 on the second mobile radio 102. For example, attention may be drawn to the download of the application 452 in one or more than one application store (also referred to as an App Store).

FIG. 25 illustrates the linking according to various embodiments in a schematic flow diagram 2500. If the linking address is opened 2510 by the second mobile radio 102 (directly or by way of a photo of the QR code), in response to this a confirmation inquiry 2504 may take place, for example by means of the application 452, on the second mobile radio 102. This may serve for security. Once confirmation has been given, the linking address may optionally be validated 2505 on the server side 304. When there is successful validation 2505, the second mobile radio 102 can be added to the group. After the running time has run down, the group may be disbanded, which may have the consequence that the mobile radios 102 no longer share information with one another.

Figure 26:
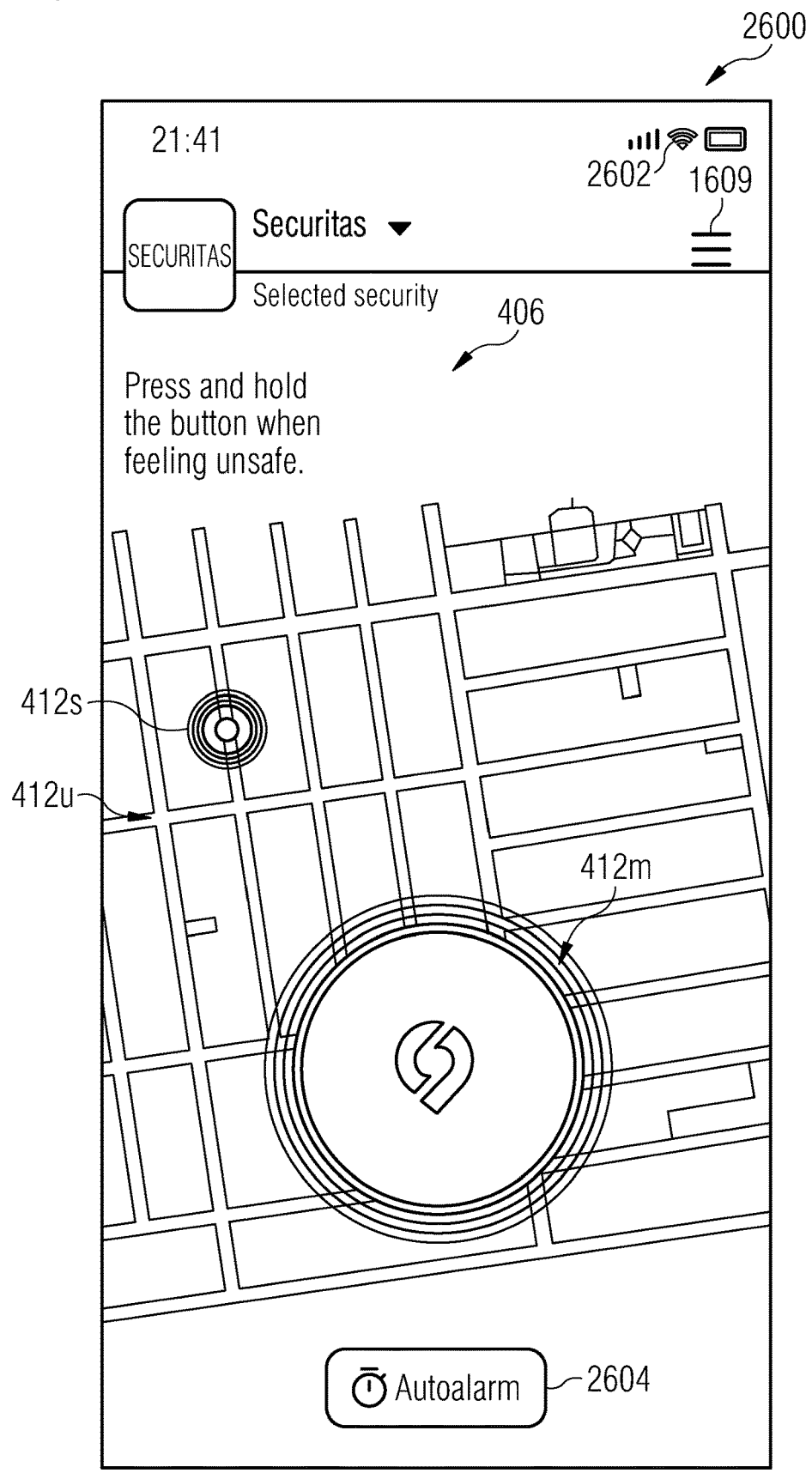
Figure 27:
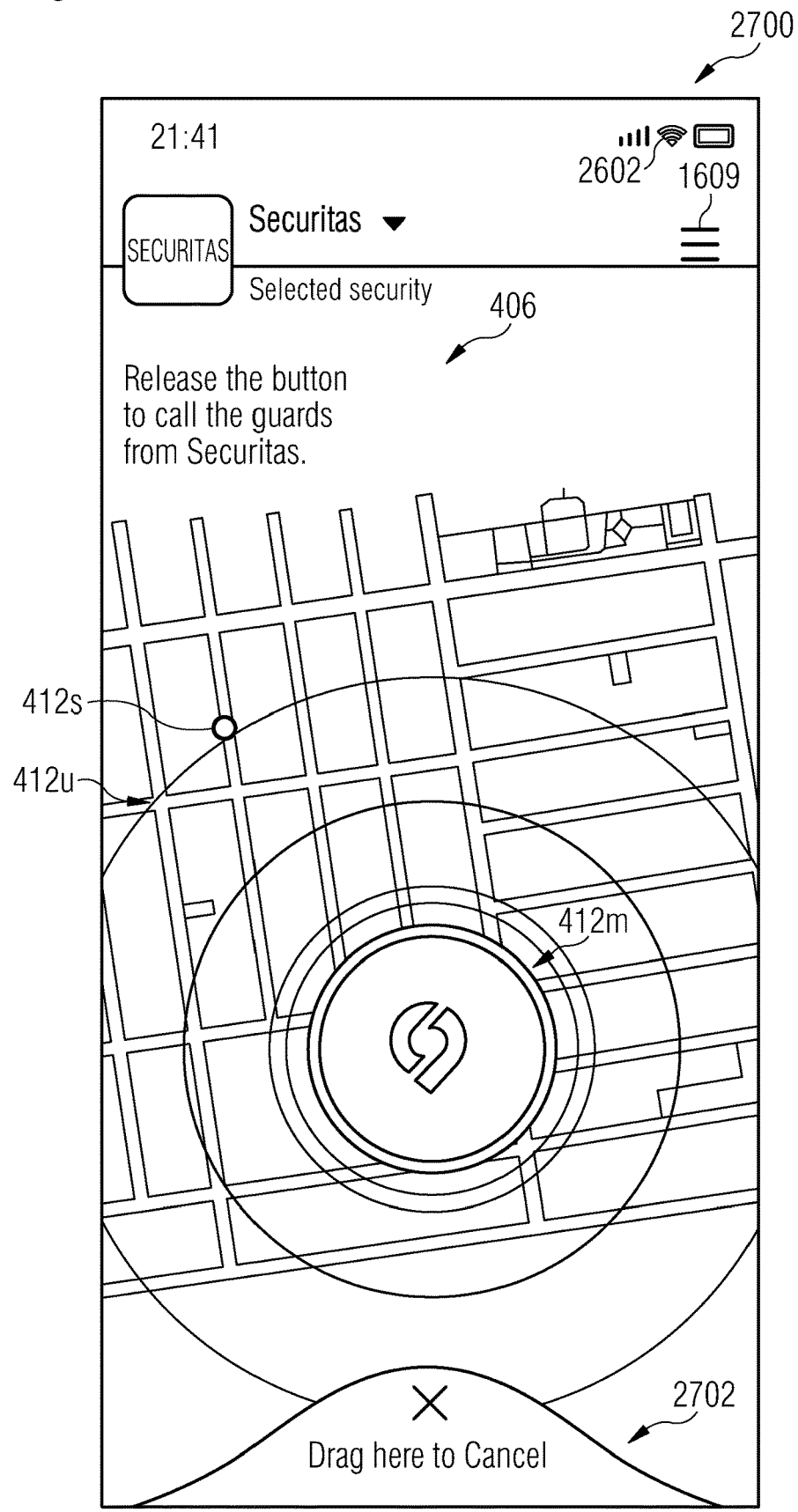

FIG. 26 and FIG. 27 respectively illustrate the display device 112 of a mobile radio 102 in schematic plan views at a first point in time 2600 and a second point in time 2700 after the first point in time 2600. Between the first point in time 2600 and the second point in time 2700, the ascertainment of the touching of the mobile radio 102 may have taken place. At the first point in time 2600, the mobile radio 102 may be in the sleep mode. At the second point in time 2700, the mobile radio 102 may be in the readiness mode 109.

The sending of an alarm 111, described herein, in response to touching having been interrupted may also be referred to as a dead man's circuit (also referred to as a dead man's device). The dead man's circuit triggers the sending of an alarm 111 when the mobile radio 102 is let go.

Reference has been made above, inter alia, to a disarming criterion, which is satisfied when the marker 412m is brought back into the first marker position or the initial position. This achieves the effect that inadvertent arming is made more difficult, since the readiness mode 109 for example is only activated when the marker 412m is brought out of its initial position (as a pattern of touching). This consequently inhibits inadvertent arming.

In the following text, reference is made to a virtual dead man's switch 412m, which in turn facilitates arming. The same may also apply by analogy to other forms and/or configurations of the operating element 402s, for example also to the previously described linear sliding controller.

By means of the dead man's switch 412m, the mere touching (for example at the position of the dead man's switch 412m) may be implemented as an arming criterion. In other words, the changing over to the readiness mode 109 may take place if it has been ascertained in the sleep mode 107 that touching takes place, for example that the dead man's switch 412m is touched (for example with the finger of the user 104). To put it another way, the arming criterion may be satisfied when the touching (for example at the position of the dead man's switch 412m) takes place and/or begins.

The application 452 may be set up to indicate the position of the dead man's switch as a notification of touching. As an alternative or in addition, the application 452 may be set up to optionally output in the readiness mode 109 a notification of touching 2702 by way of the disarming criterion (also referred to as the notification of disarming 2702). The notification of disarming 2702 may for example, as shown here, comprise the form of a text. As an alternative or in addition, the notification of disarming 2702 may also be differently displayed, for example by means of a pictogram (here a cross) or the like, for example representing the position at which the end position of a swiping motion is intended to lie.

The disarming criterion may for example be satisfied when the swiping motion (for example with the finger of the user 104) takes place without touching being interrupted and the end point of which lies at a predefined position (also referred to as the disarming position) of the display. The swiping motion may for example only be registered whenever it begins at the position of the dead man's switch 412*m*. For example, the disarming position may be at the lower border of the display, for example on the left, right and/or in the middle.

This placement of the disarming position is particularly ergonomic. For example, the swiping motion may take place vertically, i.e. toward the lower border of the display.

If the touching of the dead man's switch 412*m* is interrupted, then, as described above, the setting of an alarm 111 can be triggered.

As already explained above, the application 452 may be set up optionally to output and/or periodically update one or more than one of the following items of information (for example by means of the user interface 112):
- the environment information 412*u*;
- the location information 412*s*;
- one or more than one notification of touching 406, 2702 in relation to touching that would satisfy the first predefined criterion and/or the second predefined criterion (for example here in the form of text and/or as a pictogram);
- information 2602 about the quality of the connection to the network 302; and/or
- information 2604 (also referred to as timer information 2604) about the timer.

The timer information 2604 may for example indicate whether the timer is activated. As an alternative or in addition, the timer information 2604 may for example provide the function of manually setting the time period 201 and/or starting or stopping the timer (for example in response to touching the timer information 2604).

Generally, it can be understood that the information described herein (which is for example output by the mobile radio 102) may be output acoustically and/or optically.

Figure 28:
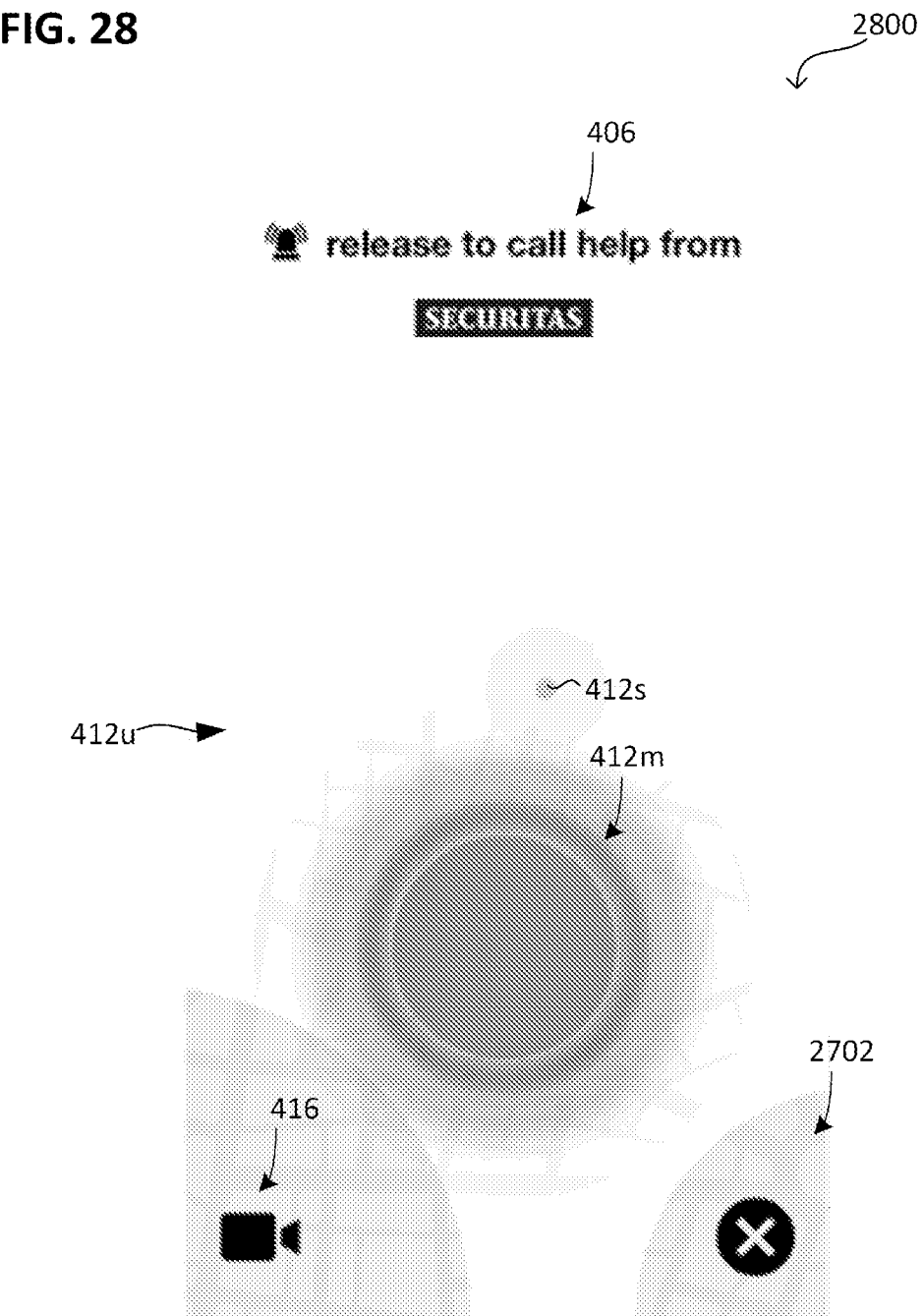
Figure 29:
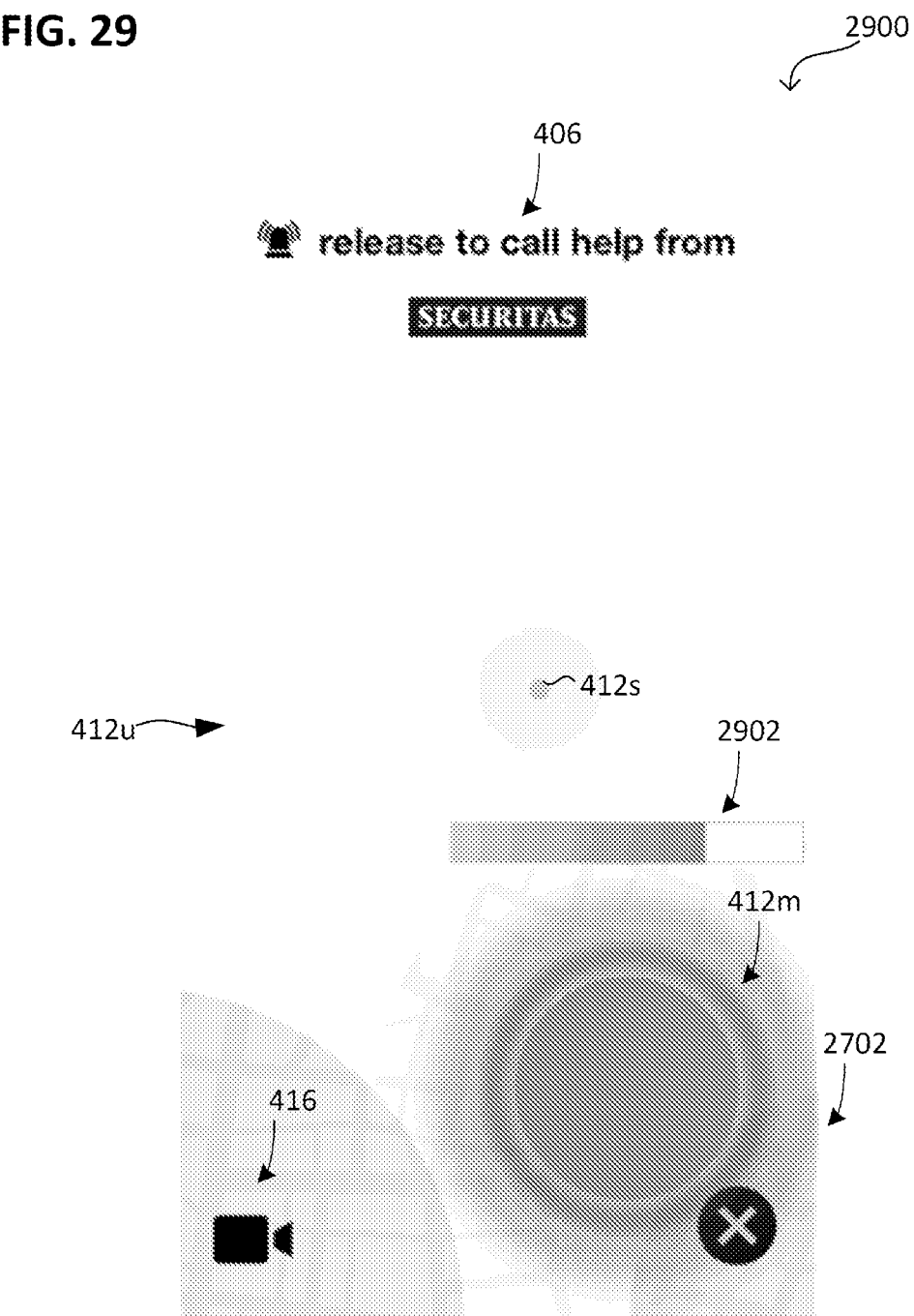

FIG. 28 and FIG. 29 respectively illustrate the display device 112 of a mobile radio 102 in schematic plan views at a first point in time 2800 and a second point in time 2700 after the first point in time 2900. Between the first point in time 2800 and the second point in time 2900, the ascertainment of the touching of the mobile radio 102 may have taken place.

In the example shown here, the disarming position may be arranged at the lower right-hand border of the display. This achieves more space for displaying information.

For example, the location of the third marker position 416 (also referred to as the recording-of-the-environment position) may be arranged at the left border of the display and/or be displayed as a notification of touching. If the dead man's switch 412*m* is brought into the recording-of-the-environment position 416 at the lower left border of the display, in response to this the recording of the environment may be started. For example, the bringing of the dead man's switch 412*m* into the recording-of-the-environment position 416 may cause the third sensor (for example the camera, for example video camera) of the mobile radio 102 to be activated and/or audio data and/or image data to be recorded by means of it.

The marker positions differing from one another in such a way in pairs, for example for disarming at the bottom right, for arming in the middle and for recording the environment at the bottom left, make it easier to be able to carry out these actions independently of one another. The way in which the marker positions do not all lie on a straight line (for example at the corners of a polygon) achieves the effect that the path of the swiping motion is extended, which makes it more difficult for the corresponding function to be triggered inadvertently.

The text above has explained various criteria (for example the arming criterion and/or the disarming criterion), which for example have one or more than one spatial default, for example the disarming position and/or a direction of the swiping motion. As an alternative or in addition, the criteria (for example the arming criterion and/or the disarming criterion) may have a temporal default. For example, a criterion (for example the arming criterion and/or the disarming criterion) may be satisfied when the temporal default is satisfied, for example a time period. For example, the disarming criterion may only be satisfied when the touching at the disarming position (after the swiping motion) is not interrupted over a predefined time period (also referred to as the disarming time period). The disarming time period may for example be several seconds, for example more than 2 or more than 5 seconds.

By way of illustration, the disarming criterion may be satisfied whenever the dead man's switch 412*m* is held for a predefined time period in the disarming position by means of touching.

As an alternative or in addition, the same may apply by analogy to the arming.

This temporal default of the criterion (for example the arming criterion and/or the disarming criterion) achieves the effect for example that inadvertent disarming/arming is made more difficult. Similarly, the temporal default of the criterion may make it possible to adapt the operating concept better to the capabilities of the user.

Optionally, the application 452 may be set up to output information 2902 about the progress (also referred to as progress information) made in satisfying the criterion (for example the arming criterion and/or the disarming criterion). The progress information 2902 may for example be based on the temporal default and/or the spatial default of the criterion. In the example shown here, the progress information 2902 may graphically output which part of the disarming time period has already run down. This output may as an alternative or in addition take place acoustically.

Figure 30:
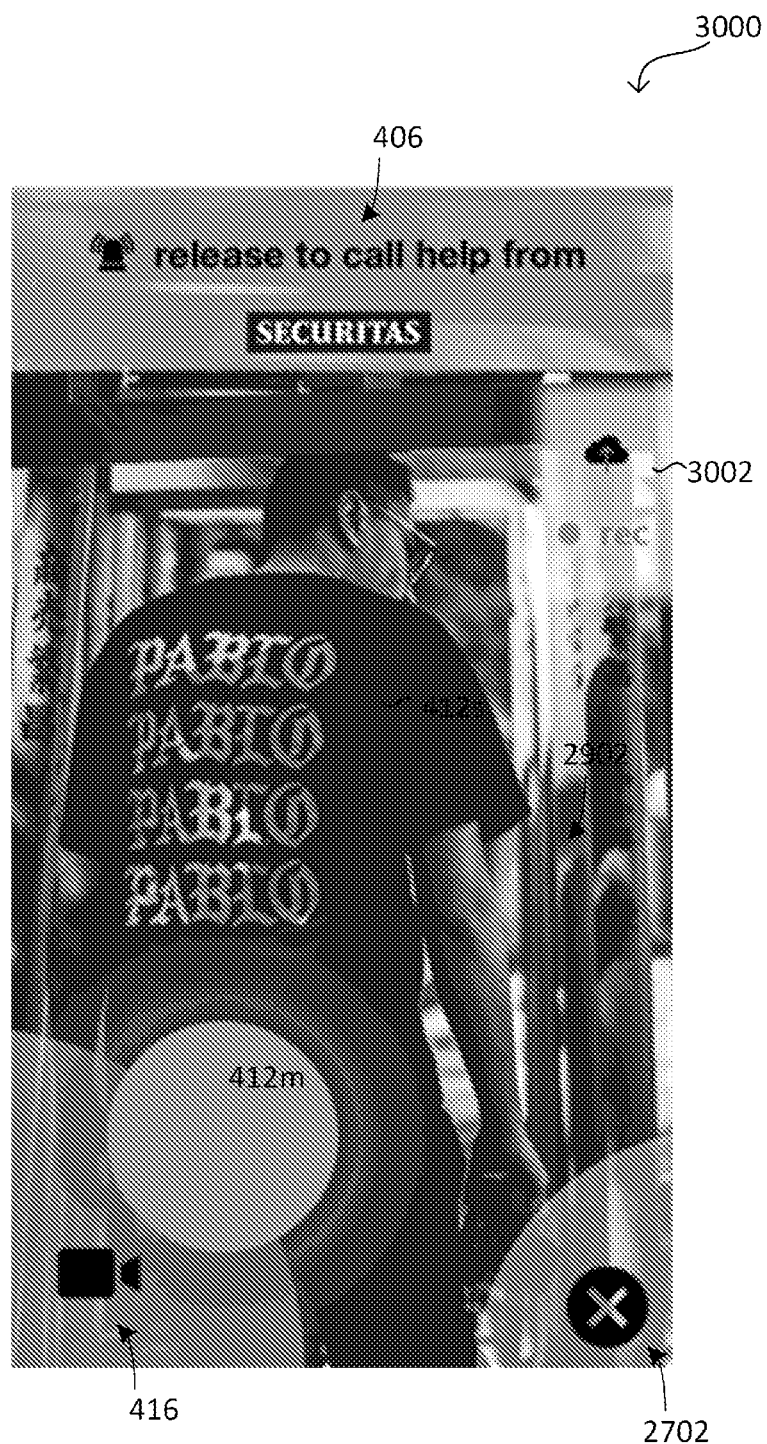

FIG. 30 illustrates the display device 112 of a mobile radio 102 in a schematic plan view once a recording of the environment has been started. Optionally, the application 452 may be set up to output information 3002 about the status of the recording of the environment (also referred to as the recording status). For example, the recording status may represent whether and/or since when the recording of the environment has been taking place. For example, the recording status may represent a duration of the recording of the environment. For example, the recording status may represent what type of recording (for example optical or acoustic) is being used for recording the environment. For example, the recording status may represent by means of which sensors the recording of the environment is taking place (for example camera and/or microphone). For example, the recording status may represent whether or to where the environment data are being transmitted, for example if they are being transmitted to an external computer system 304 with respect to the mobile radio 102.

The following text describes various examples, which relate to what has been described above and what is shown in the figures.

Example 1 is a method (for example for sending an alarm when there is loss of touching) for operating a mobile radio according to a first mode and a second mode, the method involving: ascertaining an indication of a location of the mobile radio by means of a first sensor of the mobile radio; ascertaining touching of the mobile radio by means of a (touch-sensitive) second sensor of the mobile radio, changing over to the second mode if it has been ascertained in the first mode that the touching satisfies a first predefined criterion, generating a message according to a wireless communication protocol if it has been ascertained in the second mode (for example for the first time) that the touching was interrupted, the message including the indication and also indicating that the touching was interrupted; (for example otherwise) changing over to the first mode without generating the message if it has been ascertained in the second mode that the (for example uninterrupted) touching satisfies a second predefined criterion.

Example 2 is a method (for example for sending an alarm when a timer has run down) for operating a mobile radio according to a first mode and a second mode, the method involving: ascertaining an indication of a location of the mobile radio by means of a first sensor of the mobile radio; ascertaining touching of the mobile radio by means of a (touch-sensitive) second sensor of the mobile radio, changing over to the second mode if it has been ascertained in the first mode that the touching satisfies a first predefined criterion, generating a message according to a wireless communication protocol if (for example only if) it has been ascertained in the second mode that a predefined time period has elapsed since the changing over to the second mode, the message including the indication and also indicating that the predefined time period has elapsed; (for example otherwise) changing over to the first mode without generating the message if it has been ascertained in the second mode that the touching satisfies a second predefined criterion (for example a user authentication); and optionally: generating the message according to the wireless communication protocol if it has been ascertained in the second mode that the mobile radio is arranged in a spatial security area (for example implemented by means of a radio beacon) (for example before the time period has elapsed).

Example 3 is a method (for example for sending an alarm) for operating a mobile radio according to a first mode and a second mode, the method involving: ascertaining an indication of a location of the mobile radio by means of a first sensor of the mobile radio; ascertaining touching of the mobile radio by means of a (touch-sensitive) second sensor of the mobile radio, changing over to the second mode if it has been ascertained in the first mode that the touching satisfies a first predefined criterion, generating a message according to a communication protocol (for example a wireless communication protocol) if (for example only if) it has been ascertained in the second mode that an event has occurred, the message including the indication and also indicating that the event has occurred; (for example otherwise) changing over to the first mode without generating the message if it has been ascertained in the second mode that a (for example the) touching satisfies a second predefined criterion; the event having occurred if a predefined time period has elapsed since changing over to the second mode, and/or if the touching was interrupted (for example for the first time since satisfying the first predefined criterion), and/or if an actuation of a (for example mobile) device which is communicatively coupled to the mobile radio satisfies an additional second predefined criterion (for example input for user authentication), and optionally: generating the message according to the wireless communication protocol if it has been ascertained in the second mode that the mobile radio is arranged in a spatial security area (for example implemented by means of a radio beacon) (for example before the event has occurred).

Example 4 is a method according to one of examples 1 to 3, also involving: recording audio data and/or image data by means of a third sensor of the mobile radio if it has been ascertained in the second mode that the touching satisfies a third predefined criterion.

Example 5 is the method according to example 4, the audio data and/or image data also being at least in some sections encrypted and/or linked together as a chain; and/or also being geo-referenced by means of the indication of the location; and/or also having a timestamp, which is linked with an instruction to erase the audio data and/or video data if a predefined (for example by means of the instruction) time period since the timestamp has elapsed; and/or an additional message being generated according to the wireless communication protocol, the additional message including the (for example encrypted and/or linked-together) audio data and/or video data.

Example 6 is the method according to one of examples 1 to 5, at least one of the following being acknowledged by the mobile radio by means of (for example haptic or acoustic) feedback: the changing over between the first mode and the second mode, the generating of the message, the generating of the additional message, the recording of audio data and/or image data.

Example 7 is the method according to example 6, the feedback comprising a mechanical (for example haptic) signal, a visual signal and/or acoustic signal, which is emitted by the mobile radio.

Example 8 is the method (for example for the manual sending of an alarm) according to one of examples 1 to 7, the generating of the message also taking place if it has been ascertained (for example in the second mode) that the touching satisfies a fourth predefined criterion.

Example 9 is the method (for example the externally triggered sending of an alarm) according to one of examples 1 to 8, the generating of the message also taking place if (for example in the second mode) the mobile radio has ascertained that an actuation of the device which is communicatively coupled to the mobile radio satisfies the additional second predefined criterion (for example associated with the second mode), and/or the actuation of the device comprising for example an input sequence (for example key sequence).

Example 10 is the method according to one of examples 1 to 9, the wireless communication protocol comprising a short-range communication protocol (for example Bluetooth communication protocol) or a long-range communication protocol (for example a cellular network communication protocol).

Example 11 is the method according to one of examples 1 to 10, the first predefined criterion, the (for example additional) second predefined criterion, the third predefined criterion and/or the fourth predefined criterion being satisfied if the touching takes place according to a respective pattern of touching to be performed (for example a swiping gesture) and/or over a touching time respectively to be maintained.

Example 12 is the method according to example 11, at least two patterns of touching according to the first, third and/or fourth predefined criterion continuing one another; and/or at least two patterns of touching according to the first predefined criterion and the second predefined criterion being opposite to one another; and/or a notification which represents at least one pattern of touching according to a criterion from the first to fourth predefined criteria being displayed by means of a display device of the mobile radio.

Example 13 is the method according to one of examples 2 to 12, the first predefined criterion being satisfied if the time period has been defined by means of the touching; and/or the time period being associated with the first predefined criterion.

Example 14 is the method according to one of examples 1 to 13, an indication of the first predefined criterion, the (for example additional) second predefined criterion, the third predefined criterion and/or the fourth predefined criterion being stored on the mobile radio.

Example 15 is the method according to one of examples 1 to 14, the first predefined criterion being satisfied if the touching takes place and/or begins at a first predefined position of the mobile radio; and/or the second predefined criterion being satisfied if the touching takes place and/or ends at a second predefined position of the mobile radio, if a user authentication has taken place by means of the touching and/or if the touching at the second predefined position takes place over a predefined time period; the first predefined position and the second predefined position for example being different from one another, the predefined time period for example being greater than a time period for satisfying the first predefined criterion.

Example 16 is the method according to one of examples 1 to 15, the first sensor being a transceiver (for example antenna), by means of which the message is sent and/or by means of which the device is coupled; or the first sensor being a geo-position sensor.

Example 17 is the method according to one of examples 1 to 16, the second sensor comprising a touch-sensitive surface of the mobile radio (for example its display device) and/or being part of the display device.

Example 18 is the method according to one of examples 1 to 17, the ascertainment of the indication of the location of the mobile radio taking place on the basis of a transmission to the mobile radio according to the wireless communication protocol; taking place on the basis of a radio beacon signal and/or short-range signal which is received by the mobile radio; and/or taking place on the basis of a satellite signal which is received by the mobile radio.

Example 19 is the method according to one of examples 1 to 18, the indication of the location of the mobile radio comprising a geo-position of the mobile radio.

Example 20 is the method according to one of examples 1 to 19, the indication in relation to the location being ascertained by means of a radio beacon.

Example 21 is the method according to one of examples 1 to 20, the changing over to the first mode taking place without generating the message when (for example only when) the touching has been free from interruption (without any interruption) since the changing over to the second mode.

Example 22 is the method according to one of examples 1 to 20, the changing over to the second mode taking place before the touching that satisfies the first predefined criterion was interrupted.

Example 23 is the method according to one of examples 1 to 22, the generating of the message taking place according to the wireless communication protocol if it has been ascertained in the second mode that the touching was interrupted for the first time (the first occasion) since the satisfying of the first predefined criterion (i.e. without having been interrupted even once in the meantime). For example, the changing over to the second mode may take place if it has been ascertained in the first mode that the touching satisfies the first predefined criterion at a first point in time, the generating of the message according to the wireless communication protocol taking place if it has been ascertained in the second mode that the touching was interrupted at a second point in time without the touching having been interrupted between the first point in time and the second point in time.

Example 24 is the method according to one of examples 1 to 23, also involving: (for example before the generating of the message) mutual authorization of the mobile radio with one (or more than one) receiver device (for example of the message), the message including a notification of the authorized receiver device (for example each receiver device of the more than one receiver devices), for example an instruction to transmit the message or at least its content to the authorized receiver device.

Example 25 is the method according to one of examples 1 to 24, also involving: before the generating of the message, displaying information by means of a display device of the mobile radio, the information representing one or more available receiver devices to which the generated message can be transmitted.

Example 26 is the method according to example 25, also involving: before the generating of the message, receiving a user input by means of the mobile radio that marks at least one receiver device of the number of available receiver devices (for example as preferred or to be avoided), the message for example being addressed according to the marking, the message for example including a notification of the marked receiver device (for example each receiver device of the more than one receiver devices), for example an instruction to transmit the message or at least its content to the marked receiver device.

Example 27 comprises code segments which are set up to carry out the method according to one of examples 1 to 26 when they are executed by means of a processor.

Example 28 is a mobile radio, comprising one or more than one processor which is set up to carry out the method according to one of examples 1 to 27.

Example 29 is a system, comprising: a mobile radio according to example 28; and a circuit which is communicatively coupled to the mobile radio according to the wireless communication protocol and is also set up for: receiving the message, ascertaining an available receiver device on the basis of the message (for example the indication contained therein of the location of the mobile radio); and sending an alarm to the receiver device while indicating the location of the mobile radio; optionally receiving feedback from the receiver device about accepting the alarm.

Example 30 is the system according to example 29, also comprising: the receiver device being assigned (for example by means of a database) a geo-local area containing the location of the mobile radio.

Example 31 is a system, comprising: a mobile radio according to example 30; a circuit which is communicatively coupled to the mobile radio according to the wireless communication protocol and is also set up for: ascertaining a receiver device which is assigned to a geo-local area, sending an alarm to the receiver device if it has been ascertained that a location of the mobile radio is within the geo-local area while the mobile radio is being operated in the second mode.

Example 32 is the system according to example 31, also comprising: a radio beacon which defines the geo-local area.

Example 33 is the system according to example 32, the radio beacon at least comprising one of the following: a short-range transmitter for communicating with the mobile radio, an autonomous energy supply (for example comprising a battery and/or a solar cell), and/or a long-range transmitter, for example for communicating with the circuit.

Example 34 is the system according to example 33, the radio beacon being set up for: ascertaining by means of the short-range transmitter in which mode the mobile radio is being operated, and/or receiving the message by means of the short-range transmitter and retransmitting the message by means of the long-range transmitter.

The invention claimed is:

1. A method for operating a mobile radio according to a first mode and a second mode, the method involving:
   ascertaining an indication of a location of the mobile radio by means of a first sensor of the mobile radio;
   ascertaining touching of the mobile radio by means of a second sensor of the mobile radio;
   changing over to the second mode if it has been ascertained in the first mode that the touching satisfies a first predefined criterion;
   generating a message according to a wireless communication protocol if it has been ascertained in the second mode that the touching was interrupted for the first time, the message including the indication and also indicating that the touching was interrupted; and
   changing over to the first mode without generating the message if it has been ascertained in the second mode that the touching satisfies a second predefined criterion.

2. The method as claimed in claim 1, also involving:
   recording audio data and/or image data by means of a third sensor of the mobile radio if it has been ascertained in the second mode that the touching satisfies a third predefined criterion.

3. The method as claimed in claim 1,
   the generating of the message also taking place if it has been ascertained that the touching satisfies a fourth predefined criterion.

4. The method as claimed in claim 1,
   the first predefined criterion being satisfied if the touching takes place according to a first pattern of touching to be performed;
   the second predefined criterion being satisfied if the touching takes place according to a second pattern of touching to be performed; and
   the second pattern of touching being opposite to the first pattern of touching.

5. The method as claimed in claim 1,
   the second predefined criterion being satisfied if a user authentication has taken place by means of the touching.

6. The method as claimed in claim 1,
   the second sensor comprising a touch-sensitive surface of the mobile radio.

7. The method as claimed in claim 1,
   the ascertainment of the indication of the location of the mobile radio taking place on the basis of a transmission to the mobile radio according to the wireless communication protocol.

8. The method as claimed in claim 1,
   the ascertainment of the indication of the location of the mobile radio taking place on the basis of a satellite signal which is received by the mobile radio.

9. The method as claimed in claim 1,
   the ascertainment of the indication of the location of the mobile radio taking place on the basis of a radio beacon signal which is received by the mobile radio.

10. The method as claimed in claim 1, also involving:
    mutual authorization of the mobile radio with a receiver device of the message.

11. The method as claimed in claim 1, also involving:
    before the generating of the message, displaying information by means of a display device of the mobile radio, the information representing one or more available receiver devices to which the generated message can be transmitted.

12. A method for operating a mobile radio according to a first mode and a second mode, the method involving:
    ascertaining an indication of a location of the mobile radio by means of the first sensor of the mobile radio;
    ascertaining touching of the mobile radio by means of a second sensor of the mobile radio;
    changing over to the second mode if it has been ascertained in the first mode that the touching satisfies a first predefined criterion;
    generating a message according to a wireless commune occasion protocol if it has been ascertained in the second mode that a predefined time period has elapsed since the changing over to the second mode, the message including the indication and also indicating that the predefined time period has elapsed;
    changing over to the first mode without generating the message if it has been ascertained in the second mode that the touching satisfies a second predefined criterion; and
    generating the message according to the wireless communication protocol if it has been ascertained in the second mode that the mobile radio is arranged in a spatial security area.

13. A method for operating a mobile radio according to a first mode and a second mode, the method involving:
    ascertaining an indication of a location of the mobile radio by means of a first sensor of the mobile radio;
    ascertaining a location of the mobile radio by means of a second sensor of the mobile radio;
    changing over to the second mode if it has been ascertained in the first mode that the touching satisfies a first predefined criterion;
    generating a message according to a wireless communication protocol if it has been ascertained in the second mode that a predefined time period has elapsed since the changing over to the second mode, the message including the indication and also indicating that the predefined time period has elapsed; and
    changing over to the first mode without generating the message if a user authentication has taken place in the second mode.

14. A method for operating a mobile radio according to a first mode and a second mode, the method involving:
    ascertaining an indication of a location of the mobile radio by means of a first sensor of the mobile radio;
    ascertaining a touching of the mobile radio by means of a second sensor of the mobile radio;

changing over to the second mode if it has been ascertained in the first mode that the touching satisfies a first predefined criterion;

generating a message according to a wireless communication protocol only if it has been ascertained in the second mode that an actuation of a device which is communicatively coupled to the mobile radio satisfies an additional second predefined criterion, the message the message including the indication and also indicating that the actuation of the device satisfies the additional second predefined criterion; and changing over to the first mode without generating the message if it has been ascertained in the second mode that the touching satisfies a second predefined criterion.

15. Code segments which are set up to carry out the method as claimed in claim 1 when they are executed by means of a processor.

16. A mobile radio, comprising one or more than one processor which is set up to carry out the method as claimed in claim 1.

17. A system, comprising:
a mobile radio as claimed in claim 16; and
a circuit which is communicatively coupled to the mobile radio according to the wireless communication protocol and is also set up for:
receiving the message,
ascertaining an available receiver device on the basis of the message; and
sending an alarm to the receiver device while indicating the location of the mobile radio.

18. A system, comprising:
a mobile radio as claimed in claim 16;
a circuit which is communicatively coupled to the mobile radio according to the wireless communication protocol and is also set up for:
ascertaining a receiver device which is assigned to a geo-local area,
sending an alarm to the receiver device if it has been ascertained that the location of the mobile radio is within the geo-local area while the mobile radio is being operated in the second mode.

* * * * *